(12) United States Patent
Oh

(10) Patent No.: US 11,319,998 B2
(45) Date of Patent: May 3, 2022

(54) CONSTANT VELOCITY JOINT ASSEMBLY

(71) Applicant: DANA AUTOMOTIVE SYSTEMS GROUP, LLC, Maumee, OH (US)

(72) Inventor: Seung Tark Oh, Ann Arbor, MI (US)

(73) Assignee: Dana Automotive Systems Group, LLC, Maumee, OH (US)

(*) Notice: Subject to any disclaimer, the term of this patent is extended or adjusted under 35 U.S.C. 154(b) by 302 days.

(21) Appl. No.: 16/497,468

(22) PCT Filed: Mar. 29, 2018

(86) PCT No.: PCT/US2018/025200
§ 371 (c)(1),
(2) Date: Sep. 25, 2019

(87) PCT Pub. No.: WO2018/183716
PCT Pub. Date: Oct. 4, 2018

(65) Prior Publication Data
US 2021/0108683 A1 Apr. 15, 2021

Related U.S. Application Data

(60) Provisional application No. 62/479,771, filed on Mar. 31, 2017, provisional application No. 62/508,658, filed on May 19, 2017.

(51) Int. Cl.
*F16D 3/223* (2011.01)
*F16D 1/116* (2006.01)
(Continued)

(52) U.S. Cl.
CPC .............. *F16D 3/223* (2013.01); *F16B 21/06* (2013.01); *F16D 1/116* (2013.01); *F16D 3/18* (2013.01);
(Continued)

(58) Field of Classification Search
CPC . F16D 3/223; F16D 1/116; F16D 3/18; F16D 2003/22303; F16D 2003/22309;
(Continued)

(56) References Cited

U.S. PATENT DOCUMENTS 1,980,846 A 11/1934 Bradley
2,653,456 A 9/1953 Heym
(Continued)

FOREIGN PATENT DOCUMENTS

CN 1414257 A 4/2003
CN 102741578 A 10/2012
(Continued)

OTHER PUBLICATIONS

European Patent Office, International Search Report with Written Opinion issued in Application PCT/US2017/031933, dated Sep. 12, 2017, 11 pages, European Patent Office, Rijswijk, Netherlands.
(Continued)

*Primary Examiner* — Greg Binda
(74) *Attorney, Agent, or Firm* — Marshall & Melhorn, LLC

(57) ABSTRACT

A joint assembly (200) comprising a first joint member (232) that is drivingly connected to a second joint member (272) by one or more torque transfer elements (290). Drivingly connected to at least a portion of the second joint member (312) is a stub shaft (292). An end of the stub shaft, opposite the second joint member, is drivingly connected to at least a portion of a second shaft. At least a portion of a second end portion of a first shaft (202) is drivingly connected to at least a portion of a first end portion of the first joint member (232) and at least a portion of a first end portion of the first shaft has a gear member (210) with a plurality of gear teeth thereon.

20 Claims, 15 Drawing Sheets

(51) Int. Cl.
*F16B 21/06* (2006.01)
*F16D 3/18* (2006.01)

(52) U.S. Cl.
CPC .............. *F16D 2003/22303* (2013.01); *F16D 2003/22309* (2013.01); *F16D 2003/22326* (2013.01); *Y10S 403/07* (2013.01); *Y10S 464/905* (2013.01); *Y10S 464/906* (2013.01); *Y10T 403/49* (2015.01); *Y10T 403/67* (2015.01); *Y10T 403/7033* (2015.01)

(58) Field of Classification Search
CPC ........... F16D 2003/22326; F16B 21/06; Y10S 464/905; Y10S 464/906; Y10S 403/07; Y10T 403/49; Y10T 403/67; Y10T 403/7033
USPC ........................................... 464/182; 411/517
See application file for complete search history.

(56) References Cited

U.S. PATENT DOCUMENTS

| | | | |
|---|---|---|---|
| 2,844,013 | A | 7/1958 | Spence |
| 3,162,026 | A | 11/1964 | Ritsema |
| 3,162,024 | A | 12/1964 | Breuer |
| 3,176,476 | A | 4/1965 | Cull |
| 3,186,189 | A | 6/1965 | Cull |
| 3,452,558 | A | 7/1969 | Cull |
| 3,464,232 | A | 9/1969 | Hutchinson |
| 3,540,232 | A | 11/1970 | Breuer |
| 3,789,624 | A | 2/1974 | Camosso |
| 3,802,221 | A | 4/1974 | Kimata |
| 3,858,412 | A | 1/1975 | Fisher |
| 4,034,576 | A | 7/1977 | Takahashi |
| 4,112,709 | A | 9/1978 | Krude |
| 4,191,031 | A | 3/1980 | Girguis |
| 4,196,598 | A | 4/1980 | Hirai |
| 4,205,925 | A | 6/1980 | Fisher |
| 4,229,952 | A | 10/1980 | Aucktor |
| 4,249,395 | A | 2/1981 | Harz |
| 4,319,467 | A | 3/1982 | Hegler |
| 4,320,632 | A | 3/1982 | Dore |
| 4,343,581 | A * | 8/1982 | Millheiser ............... F16B 21/18 411/517 |
| 4,369,979 | A | 1/1983 | Krude |
| 4,392,838 | A | 7/1983 | Welschof |
| 4,395,247 | A | 7/1983 | Roberts |
| 4,403,781 | A | 9/1983 | Riemscheid |
| 4,411,549 | A | 10/1983 | Sheppard |
| 4,437,782 | A | 3/1984 | Geisthoff |
| 4,540,385 | A | 9/1985 | Krude |
| 4,558,869 | A | 12/1985 | Grove |
| 4,669,571 | A | 6/1987 | Kurde |
| 4,805,921 | A | 2/1989 | Ukai |
| 4,877,103 | A | 10/1989 | Nuutio |
| 4,967,609 | A | 11/1990 | Takagi |
| 5,201,107 | A | 4/1993 | Mazziotti |
| 5,222,914 | A | 6/1993 | Mazziotti |
| 5,236,394 | A | 8/1993 | Collins |
| 5,318,480 | A | 6/1994 | Essi |
| 5,376,052 | A | 12/1994 | Jacob |
| 5,529,538 | A | 6/1996 | Schulz |
| 5,580,313 | A | 12/1996 | Jacob |
| 6,010,409 | A | 1/2000 | Johnson |
| 6,085,797 | A | 7/2000 | Grabaum |
| 6,251,021 | B1 | 6/2001 | Jacob |
| 6,390,926 | B1 | 5/2002 | Perrow |
| 6,482,094 | B2 | 11/2002 | Kefes |
| 6,530,843 | B2 | 3/2003 | Miller |
| 6,540,616 | B2 | 4/2003 | Miller |
| 6,582,151 | B2 | 6/2003 | Hopson |
| 6,585,601 | B2 | 7/2003 | Booker |
| 6,709,338 | B2 | 3/2004 | Weckerling |
| 6,780,114 | B2 | 8/2004 | Sahashi |
| 6,793,581 | B2 | 9/2004 | Meyer |
| 6,793,584 | B2 | 9/2004 | Ramey |
| 6,926,612 | B2 | 8/2005 | Wang |
| 6,942,223 | B2 * | 9/2005 | Wang ..................... F16D 3/845 |
| 6,988,949 | B2 | 1/2006 | Wang |
| 7,008,325 | B2 | 3/2006 | Bongartz |
| 7,077,753 | B2 | 7/2006 | Kuczera |
| 7,097,563 | B2 | 8/2006 | Benson |
| 7,104,893 | B2 | 9/2006 | Ouchi |
| 7,204,760 | B2 | 4/2007 | Wang |
| 7,226,360 | B2 | 6/2007 | Lyon |
| 7,232,373 | B2 | 6/2007 | Hildebrandt |
| 7,238,114 | B2 | 7/2007 | Wang |
| 7,281,984 | B2 | 10/2007 | Foster-Hamilton |
| 7,326,199 | B2 | 2/2008 | MacFarland |
| 7,377,854 | B2 | 5/2008 | Wormsbaecher |
| 7,396,286 | B2 | 7/2008 | Sueoka |
| 7,435,182 | B2 | 10/2008 | Ichikawa |
| 7,488,259 | B2 | 2/2009 | Sueoka |
| 7,575,519 | B2 | 8/2009 | Dice |
| 7,607,984 | B2 | 10/2009 | Hopson |
| 7,607,985 | B2 | 10/2009 | Krude |
| 7,677,984 | B2 | 3/2010 | Hahn |
| 7,704,149 | B2 | 4/2010 | Yamazaki |
| 7,997,988 | B2 | 8/2011 | Wormsbaecher |
| 7,997,990 | B2 * | 8/2011 | Hahn ..................... F16D 1/087 464/182 |
| 8,025,579 | B2 | 9/2011 | Kamikawa |
| 8,033,920 | B1 | 10/2011 | Benson |
| 8,070,613 | B2 | 12/2011 | Cermak |
| 8,157,660 | B2 | 4/2012 | Disser |
| 8,162,767 | B2 | 4/2012 | Holzhei |
| 8,172,691 | B2 | 5/2012 | Deisinger |
| 8,235,829 | B2 | 8/2012 | Kozlowski |
| 8,262,488 | B2 | 9/2012 | Takemura |
| 8,262,489 | B2 | 9/2012 | Valovick |
| 8,262,490 | B2 | 9/2012 | Langer |
| 8,287,393 | B2 | 10/2012 | Dao |
| 8,322,941 | B2 | 12/2012 | Cermak |
| 8,342,972 | B2 | 1/2013 | Yamazaki |
| 8,353,775 | B2 | 1/2013 | Kamikawa |
| 8,371,949 | B2 | 2/2013 | Patterson |
| 8,425,142 | B2 | 4/2013 | Disser |
| 8,435,125 | B2 | 5/2013 | Ooba |
| 8,469,829 | B2 | 6/2013 | Kobayashi |
| 8,475,286 | B2 | 7/2013 | Lamothe |
| 8,641,538 | B2 | 2/2014 | Oh |
| 8,834,279 | B2 | 9/2014 | Oh |
| 9,133,888 | B2 | 9/2015 | Gremmelmaier |
| 9,388,860 | B2 | 7/2016 | Berube |
| 9,670,963 | B2 | 6/2017 | Metzger |
| 10,774,968 | B2 * | 9/2020 | Newman .................. F16L 37/46 |
| 2001/0016520 | A1 | 8/2001 | Sahashi |
| 2001/0046901 | A1 | 11/2001 | Meyer |
| 2003/0069075 | A1 | 4/2003 | Furuta |
| 2003/0083135 | A1 | 5/2003 | Yamazaki |
| 2003/0146591 | A1 | 8/2003 | Ouchi |
| 2005/0192107 | A1 | 9/2005 | Toriumi |
| 2007/0149298 | A1 | 6/2007 | Wormsbaecher |
| 2007/0225081 | A1 | 9/2007 | Toriumi |
| 2008/0234057 | A1 | 9/2008 | Takekawa |
| 2010/0124995 | A1 | 5/2010 | Disser |
| 2010/0249949 | A1 | 9/2010 | Bjarnason |
| 2010/0267455 | A1 | 10/2010 | Valovick |
| 2012/0004044 | A1 | 1/2012 | Conger |
| 2013/0244798 | A1 | 9/2013 | Oh |
| 2014/0023459 | A1 * | 1/2014 | Ayad .................... F16B 21/186 411/517 |
| 2016/0017929 | A1 | 1/2016 | Sugiyama |
| 2017/0292570 | A1 | 10/2017 | Ketchel |

FOREIGN PATENT DOCUMENTS

| | | |
|---|---|---|
| DE | 2703467 | 8/1978 |
| DE | 2801114 B1 | 6/1979 |
| DE | 102010031841 A1 | 3/2012 |
| EP | 2086180 | 8/2009 |
| EP | 2123926 | 11/2009 |
| EP | 2912329 A1 | 9/2015 |
| FR | 2674299 | 9/1992 |

(56) References Cited

FOREIGN PATENT DOCUMENTS

| | | |
|---|---|---|
| FR | 2899660 | 10/2007 |
| GB | 503835 | 4/1939 |
| GB | 2000573 | 1/1979 |
| GB | 2017256 A | 10/1979 |
| GB | 2323641 | 9/1998 |
| JP | 2004232836 | 8/2004 |
| WO | 9306379 | 4/1993 |
| WO | 2015077679 | 5/2015 |
| WO | 2015153431 | 10/2015 |
| WO | 2017051746 | 3/2017 |
| WO | 2017196962 | 11/2017 |

OTHER PUBLICATIONS

European Patent Office, International Search Report with Written Opinion issued in PCT/US2018/025200, dated Jul. 25, 2018, 13 pages, Rijswijk, Netherlands.
European Patent Office, The International Search Report and Written Opinion issued in PCT/US2014/070499, dated Aug. 20, 2015, 10 pages, European Patent Office, Rijswijk, Netherlands.
European Patent Office, The International Search Report and Written Opinion issued in PCT/US2017/017377, dated May 9, 2017, 15 pages, European Patent Office, Rijswijk, Netherlands.
International Search Report and Written Opinion for Application No. PCT/US2015/023295, dated Oct. 15, 2015, issued by the European Patent Office. (12 pages).
The State Intellectual Property Office of the People's Republic of China, Chinese Office Action for Application No. 201580025387.9, dated Jun. 28, 2018, 13 pages.

* cited by examiner

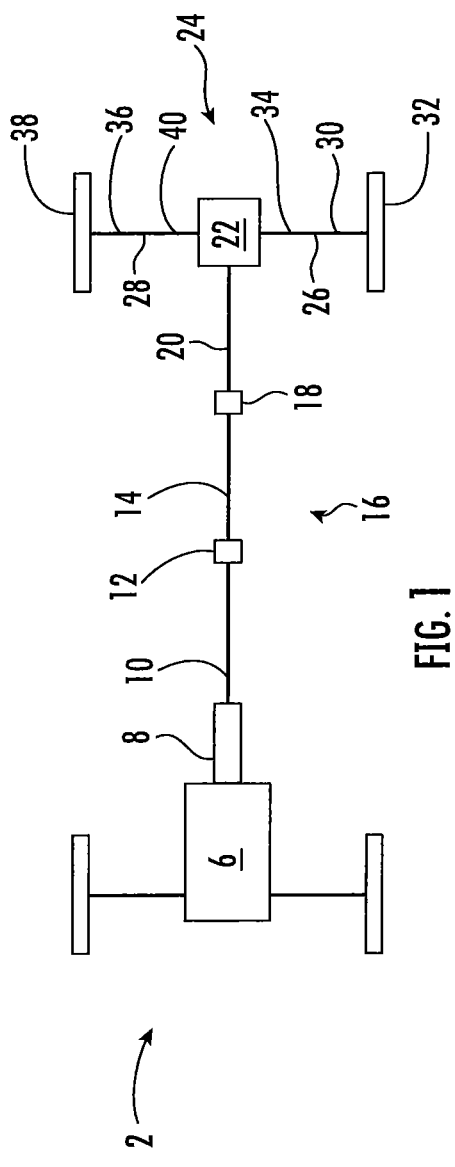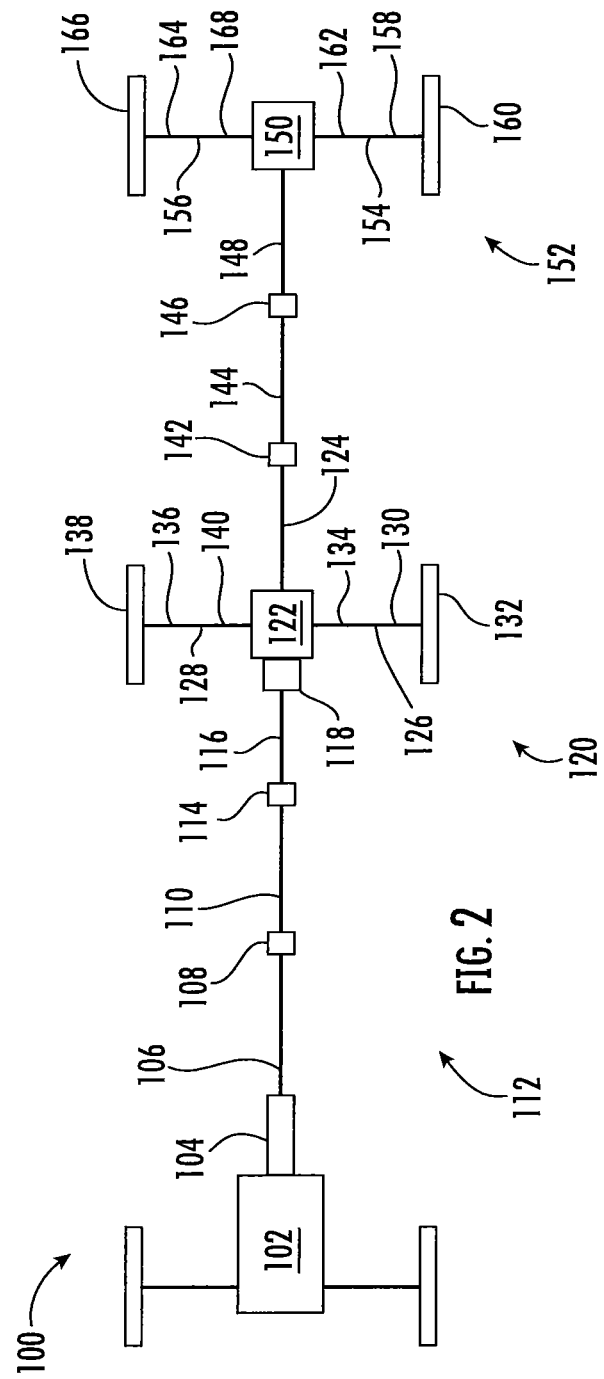

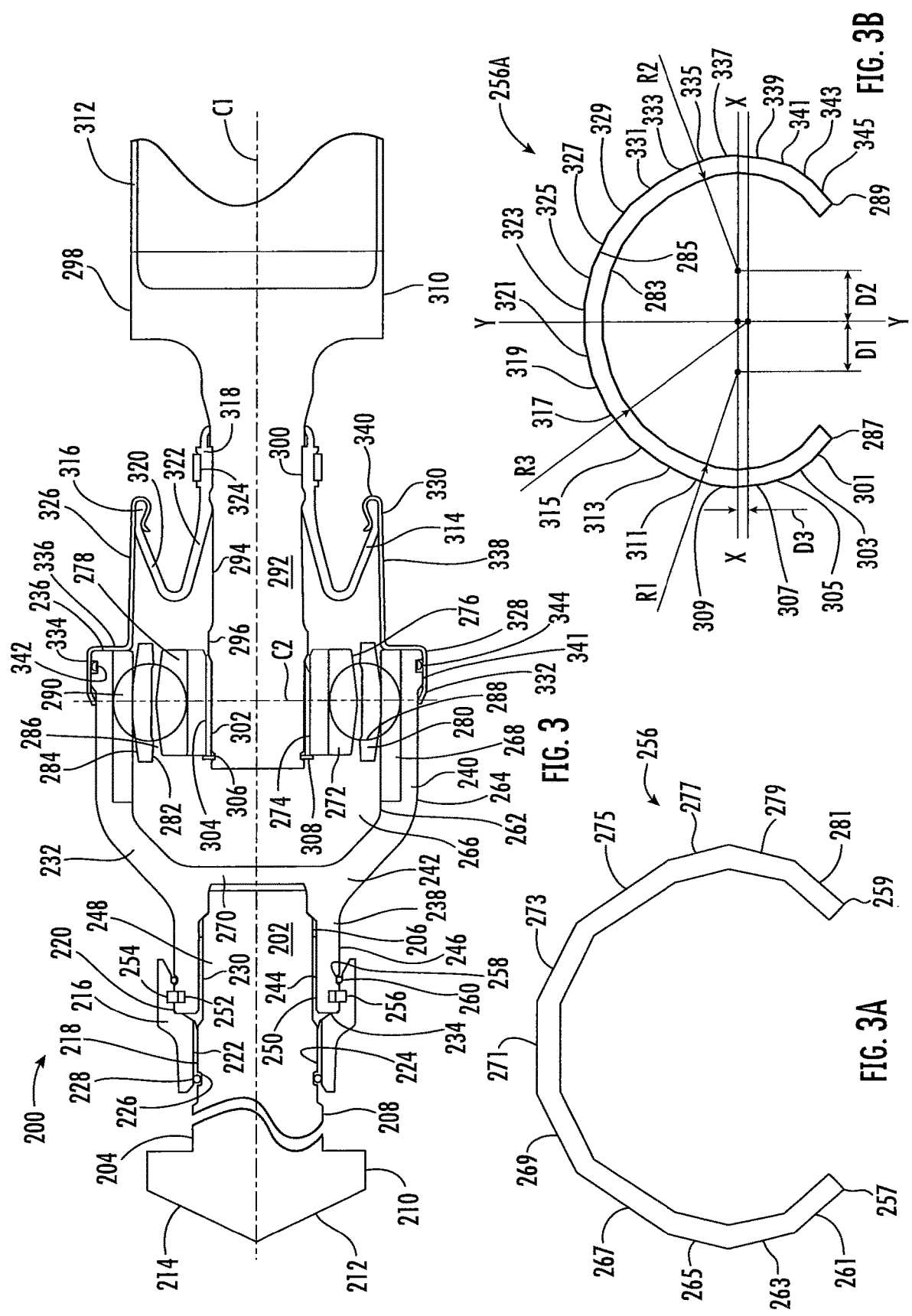

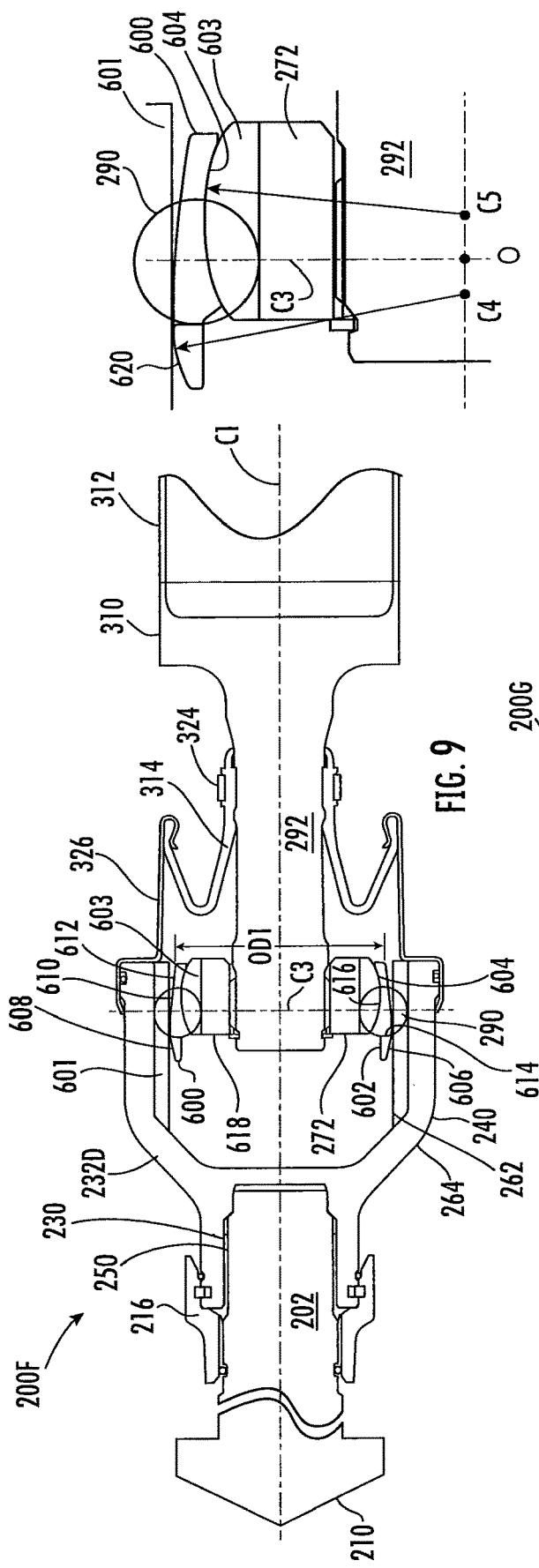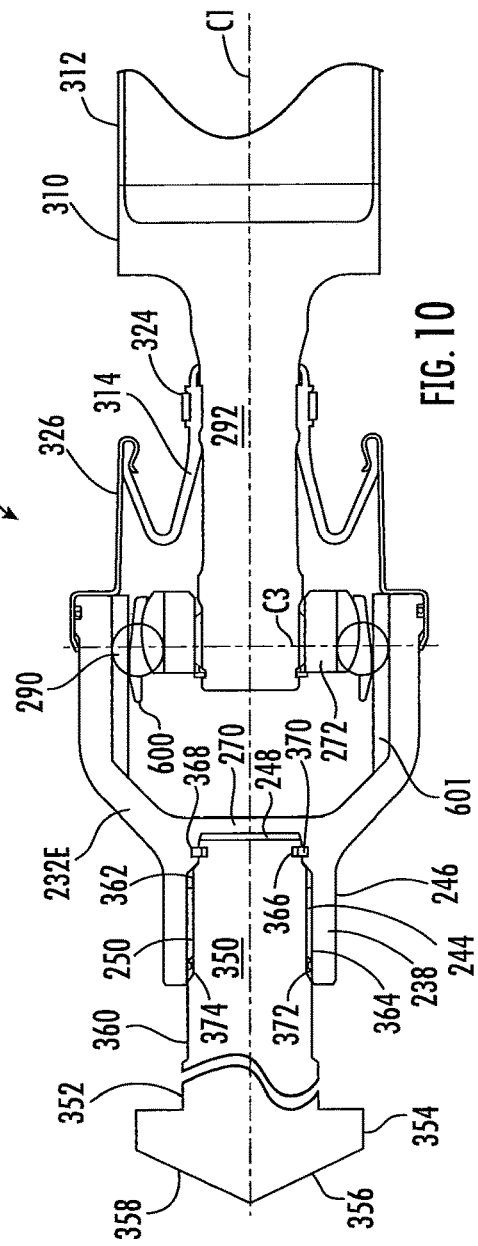

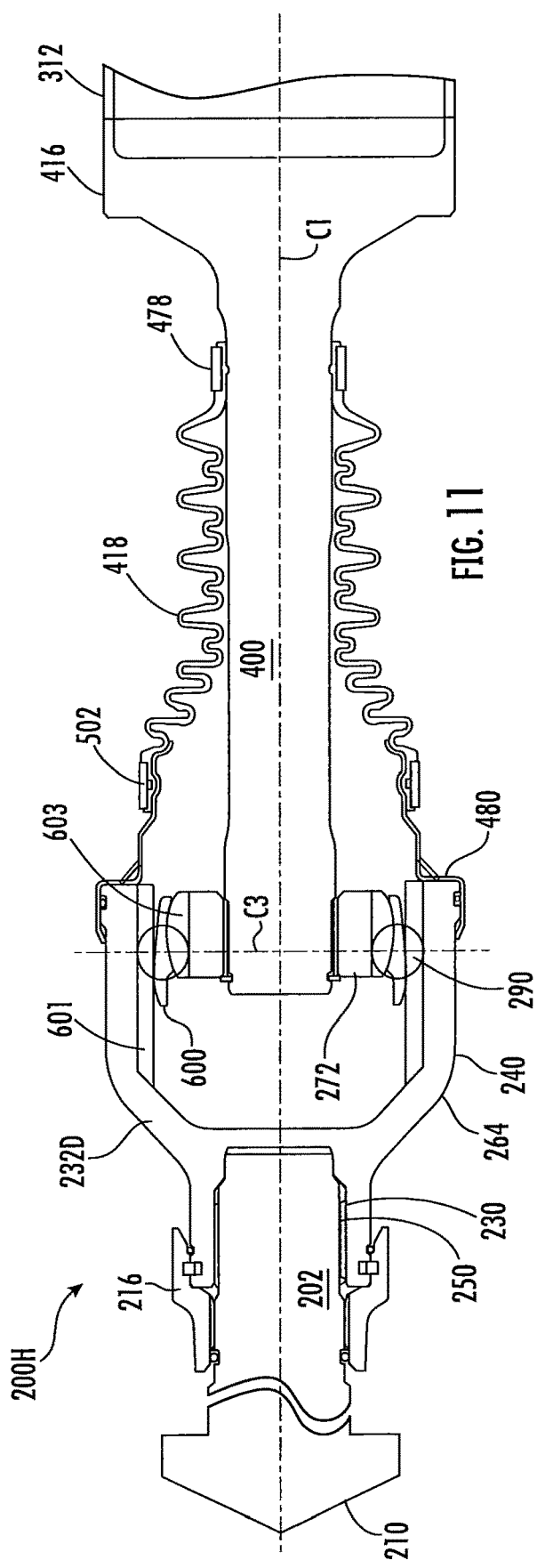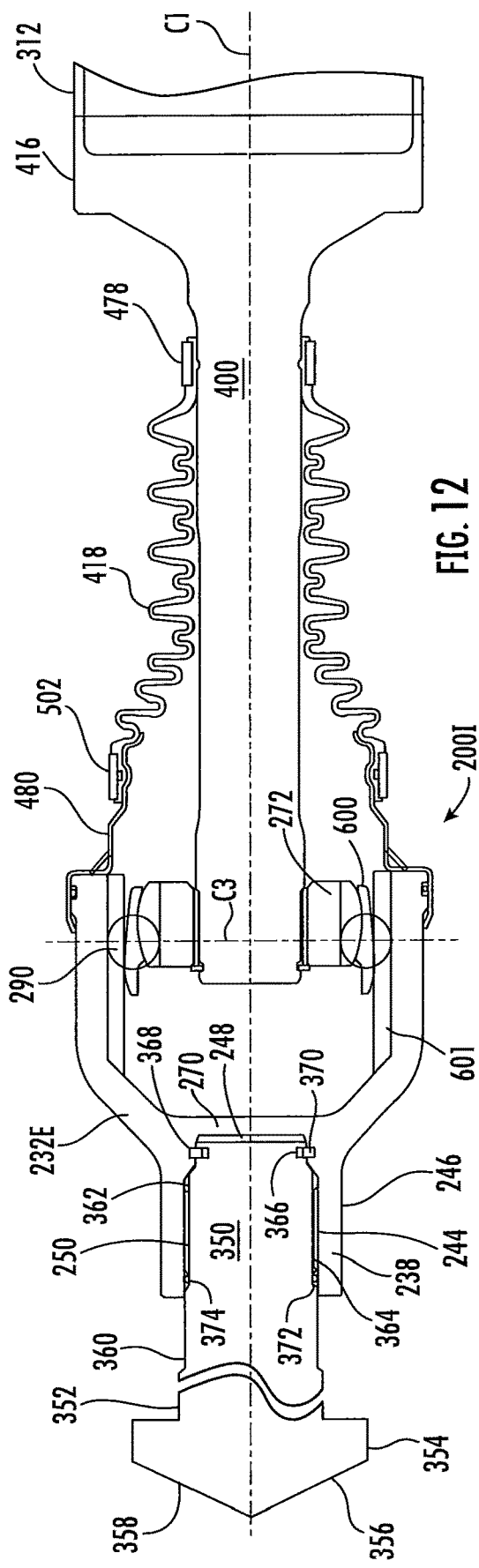

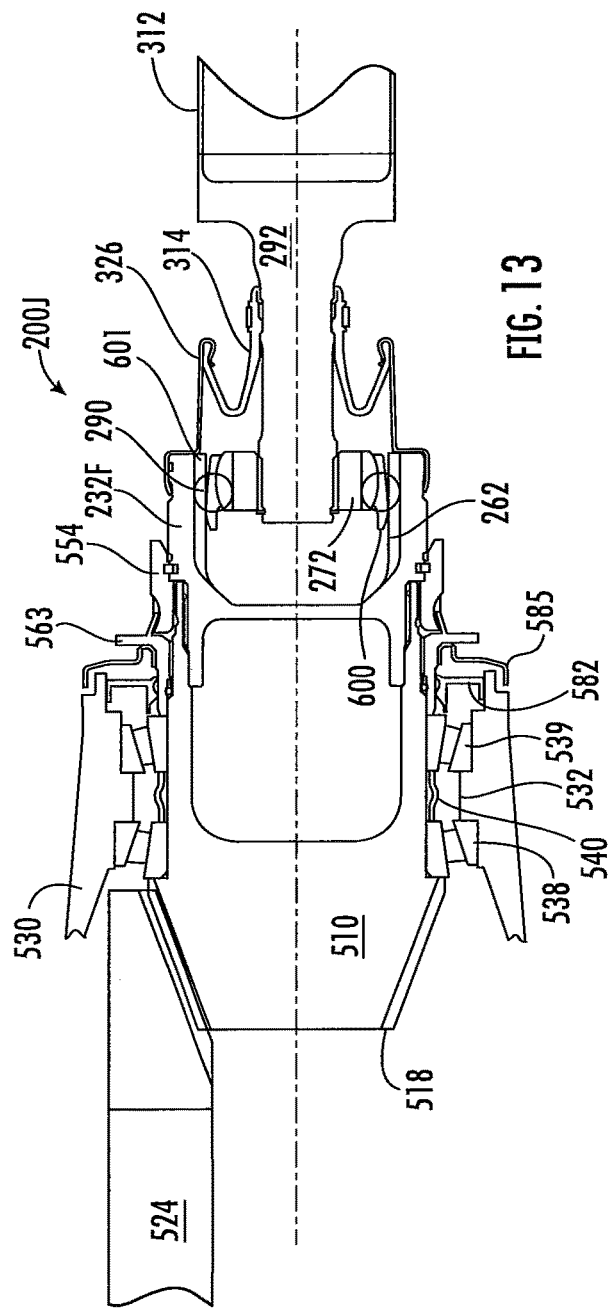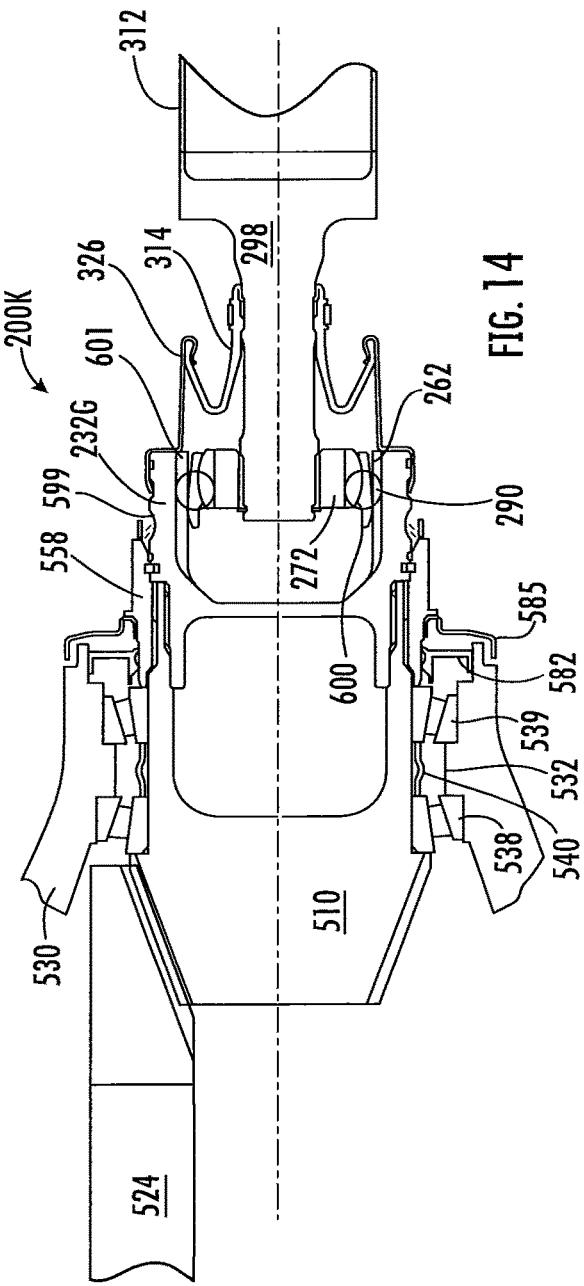

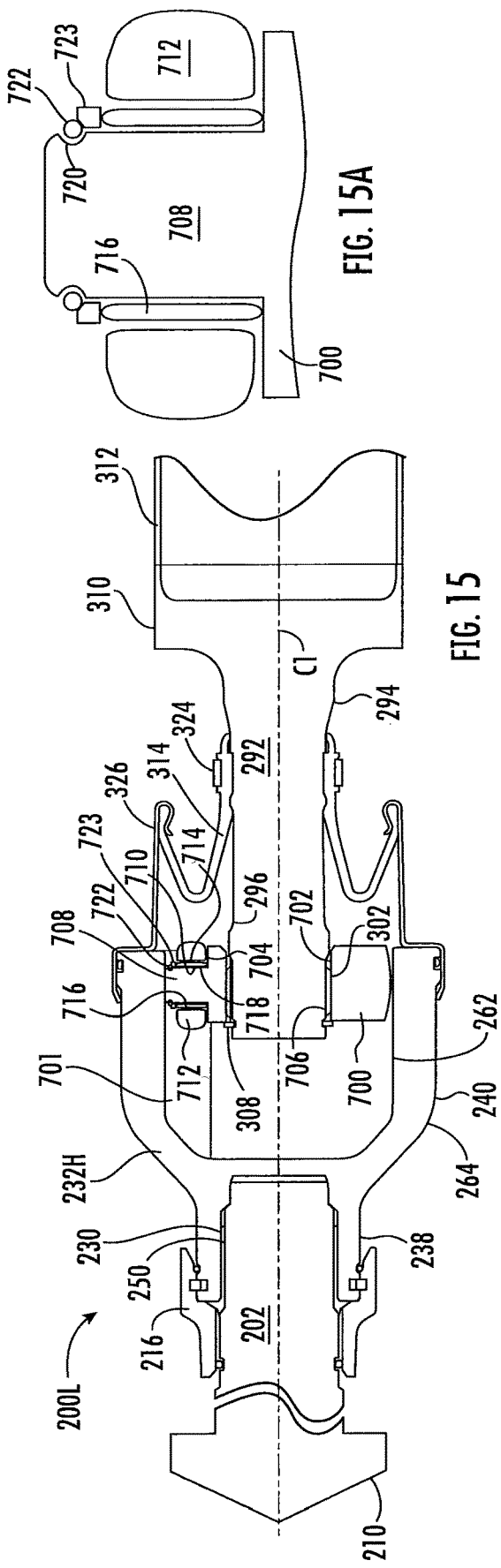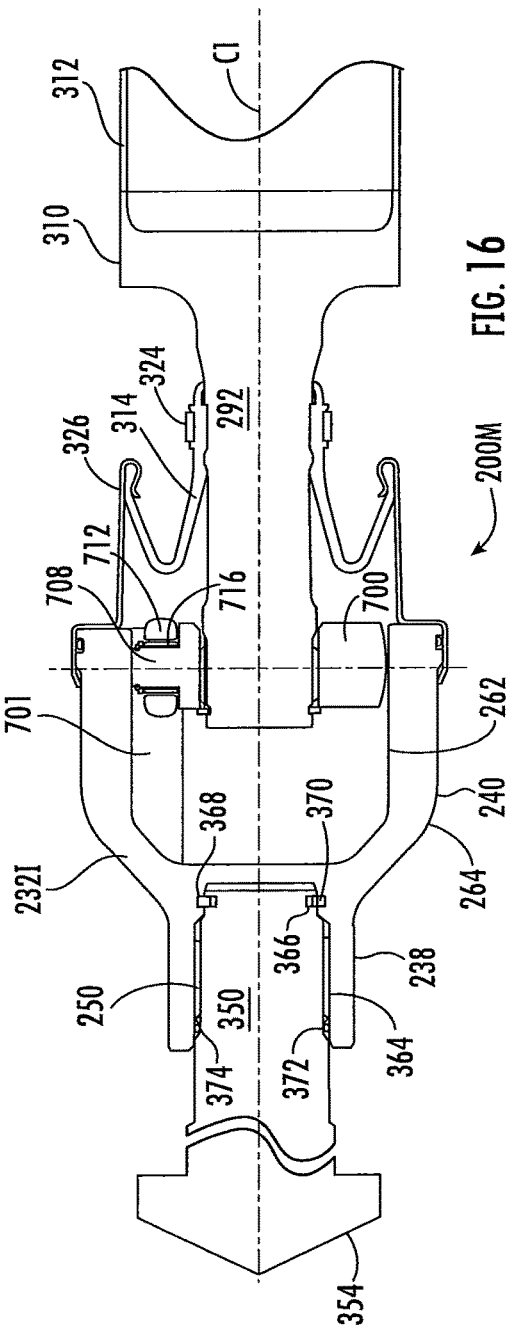

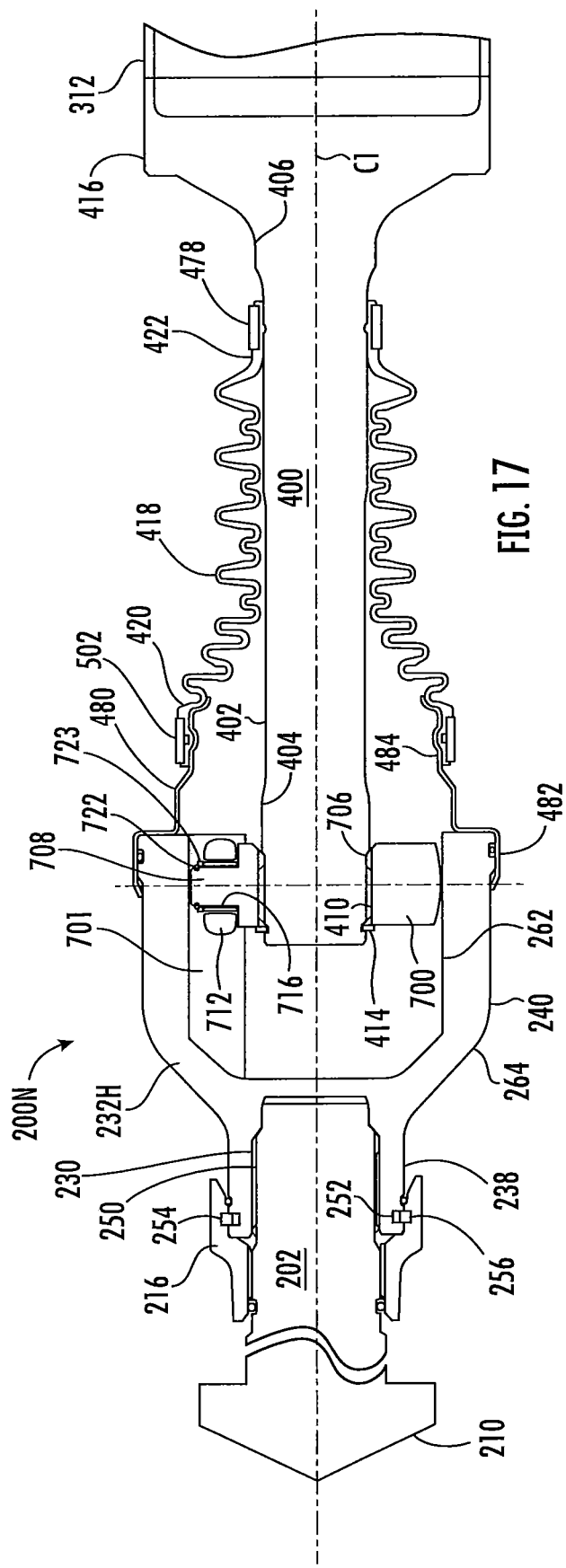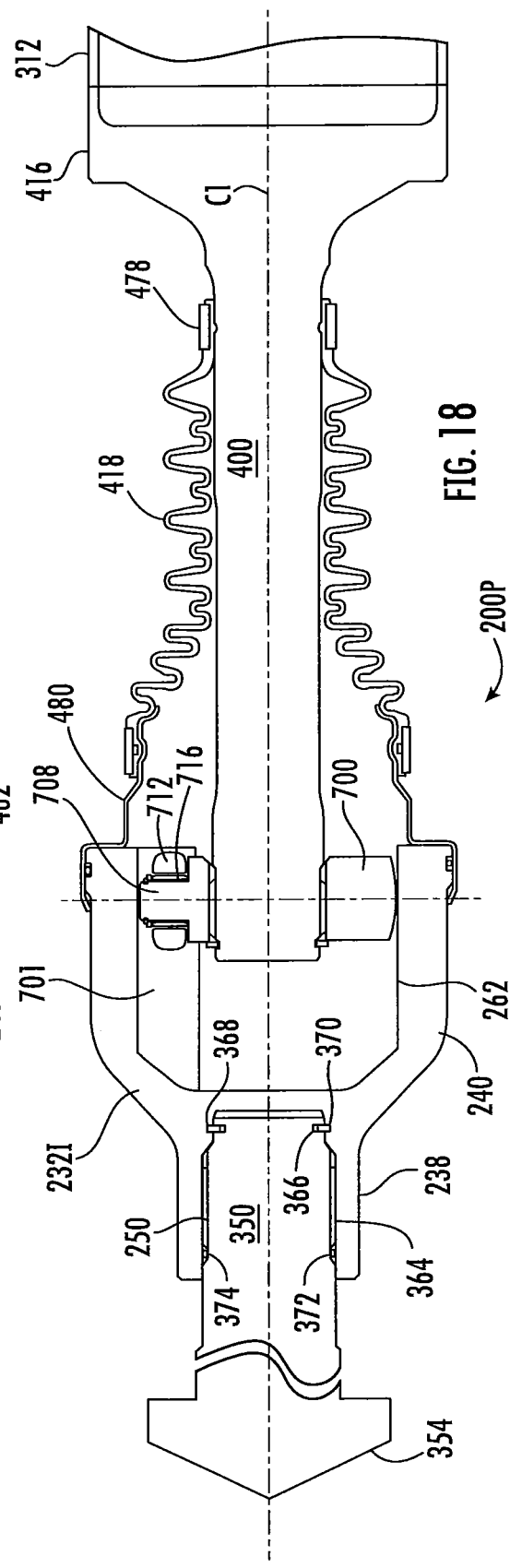

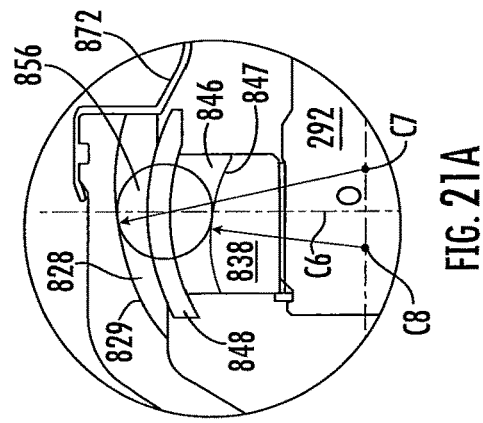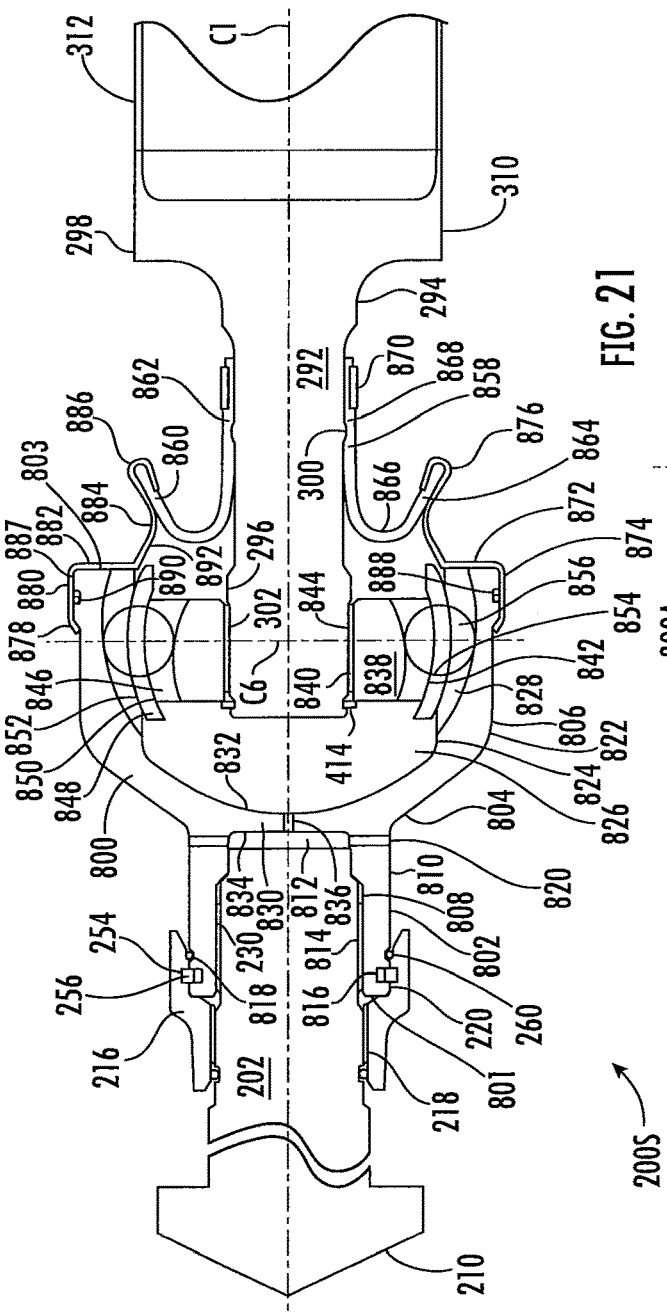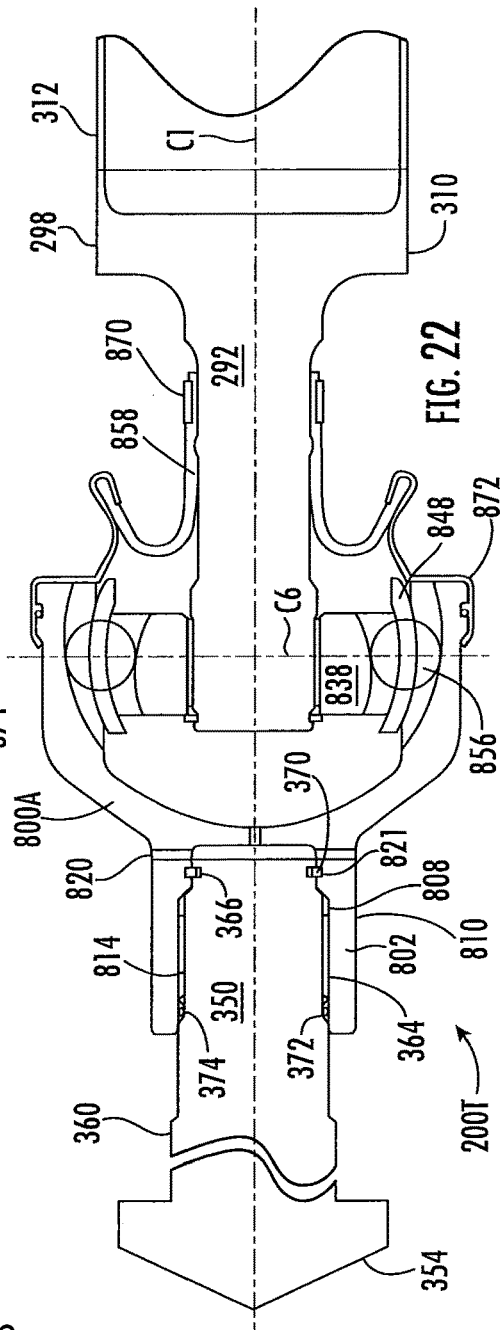

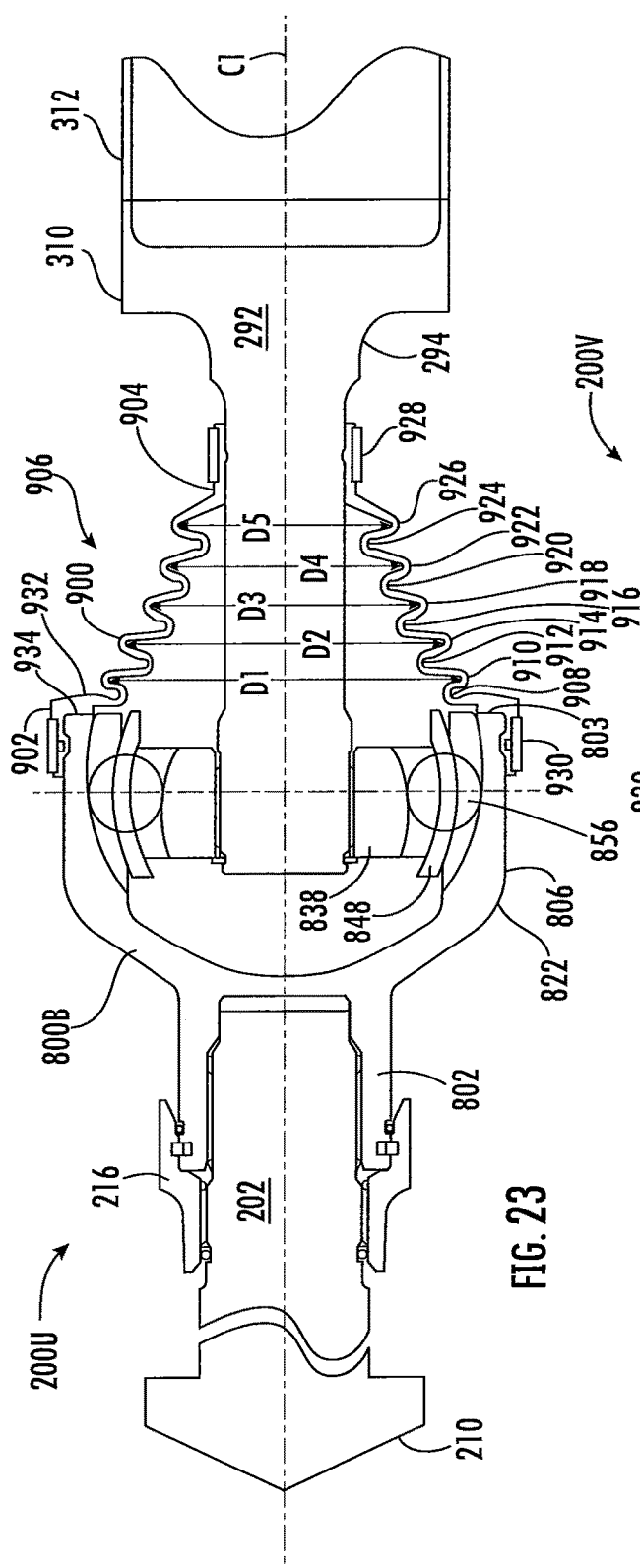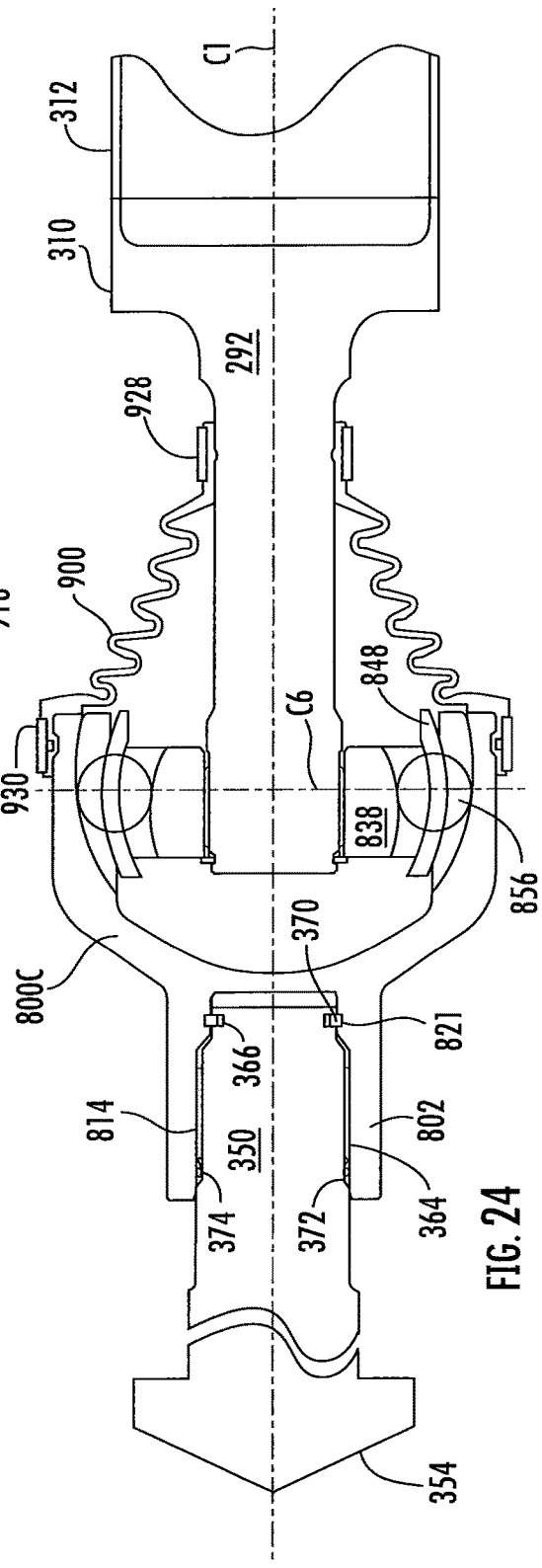

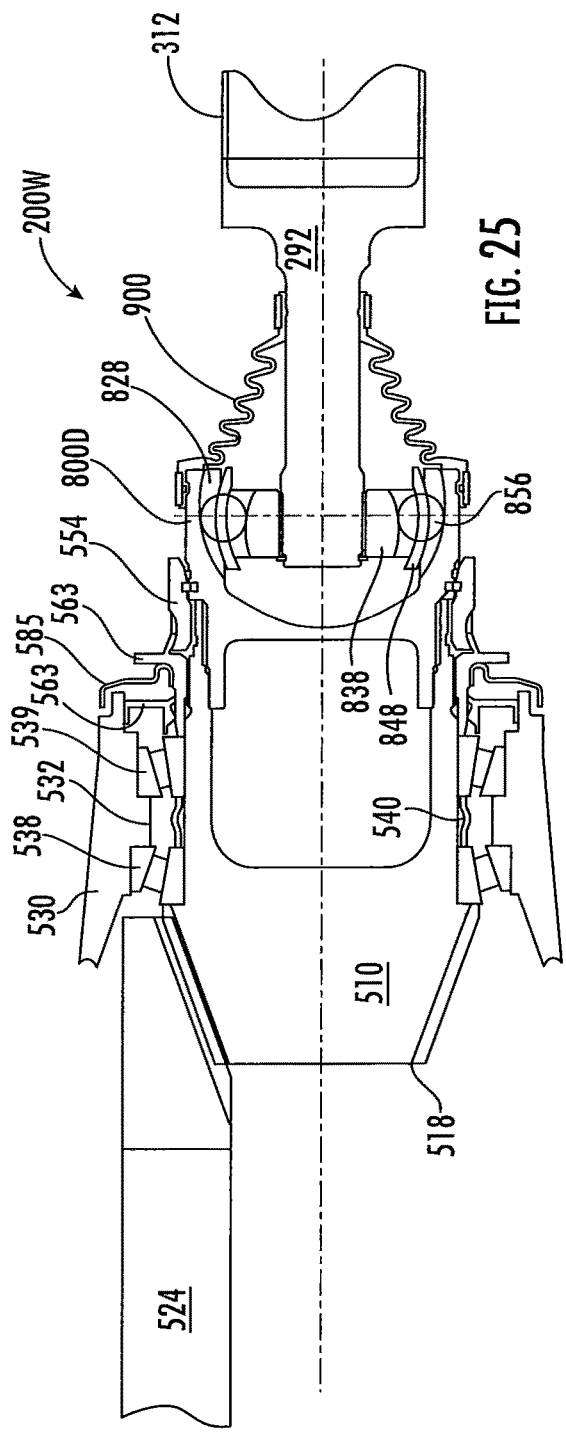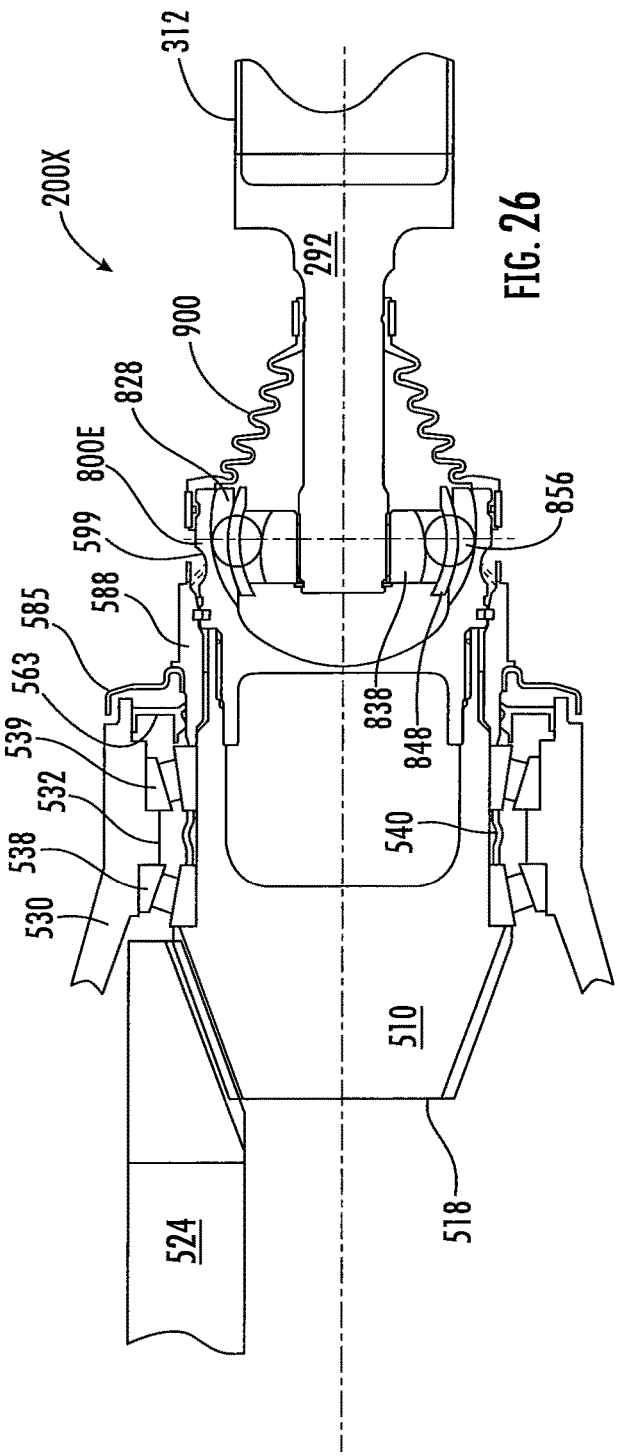

CONSTANT VELOCITY JOINT ASSEMBLY

CROSS-REFERENCE TO RELATED APPLICATIONS

This application is the National Stage Entry of International Application No. PCT/US2018/025200, filed Mar. 29, 2018, which claims the benefit of U.S. Provisional Patent Application No. 62/479,771, filed on Mar. 31, 2017, and U.S. Provisional Patent Application No. 62/508,658, filed on May 19, 2017, which are incorporated herein by reference in their entirety.

FIELD OF THE DISCLOSURE

The present disclosure relates to a constant velocity joint assembly.

BACKGROUND OF THE DISCLOSURE

Constant velocity joint assemblies allow rotational energy from one shaft having a variable angle, to be transferred through a vehicle drivetrain at a constant rotational speed without an appreciable increase in either friction or play. Many conventional constant velocity joint assemblies require the use of auxiliary components having tight tolerances that require precise machining processes. As a result, the auxiliary components increase the overall cost associated with manufacturing the components, they increase the overall cost associated with assembling the constant velocity joint assembly and the increase the overall weight of the constant velocity joint assembly. Additionally, the auxiliary components tend to lower the efficiency of the constant velocity joint to transmit the rotational energy generated by an engine throughout the vehicle drivetrain. It would therefore be advantageous to develop a constant velocity joint assembly that has an increased transmission efficiency, is cost efficient, is easy to assemble and is lightweight.

SUMMARY OF THE DISCLOSURE

A joint assembly. The joint assembly has a first joint member that is drivingly connected to a second joint member by one or more torque transfer elements. Drivingly connected to at least a portion of the second joint member is a stub shaft. An end of the stub shaft, opposite the second joint member, is drivingly connected to at least a portion of a second shaft. At least a portion of a second end portion of a first shaft is drivingly connected to at least a portion of a first end portion of the first joint member and at least a portion of a first end portion of the first shaft has a gear member having a plurality of gear teeth thereon.

According to an aspect of the disclosure, the joint assembly may be a direct pinion mount constant velocity joint assembly, direct pinion mount plunging cross groove sliding ball type constant velocity joint assembly, a direct pinion mount double offset plunging constant velocity joint assembly, a direct pinion mount tripod type constant velocity joint or a fixed direct pinion mount sliding ball type constant velocity joint assembly.

According to any one of the previous aspects of the disclosure, the first shaft may be a transmission output shaft, transfer case output shaft, a power transfer unit output shaft, a pinion shaft, a differential input shaft, a differential pinion shaft or an inter-axle differential pinion shaft.

According to any one of the previous aspects of the disclosure, the gear member may be a pinion gear, a differential pinion gear, an inter-axle differential pinion gear, a transmission output gear, a transfer case output gear or power transmission unit output gear.

According to any one of the previous aspects of the disclosure, a first end portion of the first joint member may have a first hollow portion and a second end portion of the first joint member may have a second hollow portion. At least a portion of the second joint member and said one or more torque transmission elements may be disposed within the second hollow portion of the first joint member.

According to any one of the previous aspects of the disclosure, the first joint member may further include a wall portion that separates the first hollow portion of the first joint member from the second hollow portion of the first joint member.

According to any one of the previous aspects of the disclosure, the first joint member may have a plurality of axially extending first joint member splines circumferentially extending along at least a portion of a first inner surface defining the first hollow portion of the first joint member. The plurality of axially extending first joint member splines may be complementary to and meshingly engaged with plurality of axially extending first shaft splines circumferentially extending along at least a portion of an outer surface of a second end portion of the first shaft. Circumferentially extending along at least a portion of the first inner surface of the first joint member is a first joint member snap-ring groove that is complementary to a first shaft snap-ring groove circumferentially extending along at least a portion of the outer surface of the second end portion of the first shaft. At least a portion of a snap-ring is received and/or retained within at least a portion the first shaft snap-ring groove and the first joint member snap-ring groove.

According to any one of the previous aspects of the disclosure, the joint assembly may include a first nut having a first inner surface and a second inner surface. A plurality of first nut threads circumferentially extend along at least a portion of the first inner surface of the first nut and are complementary to and meshingly engaged with a plurality of first shaft threads circumferentially extending along at least a portion of the outer surface of the second end portion of the first shaft. The first nut may further include a nut snap-ring grove circumferentially extends along at least a portion of the second inner surface of the first nut that is complementary to a first joint member snap-ring groove circumferentially extending along at least a portion of an outer surface of the first end portion of the first joint member.

According to any one of the previous aspects of the disclosure, at least a portion of the first end portion of the first joint member may include a reduced diameter portion having a plurality of axially extending first joint member splines. The plurality of axially extending first joint member splines are complementary to and meshingly engaged with a plurality of axially extending first shaft splines circumferentially extending from at least a portion of an inner surface defining a hollow interior portion in the second end portion of the first shaft.

The joint assembly may further include a first nut having an inner surface, an outer surface, a first end, a second end, a first end portion and a second end portion. A plurality of first nut threads circumferentially extend along at least a portion of the inner surface of the first nut and are complementary to a plurality of plurality of first shaft threads circumferentially extending along at least a portion of the outer surface of the second end portion of the second shaft. Additionally, a first nut snap-ring groove may circumferentially extend along at least a portion of the inner surface of the first nut. The a first nut snap-ring groove is complementary to a first joint member snap-ring groove circumferentially extending along at least a portion of the outer surface of an intermediate portion of the first joint member. One or more axially extending portions may circumferentially extend axially outboard from at least a portion of the second end of the first nut. The one or more axially extending portions of the first nut are plastically deformed radially inboard and are received and/or retained within at least a portion of one or more axially extending portion receiving grooves circumferentially extending along at least a portion of the outer surface of the intermediate portion of the first joint member.

According to any one of the previous aspects of the disclosure, the join assembly may include a first nut having an outer surface, a first inner surface and a second inner surface. Circumferentially extending along at least a portion of the first inner surface of the first nut is a plurality of first nut threads that are complementary to and meshingly engaged with a first plurality of first shaft threads circumferentially extending along at least a portion of the outer surface of the second end portion of the first shaft. A nut snap-ring groove circumferentially extends along at least a portion of the second inner surface of said first nut and is complementary to a first joint member snap-ring groove circumferentially along at least a portion of the outer surface of the intermediate portion of the first joint member. At least a portion of a nut snap-ring is received and/or retained within at least a portion of the nut snap-ring groove and the first joint member snap-ring groove.

The joint assembly may further include a second nut having an inner surface, an outer surface, a first end portion and a second end portion. Circumferentially extending along at least a portion of said inner surface of said second nut is a plurality of second nut threads that are complementary to and meshingly engaged with at least a portion of a second plurality of first shaft threads circumferentially extending along at least a portion of the outer surface of the second end portion of the first shaft. One or more axially extending portions circumferentially extend axially outboard form at least a portion of the second end portion of the second nut. At least a portion of the one or more axially extending portions are plastically deformed radially inboard and are received and/or retained within at least a portion of one or more axially extending portion receiving grooves circumferentially extending along at least a portion of the outer surface of the first nut.

According to any one of the previous aspects of the disclosure, the first nut and/or the second nut may apply an amount of pre-loading force onto a first bearing assembly and/or a second bearing assembly rotationally supporting at least a portion of the first shaft.

According to any one of the previous aspects of the disclosure, the snap-ring and/or the nut snap-ring may have a substantially polygonal shape defined by a plurality of interconnected substantially straight portions.

According to any one of the previous aspects of the disclosure, the snap-ring and/or the nut snap-ring may have a first plurality of substantially straight portions having a circumscribed radius R1 with a center that is offset from a Y-Y axis of the snap-ring and/or the nut snap-ring by a distance D1. Additionally, the snap-ring and/or the nut snap-ring may have a second plurality substantially straight portions having a circumscribed radius R2 with a center that is offset from the Y-Y axis of the snap-ring and/or the nut snap-ring by a distance D2. Furthermore, the snap-ring and/or said nut snap-ring may have a third plurality of straight portions having a circumscribed radius R3 with a center that is offset from an X-X axis of the snap-ring and/or the nut snap-ring by a distance D3.

According to any one of the previous aspects of the disclosure, the distance D1 may be substantially equal to the distance D2 of the snap-ring and/or the nut snap-ring.

According to any one of the previous aspects of the disclosure, the joint assembly further comprises a flexible boot.

According to any one of the previous aspects of the disclosure, the flexible boot may include a first end portion, a second end portion and a plurality of convolutions interposed between the first and second end portions of the flexible boot. The plurality of convolutions of the flexible boot may include, in axial order from the first end portion to the second end portion of the flexible boot, a first trough, a first crest, a second trough, a second crest, a third trough, a third crest, a fourth trough, a fourth crest, a fifth trough and/or a fifth crest. The first crest may have a diameter D1, the second crest may have a diameter D2, the third crest may have a diameter D3, the fourth crest may have a diameter D4 and the fifth crest may have a diameter D5.

According to any one of the previous aspects of the disclosure, the diameter D1 may be larger than the diameter D2, the diameter D2 may be larger than the diameter D3, the diameter D3 may be larger than the diameter D4 and the diameter D4 may be larger than the diameter D5.

According to any one of the previous aspects of the disclosure, the flexible boot may have a first end portion and a second end portion. The flexible boot may include, in axial order from the first end portion to the second end portion of the flexible boot, a first trough, a first crest, a second trough, a second crest, a third trough, a third crest, a fourth trough, a fourth crest, a fifth trough, a fifth crest, a sixth trough, a sixth crest, a seventh trough, a seventh crest, an eighth trough, an eighth crest, a ninth trough, a ninth crest, a tenth trough, a tenth crest, an eleventh trough and an eleventh crest. The third crest, the fourth trough, the fourth crest, the fifth trough and the fifth crest may form a first substantially W-shaped portion and the fifth crest, the sixth trough, the sixth crest, the seventh trough and the seventh crest may form a second substantially W-shaped portion. Additionally, the seventh crest, the eighth trough, the eighth crest, the ninth trough and the ninth crest may form a third substantially W-shaped portion and the ninth crest, the tenth trough, the tenth crest, the eleventh trough and the eleventh crest may form a fourth substantially W-shaped portion.

According to any one of the previous aspects of the disclosure, the joint assembly may include the use of a boot can having a first end portion and a second end portion. The boot can may include, in axial order from the first end portion to the second end portion of the boot can, a radially inward extending lip, a first substantially horizontal portion, a first radially inward extending portion, a second substantially horizontal portion, a second radially inward extending portion, a third substantially horizontal portion and/or a third radially inward extending portion. At least a portion of the third radially inward extending portion of the boot can may have a shape that is complementary to and is in direct contact with at least a portion of the first trough of the flexible boot.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 1 is a schematic top-plan view of a vehicle having one or more joints according to an embodiment of the disclosure;

FIG. 2 is a schematic top-plan view of another vehicle having one or more joints according to an embodiment of the disclosure;

FIG. 3 is a schematic side-view of a joint assembly according to an embodiment of the disclosure;

FIG. 3A is a schematic top-plan view of a snap-ring according to an embodiment of the disclosure;

FIG. 3B is a schematic top-plan view of a snap-ring according to an alternative embodiment of the disclosure;

FIG. 9 is a schematic side-view of the joint assembly illustrated in FIG. 3 according to an alternative embodiment of the disclosure;

FIG. 9A is a detailed schematic side-view of a portion of the joint assembly illustrated in FIG. 7 of the disclosure;

FIG. 10 is a schematic side-view of the joint assembly illustrated in FIGS. 3, 4, 9 and 9A according to an alternative embodiment of the disclosure;

FIG. 11 is a schematic side-view of the joint assembly illustrated in FIGS. 3, 5, 9 and 9A according to an alternative embodiment of the disclosure;

FIG. 12 is a schematic side-view of the joint assembly illustrated in FIGS. 3, 6 and 9-11 according to an alternative embodiment of the disclosure;

FIG. 13 is a schematic side-view of the joint assembly illustrated in FIGS. 3, 7 and 9 according to an alternative embodiment of the disclosure;

FIG. 14 is a schematic side-view of the joint assembly illustrated in FIGS. 3, 8 and 9 according to an alternative embodiment of the disclosure;

FIG. 15 is a schematic side-view of the joint assembly illustrated in FIG. 3 according to yet another embodiment of the disclosure;

FIG. 15A is a is a detailed schematic side-view of a portion of the joint assembly illustrated in FIG. 15 of the disclosure;

FIG. 16 is a schematic side-view of the joint assembly illustrated in FIGS. 3, 4, 10, 15 and 15A according to an alternative embodiment of the disclosure;

FIG. 17 is a schematic side-view of the joint assembly illustrated in FIGS. 3, 5, 11, 15 and 15A according to still yet another embodiment of the disclosure;

FIG. 18 is a schematic side-view of the joint assembly illustrated in FIGS. 3, 5, 12, 15, 15A and 16 according to an alternative embodiment of the disclosure;

FIG. 21 is a is a schematic side-view of the joint assembly illustrated in FIG. 3 according to an alternative embodiment of the disclosure;

FIG. 21A is a is a detailed schematic side-view of a portion of the joint assembly illustrated in FIG. 15 of the disclosure;

FIG. 22 is a schematic side-view of the joint assembly illustrated in FIGS. 3, 4, 21 and 21A according to an alternative embodiment of the disclosure;

FIG. 23 is a schematic side-view of the joint assembly illustrated in FIGS. 3, 21 and 21A according to an alternative embodiment of the disclosure;

FIG. 24 is a is a schematic side-view of the joint assembly illustrated in FIGS. 3, 4, 21, 21A, 22 and 23 according to an alternative embodiment of the disclosure;

FIG. 25 is a schematic side view of the joint assembly illustrated in FIGS. 3, 7, 13, 19, 21, 21A and 23 according to an alternative embodiment of the disclosure; and FIG. 26 is a schematic side view of the joint assembly illustrated in FIGS. 3, 7, 8, 13, 14, 19-21A, 23 and 25 according to an alternative embodiment of the disclosure.

DETAILED DESCRIPTION OF THE DISCLOSURE

Figure 4:
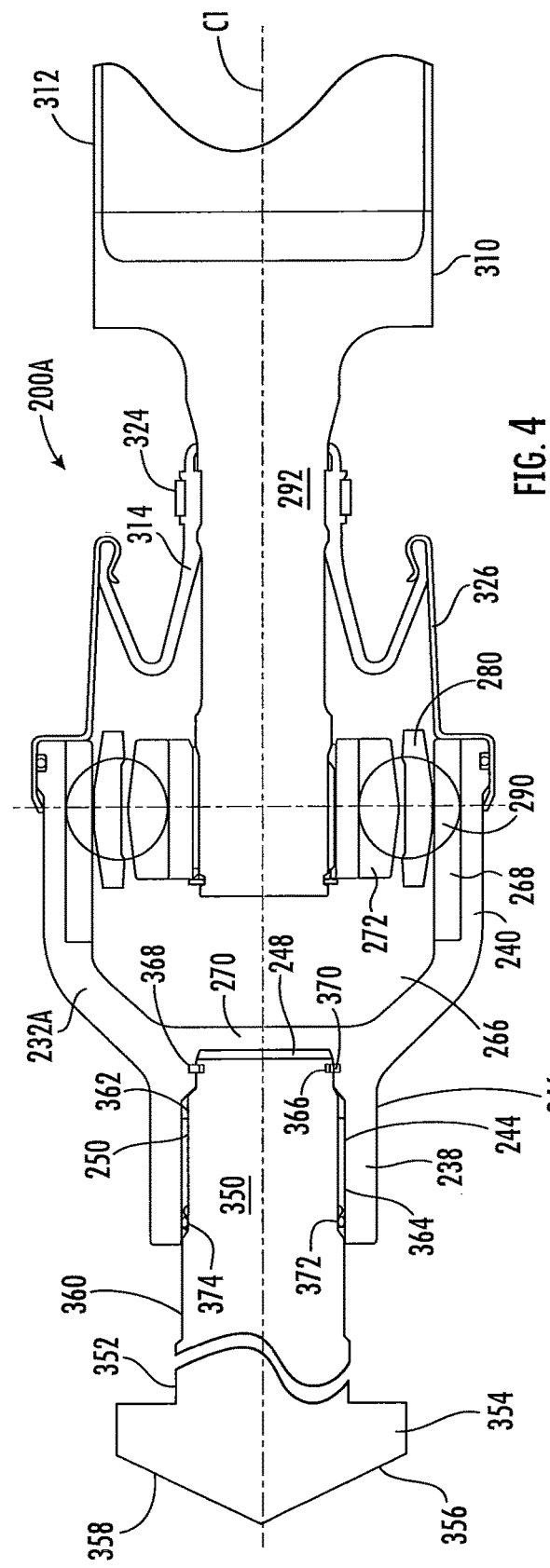
FIG. 4 is a schematic side-view of the joint assembly illustrated in FIG. 3 according to an alternative embodiment of the disclosure.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the joint assembly disclosed herein may be used in automotive, off-road vehicle, all-terrain vehicle, construction, structural, marine, aerospace, locomotive, military, machinery, robotic and/or consumer product applications. Additionally, as a non-limiting example, the joint assembly disclosed herein may also be used in passenger vehicle, electric vehicle, hybrid vehicle, commercial vehicle, autonomous vehicles, semi-autonomous vehicles and/or heavy vehicle applications.

FIG. 1 is a schematic top-plan view of a vehicle 2 having one or more joint assemblies according to an embodiment of the disclosure. The vehicle 2 has an engine 6 which is drivingly connected to an end of a transmission 8. A transmission output shaft 10 is drivingly connected to an end of the transmission 8 opposite the engine 6. The transmission 8 is a power management system which provides controlled application of the rotational power generated by the engine 6 by means of a gear box.

An end of the transmission output shaft 10 opposite the transmission 8 is drivingly connected to an end of a universal joint assembly 12. The universal joint assembly 12 is a joint or coupling assembly that allows rotational energy to be transferred between shafts having a variable axis. As a non-limiting example, the universal joint assembly 12 may be a universal coupling, a U-joint, a cardan joint, a double cardan joint, a Spicer joint, a Hardy Spicer Joint or a Hooke's joint.

Drivingly connected to an end of the universal joint assembly 12 opposite the transmission output shaft 10 is a shaft 14. As a non-limiting example, the shaft 14 may be a propeller shaft, a drive shaft, a cardan shaft, a double cardan shaft, a universal joint shaft, a universal coupling shaft, a Hooke's joint shaft or any other shaft in a vehicle drivetrain 16 that is used to transmit the rotational energy generated by the engine 6 to the drive wheel(s) of the vehicle 2. An end of the shaft 14 opposite the universal joint assembly 12 is drivingly connected to a constant velocity joint assembly 18 (herein after referred to as a "CVJ assembly"). The CVJ assembly 18 allows the rotational energy of the shaft 14 having a variable angle, to be transferred through the vehicle drivetrain 16 at a constant rotational speed without an appreciable increase in either friction or play.

Drivingly connected to an end of the CVJ assembly 18 opposite the shaft 14 is an end of a second shaft 20. Additionally, an end of the second shaft 20 opposite the CVJ assembly 18 is drivingly connected to a differential 22 of an axle system 24. The differential 22 is a set of gears that allows the outer drive wheel(s) of a wheeled vehicle 2 to rotate at a faster rate than the inner drive wheel(s). As it can be by referencing FIG. 1, the second shaft 20 drivingly connects the transmission 8 to the differential 22 of the axle system 24. According to an embodiment of the disclosure and as a non-limiting example, the second shaft 20 may be connected to the differential 22 through one or more of the following components (not shown), a drive shaft, a stub shaft, a coupling shaft, an axle system input shaft, a pinion gear shaft, a differential pinion gear shaft and/or a differential input shaft. The rotational power is transmitted through the axle system 24 as described in more detail below.

The axle system 24 further includes a first axle half shaft 26 and a second axle half shaft 28. The first axle half shaft 26 extends substantially perpendicular to the second shaft 20. A first end 30 of the first axle half shaft 26 is drivingly connected to a first axle wheel assembly 32 and a second end 34 of the first axle half shaft 26 is drivingly connected to a side of the differential 22.

The second axle half shaft 28 also extends substantially perpendicular to the second shaft 20. A first end 36 of the second axle half shaft 28 is drivingly connected to a second axle wheel assembly 38 and a second end 40 of the second axle half shaft 28 is drivingly connected to a side of the differential 22 opposite the first axle half shaft 26.

FIG. 2 is a schematic top-plan view of another vehicle 100 having one or more joint assemblies according to an embodiment of the disclosure. The vehicle 100 has an engine 102 which is drivingly connected to an end of a transmission 104. A transmission output shaft 106 is drivingly connected to an end of the transmission 104 opposite the engine 102. The transmission 104 is a power management system which provides controlled application of the rotational power generated by the engine 102 by means of a gear box.

An end of the transmission output shaft 106 opposite the transmission 104 is drivingly connected to an end of a universal joint assembly 108. The universal joint assembly 108 is a joint or coupling assembly that allows rotational energy to be transferred between shafts having a variable axis. In a non-limiting example, the universal joint assembly 108 may be a universal coupling, a U-joint, a cardan joint, a double cardan joint, a Spicer joint, a Hardy Spicer Joint or a Hooke's joint.

Drivingly connected to an end of the universal joint assembly 108 opposite the transmission output shaft 106 is a shaft 110. As a non-limiting example, the shaft 110 may be a propeller shaft, a drive shaft, a cardan shaft, a double cardan shaft, a universal joint shaft, a universal coupling shaft, a Hooke's joint shaft or any other shaft in a vehicle drivetrain 112 that is used to transmit the rotational energy generated by the engine 102 to the drive wheel(s) of the vehicle 100. An end of the shaft 110 opposite the universal joint assembly 108 is drivingly connected to a CVJ assembly 114. The CVJ assembly 114 allows the rotational energy of the shaft 110 having a variable angle, to be transferred through the vehicle drivetrain 112 at a constant rotational speed without an appreciable increase in either friction or play.

Drivingly connected to an end of the CVJ assembly 114 opposite the shaft 110 is an end of a second shaft 116. Additionally, an end of the second shaft 116 opposite the CVJ assembly 114 is drivingly connected to an inter-axle differential 118 of a forward tandem axle system 120. The inter-axle differential 118 is a device that divides the rotational power generated by the engine 102 between the axles in the vehicle 100. As it can be seen by referencing FIG. 2 of the disclosure, the second shaft 116 drivingly connects the transmission 104 to the inter-axle differential 118 of the forward tandem axle system 120. According to an embodiment of the disclosure and as a non-limiting example, the second shaft 116 may be connected to the inter-axle differential 118 through one or more of the following components (not shown), a drive shaft, a stub shaft, a coupling shaft, a forward tandem axle system input shaft, a pinion gear shaft, an inter-axle differential pinion gear shaft and/or an inter-axle differential input shaft. The rotational power is transmitted through the forward tandem axle system 120 as described in more detail below.

As illustrated in FIG. 2, the inter-axle differential 118 is drivingly connected to a forward tandem axle differential 122 and a forward tandem axle system output shaft 124. The forward tandem axle differential 122 is a set of gears that allows the outer drive wheel(s) of a wheeled vehicle 100 to rotate at a faster rate than the inner drive wheel(s).

The forward tandem axle system 120 further includes a first forward tandem axle half shaft 126 and a second forward tandem axle half shaft 128. The first forward tandem axle half shaft 130 extends substantially perpendicular to the second shaft 120. A first end 130 of the first forward tandem axle half shaft 126 is drivingly connected to a first forward tandem axle wheel assembly 132 and a second end 134 of the first forward tandem axle half shaft 126 is drivingly connected to a side of the forward tandem axle differential 122.

Extending substantially perpendicularly with the second shaft 116 is the second forward tandem axle half shaft 128. A first end 136 of the second forward tandem axle half shaft 128 is drivingly connected to a second forward tandem axle wheel assembly 138 and a second end 140 of the second forward tandem axle half shaft 128 is drivingly connected to a side of the forward tandem axle differential 122 opposite the first forward tandem axle half shaft 126.

One end of the forward tandem axle system output shaft 124 is drivingly connected to a side of the inter-axle differential 118 opposite the second shaft 116. Drivingly connected to an end of the forward tandem axle system output shaft 124 opposite the inter-axle differential 118 is a second universal joint assembly 142. The second universal joint assembly 142 is a joint or coupling assembly that allows rotational energy to be transferred between shafts having a variable axis. As a non-limiting example, the second universal joint assembly 142 may be a universal coupling, a U-joint, a cardan joint, a double cardan joint, a Spicer joint, a Hardy Spicer Joint or a Hooke's joint.

Drivingly connected to an end of the second universal joint assembly 142 opposite the forward tandem axle system output shaft 124 is a third shaft 144. As a non-limiting example, the third shaft 144 may be a propeller shaft, a drive shaft, a cardan shaft, a double cardan shaft, a universal joint shaft, a universal coupling shaft, a Hooke's joint shaft or any other shaft in the vehicle drivetrain 112 that is used to transmit the rotational energy generated by the engine 102 to the drive wheel(s) of the vehicle 100. An end of the third shaft 144 opposite the second universal joint assembly 142 is drivingly connected to a second CVJ assembly 146. The second CVJ assembly 146 allows the rotational energy of the third shaft 144 having a variable angle, to be transferred through the vehicle drivetrain 112 at a constant rotational speed without an appreciable increase in either friction or play.

Drivingly connected to an end of the second CVJ assembly 146 opposite the third shaft 144 is an end of a fourth shaft 148. An end of the fourth shaft 148 opposite the second CVJ assembly 146 is drivingly connected to a rear tandem axle differential 150 of a rear tandem axle system 152. The rear tandem axle differential 150 is a set of gears that allows the outer drive wheel(s) of a wheeled vehicle 100 to rotate at a faster rate than the inner drive wheel(s). As it can be by referencing FIG. 2 of the disclosure, the fourth shaft 148 drivingly connects the inter-axle differential 122 to the rear tandem axle differential 150 of the rear tandem axle system 152. According to an embodiment of the disclosure and as a non-limiting example, the fourth shaft 148 may be connected to the rear tandem axle differential 150 through one or more of the following components (not shown), a drive shaft, a stub shaft, a coupling shaft, a rear tandem axle system input shaft, a pinion gear shaft, a rear tandem axle differential pinion gear shaft and/or a rear tandem axle differential input shaft. The rotational power is transmitted through the rear tandem axle system 152 as described in more detail below.

The rear tandem axle system 152 further includes a first rear tandem axle half shaft 154 and a second rear tandem axle half shaft 156. The first rear tandem axle half shaft 154 extends substantially perpendicular to the fourth shaft 148. A first end 158 of the first rear tandem axle half shaft 154 is drivingly connected to a first rear tandem axle wheel assembly 160 and a second end 162 of the first rear tandem axle half shaft 154 is drivingly connected to a side of the rear tandem axle differential 150.

Extending substantially perpendicularly with the fourth shaft 148 is the second rear tandem axle half shaft 156. A first end 164 of the second rear tandem axle half shaft 156 is drivingly connected to a second rear tandem axle wheel assembly 166 and a second end 168 of the second rear tandem axle half shaft 156 is drivingly connected to a side of the rear tandem axle differential 150 opposite the first rear tandem axle half shaft 154.

FIGS. 3-3B provide a schematic illustration of a joint assembly 200 according to an embodiment of the disclosure. According to an embodiment of the disclosure and as a non-limiting example, the joint assembly 200 is a constant velocity joint assembly or a direct pinion mount constant velocity joint assembly. In accordance with an alternative embodiment of the disclosure and as a non-limiting example, the joint assembly 200 illustrated in FIG. 3 is a direct pinion mount plunging cross groove sliding ball type constant velocity joint with plunging and articulation capabilities. The joint assembly 200 includes a first shaft 202 having a first end portion 204, a second end portion 206 and an outer surface 208. As a non-limiting example, the first shaft 202 may be a transmission output shaft, a transfer case output shaft, a power transfer unit output shaft, a propeller shaft, a drive shaft, a cardan shaft, a double cardan shaft, a universal joint shaft, a universal coupling shaft, a Hooke's joint shaft, a pinion shaft, a differential input shaft, a differential pinion shaft, a front axle input shaft, a front axle differential pinion shaft, a forward tandem axle input shaft, a forward tandem axle differential output shaft, a rear tandem axle input shaft, a rear tandem axle differential pinion shaft or an inter-axle differential pinion shaft.

Integrally connected to the first end portion 204 of the first shaft 202 is a gear member 210 having a plurality of gear teeth 212 circumferentially extending from at least a portion of an outer surface 214 of the gear member 210. According to an embodiment of the disclosure and as a non-limiting example, the gear member 210 may be integrally formed as part of the first end portion 204 of the first shaft 202. In accordance with an alternative embodiment of the disclosure and as a non-limiting example (not shown), the gear member may be drivingly connected to the first end portion of the shaft by using one or more welds, one or more mechanical fasteners, one or more adhesives, a splined connection and/or a threaded connection. It is within the scope of this disclosure and as a non-limiting example that the gear member 210 may be a pinion gear, a differential pinion gear, an inter-axle differential pinion gear, a transmission output gear, a transfer case output gear or power transmission unit output gear.

Disposed radially outboard from the first shaft 202 and extending co-axially with the first shaft 202 is a first nut 216 having a first inner surface 218 and a second inner surface 220. As illustrated in FIG. 3 of the disclosure, the first inner surface 218 of the first nut 216 has an inner diameter that is smaller than the inner diameter of the second inner surface 220 of the first nut 216. The first nut 216 aids in ensuring that the first shaft 202 remains drivingly connected to the first joint member 232 by axially restraining the first shaft 202 relative to the first joint member 232.

Circumferentially extending along the first inner surface 218 of the first nut 216 is a plurality of first nut threads 222. The plurality of first nut threads 222 of the first nut 216 are complementary to and meshingly engaged with at least a portion of a plurality of first shaft threads 224 circumferentially extending from at least a portion of the outer surface 208 of the second end portion 206 of the first shaft 202.

Disposed axially outboard from and adjacent to the plurality of first shaft threads 224 on the outer surface 208 of the second end portion 206 of the first shaft 202 is an O-ring groove 226. As illustrated in FIG. 3 of the disclosure, the O-ring groove 226 circumferentially extends along at least a portion of the outer surface 208 of the second end portion 206 of the first shaft 202 of the joint assembly 200.

At least a portion of an O-ring 228 is disposed within the O-ring groove on the outer surface 208 of the second end portion 206 of the first shaft 202. The O-ring 228 creates a seal between the first inner surface 218 of the first nut 216 and the outer surface 208 of the first shaft 202. The sealing engagement between the first inner surface 218 of the first nut 216 and the outer surface 208 of the first shaft 202 prevents the migration of dirt, debris and/or moisture into the plurality of threads 224 and 222 thereby improving the overall life and durability of the joint assembly 200.

Disposed axially inboard from the O-ring groove 226 and the plurality of first shaft threads 224 on the outer surface 208 of the first shaft 202 is a plurality of axially extending first shaft splines 230. The plurality of axially extending first shaft splines 230 circumferentially extend from at least a portion of the outer surface 208 of the second end portion 206 of the first shaft 202.

As illustrated in FIG. 3 of the disclosure, disposed at least partially radially outboard from the second end portion 206 of the first shaft 202 is a first joint member 232 of the joint assembly 200. The first joint member 232 of the joint assembly 200 has a first end 234, a second end 236, a first end portion 238, a second end portion 240 and an intermediate portion 242 disposed between the first end portion 238 and the second end portion 240 of the first joint member 232. At least a portion of the first end portion 238 of the first joint member 232 of the joint assembly 200 has an inner surface 244 and an outer surface 246 defining a first hollow portion 248 therein. In accordance with an embodiment of the disclosure and as a non-limiting example, the first hollow portion 248 of the first end portion 238 of the first joint member 232 is substantially cylindrical in shape.

Circumferentially extending from at least a portion of the inner surface 244 of the first end portion 238 of the first joint member 232 of the joint assembly 200 is a plurality of axially extending first joint member splines 250. As illustrated in FIG. 3 of the disclosure, the plurality of axially extending first joint member splines 250 are complementary to and meshingly engaged with the plurality of axially extending first shaft splines 230 on the outer surface 208 of the second end portion 206 of the first shaft 202. The plurality of axially extending splines 230 and 250 drivingly connects the first joint member 232 to the first shaft 202 of the joint assembly 200.

Circumferentially extending along at least a portion of the outer surface 246 of the first end portion 238 of the first joint member 232 is a first joint member snap-ring groove 252. As illustrated in FIG. 3 of the disclosure, at least a portion of the second inner surface 220 of the first nut 216 is disposed radially outboard from and extends co-axially with the first end portion 238 of the first joint member 232 of the joint assembly 200. In accordance with this embodiment of the disclosure, the first joint member snap-ring groove 252 is complementary to a nut snap-ring grove 254 circumferentially extending along at least a portion of the second inner surface 220 of the first nut 216. At least a portion of a nut snap-ring 256 is disposed within the first joint member snap-ring groove 252 and the nut snap-ring groove 254. The nut snap-ring 256 aids in axially restraining the first nut 216 to the first joint member 232 and the first joint member 232 to the first shaft 202 of the joint assembly 200.

In accordance with an embodiment of the disclosure and as a non-limiting example, the nut snap-ring 256 may have a substantially polygonal shape being defined by a chain of substantially straight line segments. As best seen in FIG. 3A of the disclosure, the substantially polygonal nut snap-ring 256 has a first end 257 that is axially disposed from a second end 259 of the nut snap-ring 256. According to the embodiment of the disclosure illustrated in FIG. 3A and as a non-limiting example, the nut snap-ring 256 includes, in order, from the first end 257 to the second end 259 a first substantially straight portion 261, a second substantially straight portion 263, a third substantially straight portion 265, a fourth substantially straight portion 267, a fifth substantially straight portion 269, a sixth substantially straight portion 271, a seventh substantially straight portion 273, an eighth substantially straight portion 275, a ninth substantially straight portion 277, a tenth substantially straight portion 279 and an eleventh substantially straight portion 281.

According to an alternative embodiment of the disclosure and as a non-limiting example, the nut snap-ring 256A may have a substantially polygonal shape being defined by a chain of substantially straight line segments. As best seen in FIG. 3B of the disclosure, the substantially polygonal nut snap-ring 256A has an inner surface 283, an outer surface 285 and a first end 287 that is axially disposed from a second end 289 of the nut snap-ring 256A. According to an embodiment of the disclosure and as a non-limiting example, the nut snap-ring 256A may have a substantially polygonal shape defined by a plurality of interconnected substantially straight portions. In accordance with the embodiment of the disclosure illustrated in FIG. 3B and as a non-limiting example, the nut snap-ring 256A includes, in order, from the first end 287 to the second end 289 a first substantially straight portion 301, a second substantially straight portion 303, a third substantially straight portion 305, a fourth substantially straight portion 307, a fifth substantially straight portion 309, a sixth substantially straight portion 311, a seventh substantially straight portion 313, an eighth substantially straight portion 315, a ninth substantially straight portion 317, a tenth substantially straight portion 319, an eleventh substantially straight portion 321, a twelfth substantially straight portion 323, a thirteenth substantially straight portion 325, a fourteenth substantially straight portion 327, a fifteenth substantially straight portion 329, a sixteenth substantially straight portion 331, a seventeenth substantially straight portion 333, an eighteenth substantially straight portion 335, a nineteenth substantially straight portion 337, a twentieth substantially straight portion 339, a twenty first substantially straight portion 341, a twenty second substantially straight portion 343 and a twenty third substantially straight portion 345.

As illustrated in FIG. 3B of the disclosure and as a non-limiting example, the inner surface 383 of the first plurality of substantially straight portions 301, 303, 305, 307, 309, 311 of the nut snap-ring 256A may have a circumscribed radius R1 having a center which is offset from the Y-Y axis by a distance D1. Additionally, as illustrated in FIG. 3B of the disclosure and as a non-limiting example, the second plurality of substantially straight portions 335, 337, 339, 341, 343 and 345 may have a circumscribed radius R2 having a center which is offset from the Y-Y axis by a distance D2. In accordance with an embodiment of the disclosure and as a non-limiting example, the distance D1 is substantially equal to the distance D2. It is therefore within the scope of this disclosure that the circumscribed radius R1 may be substantially equal to the circumscribed radius R2 of the nut snap-ring 256A. Furthermore, as illustrated in FIG. 3B of the disclosure, the third plurality of substantially straight portions 313, 315, 317, 319, 321, 323, 325, 327, 329, 331 and 333 have a circumscribed radius R3 having a center which is offset from the X-X axis by a distance D3.

Disposed axially inboard from the first joint member snap-ring groove 252 is a first O-ring groove 258. The first O-ring groove 258 circumferentially extends along at least a portion of the outer surface 246 of the first end portion 238 of the first joint member 232. At least a portion of an O-ring 260 is disposed within the first O-ring groove 258. The O-ring 260 creates a seal between the second inner surface 220 of the first nut 216 and the outer surface 246 of the first end portion 238 of the first joint member 232. The sealing engagement between second inner surface 220 of the first nut 216 and the outer surface 246 of the first joint member 232 prevents the migration of dirt, debris and/or moisture into the joint assembly 200 thereby improving the overall life and durability of the joint assembly 200.

As illustrated in FIG. 3 of the disclosure, the second end portion 240 of the first joint member 232 of the joint assembly 200 has an inner surface 262 and an outer surface 264 defining a second hollow portion 266 therein. In accordance with an embodiment of the disclosure and as a non-limiting example, the outer surface 264 of the second end portion 240 of the first joint member 232 has a larger outer diameter than the outer diameter of the outer surface 246 of the first end portion 238 of the first joint member 232.

Circumferentially extending along at least a portion of the inner surface 262 of the second end portion 240 of first joint member 232 is one or more first joint member grooves 268. According to an embodiment of the disclosure and as a non-limiting example, the one or more first joint member grooves 268 are slanted at an angle or skew angle θ with respect to a centerline C1 of the joint assembly 200.

According to an embodiment of the disclosure, the intermediate portion 242 of the first joint member 232 of the joint assembly 200 includes a wall portion 270. The wall portion 270 separates the first hollow portion 248 of the first end portion 238 of the first joint member 232 from the second hollow portion 266 of the second end portion 240 of the first joint member 232. In accordance with an alternative embodiment of the disclosure (not shown), the wall portion includes one or more axially extending wall portion venting apertures that allow the excess pressure within the joint assembly to be released to the hollow portion of the first end portion of the first joint member. Additionally, in accordance with this embodiment of the disclosure (not shown), the excess pressure front within the joint assembly is released to the atmosphere via one or more radially extending venting apertures extending from the inner surface to the outer surface of the first end portion of the first joint member.

Disposed radially inboard from the second end portion 240 of the first joint member 232 of the joint assembly 200 is a second joint member 272 having an inner surface 274 and an outer surface 276. Circumferentially extending along at least a portion of the outer surface 276 of the second joint member 272 of the joint assembly 200 is one or more second joint member grooves 278 that are complementary to the one or more first joint member grooves 268. As a result, one or more of the one or more second joint member grooves 278 are slanted at an angle or skew angle θ with respect to a centerline C1 of the joint assembly 200.

Interposed between the second joint member 272 and the second end portion 240 of the first joint member 232 is a cage 280 having an inner surface 282 and an outer surface 284 defining a hollow portion 286 therein. As illustrated in FIG. 3 of the disclosure, the second joint member 272 of the joint assembly 200 is disposed within the hollow portion 286 of the cage 280. Extending from the inner surface 282 to the outer surface 284 of the cage 280 is one or more torque transfer element openings 288.

Drivingly connecting the second joint member 272 to the second end portion 240 of the first joint member 232 is one or more torque transfer elements 290. As illustrated in FIG. 3 of the disclosure, at least a portion of the one or more torque transfer elements 290 are disposed within the one or more first joint member grooves 268, the one or more second joint member grooves 278 and the one or more torque transfer element openings 288. As a non-limiting example, the one or more torque transfer elements 290 is one or more ball bearings.

In accordance with the embodiment of the disclosure illustrated in FIG. 3 and as a non-limiting example, when the joint assembly 200 is assembled, the second joint member 272, the cage 280 and the one or torque transfer elements 290 have a centerline C2 that is substantially the same.

Extending co-axially with the second joint member 272 of the joint assembly 200 is a stub shaft 292 having an outer surface 294, a first end portion 296, a second end portion 298 and an intermediate portion 300 disposed between the first and second end portions 296 and 298 of the stub shaft 292. Circumferentially extending from at least a portion of the outer surface 294 of the first end portion 296 of the stub shaft 292 is a plurality of axially extending stub shaft splines 302. The plurality of axially extending stub shaft splines 302 are complementary to and meshingly engaged with a plurality of axially extending splines 304 circumferentially extending from at least a portion of the inner surface 274 of the second joint member 272 of the joint assembly 200.

Disposed adjacent to and axially inboard from the plurality of axially extending stub shaft splines 302 is a stub shaft snap-ring groove 306. As illustrated in FIG. 3 of the disclosure, the stub shaft snap-ring groove 306 circumferentially extends along at least a portion of the outer surface 294 of the first end portion 296 of the stub shaft 292. At least a portion of a stub shaft snap-ring 308 is disposed within the stub shaft snap-ring groove 306 on the first end portion 296 of the stub shaft 292. The stub shaft snap-ring 308 axially restrains the stub shaft 292 to the second joint member 272 of the joint assembly 200.

At least a portion of the second end portion 298 of the stub shaft 292 has an increased diameter portion 310 that is integrally connected to an end of a second shaft 312. According to an embodiment of the disclosure and as a non-limiting example, the increased diameter portion 310 of the second end portion 298 of the stub shaft 292 is integrally connected to the end of the second shaft 312 by using one or more welds, one or more mechanical fasteners, a splined connection or a threaded connection. In accordance with an embodiment of the disclosure and as a non-limiting example, the second shaft 312 may be a propeller shaft, a drive shaft, a cardan shaft, a double cardan shaft, a universal joint shaft, a universal coupling shaft or a Hooke's joint shaft.

A flexible boot 314 having a first end portion 316 and a second end portion 318 is attached to the outer surface 294 of the stub shaft 292 and the outer surface 264 of the second end portion 240 of the first joint member 232. As illustrated in FIG. 3 of the disclosure and as a non-limiting example, the flexible boot 314 has a substantially V-shaped cross-section having an axially inboard extending boot leg 320 and an axially outboard extending boot leg 322. The first end portion 316 of the flexible boot 314 is connected to an end of the axially inboard extending boot leg 320 and an end of the axially inboard extending boot leg 320 opposite the first end portion 316 of the flexible boot 314 is connected to an end of the axially outboard extending boot leg 322. An end of the axially outboard extending boot leg 322 opposite the axially inboard extending boot leg 320 is connected to the second end portion 318 of the flexible boot 314. The flexible boot 314 provides a flexible seal for the joint assembly 200 preventing the migration of dirt, debris and/or moisture from the external environment into the joint assembly 200. As a non-limiting example, the flexible boot 314 is made of a polymeric material, a rubber material, an elastomeric material, a thermoplastic material or a combination thereof.

In accordance with an embodiment of the disclosure and as a non-limiting example, at least a portion of the second end portion 318 of the flexible boot 314 is attached to the outer surface 292 of the intermediate portion 300 of the stub shaft 292 by using a boot clamp 324.

The first end portion 316 of the flexible boot 314 is connected to the outer surface 264 of the second end portion 240 of the first joint member 232 by using a boot can 326 having a first end portion 328 and a second end portion 330. As illustrated in FIG. 3 of the disclosure, at least a portion of the first end portion 328 of the boot can 326 is attached to the outer surface 264 of the second end portion 240 of the first joint member 232. Additionally, at least a portion of the second end portion 330 of the boot can 326 is attached to at least a portion of the first end portion 316 of the flexible boot 314. As a non-limiting example, the boot can 326 is made of substantially rigid material such as a metallic material, an aluminium alloy, a steel alloy, a carbon fibre material or a composite material.

In accordance with the embodiment illustrated in FIG. 3 of the disclosure, the boot can 326 includes, in axial order, a radially inward extending lip 332, a first substantially horizontal portion 334, a radially inward extending portion 336, a second substantially horizontal portion 338 and a substantially hook-shaped portion 340. According to this embodiment of the disclosure, the radially inward extending portion 336 of the boot can 326 extends substantially vertically from an end of the first substantially horizontal portion 334 opposite the radially inward extending lip 332 to an end of the second substantially horizontal portion 338 opposite the substantially hook-shaped portion 340. Additionally, at least a portion of the radially inward extending portion 336 of the boot can 326 is in direct contact with at least a portion of the second end 236 of the first joint member 232 of the joint assembly 200. The radially inward extending portion 336 of the boot can 326 acts as a stopper to prevent the boot can 326 from extending along the outer surface 264 of the second end portion 240 of the first joint member 232 beyond a pre-determined distance.

Extending radially outboard from at least a portion of the outer surface 264 of the second end portion 240 of the first joint member 232 is a protruding portion 341. According to an embodiment of the disclosure and as a non-limiting example, the protruding portion 341 is disposed adjacent to and axially inboard from the second end 236 of the first joint member 232 of the joint assembly 200. As illustrated in FIG. 3 of the disclosure, at least a portion of the first substantially horizontal portion 334 of the boot can 326 is in direct contact with at least a portion of the protruding portion 341 on the second end portion 240 of the first joint member 232 of the joint assembly 200. The protruding portion 341 and the radially inward extending lip 332 are used to ensure that the boot can 326 is securely attached to the second end portion 240 of the first joint member 232 so the boot can 326 does not become prematurely detached from the second end portion 240 of the first joint member 232.

Circumferentially extending along at least a portion of the outer surface 264 of the protruding portion 341 on the second end portion 240 of the first joint member 232 is a second O-ring groove 342. In accordance with this embodiment of the disclosure, at least a portion of a second O-ring 344 is disposed within the second O-ring groove 342. The second O-ring 344 provides a seal between the outer surface 264 of the second end portion 240 of the first joint member 232 and an inner surface 346 of the first substantially horizontal portion 334 of the boot can 326. The sealing engagement between the outer surface 264 of the second end portion 240 of the first joint member 232 and the inner surface 346 of the boot can 326 aids in preventing the migration of dirt, debris and/or moisture into the joint assembly thereby improving the overall life and durability of the joint assembly 200.

Finally, at least a portion of the first end portion 316 of the flexible boot 314 is retained within the substantially hook-shaped portion 340 of the boot can 326.

FIG. 4 is a schematic side-view of a joint assembly 200A according to an alternative embodiment of the disclosure. The joint assembly 200A illustrated in FIG. 4 is the same as the joint assembly 200 illustrated in FIG. 3-3B, except where specifically noted below. In accordance with the embodiment of the disclosure illustrated in FIG. 4, the joint assembly 200A does not include the use of the first nut 216 and the nut snap-ring 256 or 256A disposed within disposed within the first joint member snap-ring groove 252 and the nut snap-ring grove 254 in order to axially restrain the first shaft to and end of the first joint member 232.

In accordance with this embodiment of the disclosure, the joint assembly 200A a first shaft 350 having a first end portion 352, a second end portion 362 and an outer surface 360. As a non-limiting example, the first shaft 350 may be a transmission output shaft, a transfer case output shaft, a power transfer unit output shaft, a propeller shaft, a drive shaft, a cardan shaft, a double cardan shaft, a universal joint shaft, a universal coupling shaft, a Hooke's joint shaft, a pinion shaft, a differential input shaft, a differential pinion shaft, a front axle input shaft, a front axle differential pinion shaft, a forward tandem axle input shaft, a forward tandem axle differential output shaft, a rear tandem axle input shaft, a rear tandem axle differential pinion shaft or an inter-axle differential pinion shaft.

Integrally connected at least a portion of the first end portion 352 of the first shaft 350 is a gear member 354 having a plurality of gear teeth 356 circumferentially extending from at least a portion of an outer surface 358 of the gear member 354. According to an embodiment of the disclosure and as a non-limiting example, the gear member 354 may be integrally formed as part of the first end portion 352 of the first shaft 350. In accordance with an alternative embodiment of the disclosure and as a non-limiting example (not shown), the gear member may be drivingly connected to the first end portion of the shaft by using one or more welds, one or more mechanical fasteners, one or more adhesives, a splined connection and/or a threaded connection. It is within the scope of this disclosure and as a non-limiting example that the gear member 354 may be a pinion gear, a differential pinion gear, an inter-axle differential pinion gear, a transmission output gear, a transfer case output gear or power transmission unit output gear.

Circumferentially extending from at least a portion of the outer surface 360 of the second end portion 362 of the first shaft 350 is a plurality of axially extending first shaft splines 364. As illustrated in FIG. 4 of the disclosure, the plurality of axially extending splines 362 on the outer surface 360 of the second end portion 362 of the first shaft 350 are complementary to and meshingly engaged with the plurality of axially extending first joint member splines 250 on the inner surface 244 of the first end portion 238 of a first joint member 232A. The first joint member 232A illustrated in FIG. 4 is the same as the first joint member 232 illustrated in FIG. 3, except where specifically noted. As a result, the meshing engagement of the plurality of splines 250 and 364 drivingly connects the first joint member 232A to the first shaft 350 of the joint assembly 200A.

A first shaft snap-ring groove 366 circumferentially extends along at least a portion of the outer surface 360 of the second end portion 362 of the first shaft 350. As illustrated in FIG. 4 of the disclosure, the first shaft snap-ring groove 366 is disposed axially outboard from the plurality of axially extending first shaft splines 364 on the outer surface 360 of the first end portion 362 of the first shaft 350.

The first shaft snap-ring groove 366 on the outer surface 360 of the first end portion 362 of the first shaft 350 is complementary to a first joint member snap-ring groove 368 circumferentially extending along at least a portion of the inner surface 244 of the first end portion 238 of the first joint member 232A. As illustrated in FIG. 4 of the disclosure, the first joint member snap-ring groove 368 is interposed between the plurality of axially extending first joint member splines 250 and the wall portion 270 separating the first and second hollow portions 248 and 266 of the first and second end portions 238 and 240 of the first joint member 232A.

At least a portion of a snap-ring 370 is disposed within the first shaft snap-ring groove 366 and the first joint member snap-ring groove 368 of the joint assembly 200A. The snap-ring 370 axially restrains the first shaft 350 to the first joint member 232A of the joint assembly 200A. In accordance with an embodiment of the disclosure and as a non-limiting example, the snap-ring 370 may be substantially circular, substantially oval or substantially elliptical in shape. According to an alternative embodiment of the disclosure and as a non-limiting example, the snap-ring 370 may have a substantially polygonal shape being defined by a chain of substantially straight line segments. It is therefore within the scope of this disclosure that the snap-ring 370 may have a shape similar to the substantially polygonal shape of the snap-rings 256 or 256A illustrated in FIG. 3A or 3B of the disclosure.

An O-ring groove 372 circumferentially extends along at least a portion of the outer surface 360 of the first end portion 362 of the first shaft 350. As illustrated in FIG. 4 of the disclosure, the O-ring groove 372 is disposed axially inboard from and directly adjacent to, the plurality of axially extending first shaft splines 364 on the outer surface 360 of the first end portion 362 of the first shaft 350. In accordance with the embodiment of the disclosure illustrated in FIG. 4, the O-ring groove 372 is disposed at an end of the plurality of axially extending first shaft splines 364 on the outer surface 360 of the first shaft 350, opposite the first shaft snap-ring groove 366.

At least partially disposed within the O-ring groove 372 of the first shaft 350 is an O-ring 374. The O-ring 374 provides a seal between the inner surface 244 of the first end portion 238 of the first joint member 232 and the outer surface 360 of the first shaft 350 of the joint assembly 200A. The sealing engagement between the first joint member 232 and the first shaft 350 prevents the migration of dirt, debris and/or moisture into the plurality of axially extending splines 250 and 364 thereby improving the overall life and durability of the joint assembly 200A.

Figure 5:
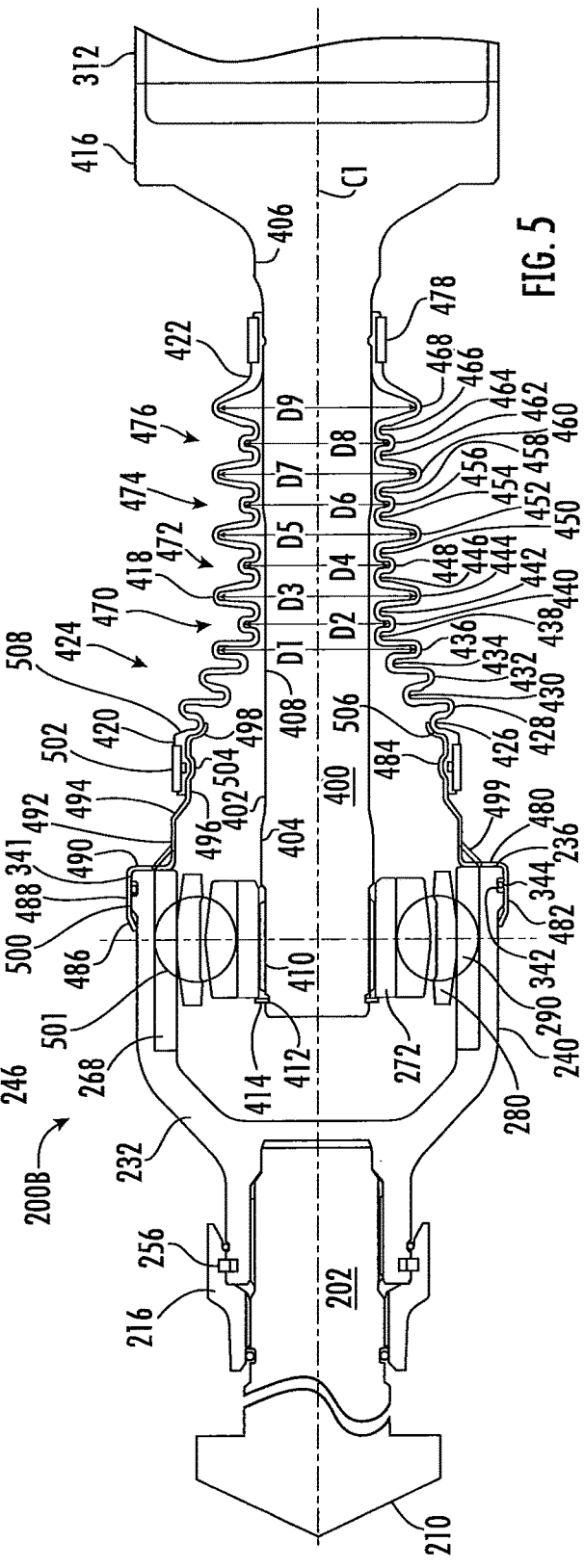
FIG. 5 is a schematic side-view of the joint assembly illustrated in FIGS. 3-4 according to another alternative embodiment of the disclosure.

FIG. 5 is a schematic side-view of a joint assembly 200B according to an alternative embodiment of the disclosure. The joint assembly 200B illustrated in FIG. 5 is the same as the joint assemblies 200 and 200A illustrated in FIGS. 3-4, except where specifically noted below. As illustrated in FIG. 5 of the disclosure and as a non-limiting example, the joint assembly 200B includes a stub shaft 400 having an outer surface 402, a first end portion 404, a second end portion 406 and an intermediate portion 408 disposed between the first and second portions 404 and 406 of the stub shaft 400. Circumferentially extending from at least a portion of the outer surface 402 of the first end portion 404 of the stub shaft 400 is a plurality of axially extending stub shaft splines 410. The plurality of axially extending stub shaft splines 410 are complementary to and meshingly engaged with a plurality of axially extending splines 304 circumferentially extending from at least a portion of the inner surface 274 of the second joint member 272.

Disposed adjacent to and axially inboard from the plurality of axially extending stub shaft splines 410 is a stub shaft snap-ring groove 412. As illustrated in FIG. 5 of the disclosure, the stub shaft snap-ring groove 412 circumferentially extends along at least a portion of the outer surface 402 of the first end portion 404 of the stub shaft 400. At least a portion of a stub shaft snap-ring 414 is disposed within the stub shaft snap-ring groove 412 on the first end portion 404 of the stub shaft 400. The stub shaft snap-ring 414 axially restrains the stub shaft 400 to the second joint member 272 of the joint assembly 200B.

At least a portion of the second end portion 406 of the stub shaft 400 has an increased diameter portion 416 that is integrally connected to the end of the second shaft 312. According to an embodiment of the disclosure and as a non-limiting example, the increased diameter portion 416 of the second end portion 406 of the stub shaft 400 is integrally connected to the end of the second shaft 312 by using one or more welds, one or more mechanical fasteners, a splined connection or a threaded connection.

A flexible boot 418 having a first end portion 420 and a second end portion 422 is attached to the outer surface 402 of the stub shaft 400 and the outer surface 264 of the second end portion 240 of the first joint member 232. As illustrated in FIG. 5 of the disclosure, the flexible boot 418 has a plurality of convolutions 424 interposed between the first end portion 420 and the second end portion 422 of the flexible boot 418. In accordance with this embodiment of the disclosure and as a non-limiting example, the flexible boot 418 includes, in axial order, a first trough 426, a first crest 428, a second trough 430, a second crest 432, a third trough 434, a third crest 436, a fourth trough 438, a fourth crest 440, a fifth trough 442, a fifth crest 444, a sixth trough 446, a sixth crest 448, a seventh trough 450, a seventh crest 452, an eighth trough 454, an eighth crest 456, a ninth trough 458, a ninth crest 460, a tenth trough 462, a tenth crest 464, an eleventh trough 466 and an eleventh crest 468. The flexible boot 418 provides a flexible seal for the joint assembly 200B preventing the migration of dirt, debris and/or moisture from the external environment into the joint assembly 200B. As a non-limiting example, the flexible boot 418 is made of a polymeric material, a rubber material, an elastomeric material, a thermoplastic material or a combination thereof.

As illustrated in FIG. 5 of the disclosure, the third crest 436, the fourth trough 438, the fourth crest 440, the fifth trough 442 and the fifth crest 444 forms a first substantially W-shaped portion 470 of the flexible boot 418. According to the embodiment of the disclosure illustrated in FIG. 5 of the disclosure, the third crest 436 and the fifth crest 444 have a diameter D1 and D3 that is larger than a diameter D2 of the fourth crest 440 of the flexible boot 418.

A second substantially W-shaped portion 472 of the flexible boot 418 is formed by the fifth crest 444, the sixth trough 446, the sixth crest 448, the seventh trough 450 and the seventh crest 452. As illustrated in FIG. 5 of the disclosure, the sixth crest 448 has a diameter D4 and the seventh crest 452 has a diameter D5. According to this embodiment of the disclosure, the diameters D3 and D5 of the fifth crest 444 and the seventh crest 452 are larger than the diameter D4 of the sixth crest 448.

Additionally, as illustrated in FIG. 5 of the disclosure, the seventh crest 452, the eighth trough 454, the eighth crest 456, the ninth trough 458 and the ninth crest 460 forms a third substantially W-shaped portion 474. As illustrated ibn FIG. 5 of the disclosure, the eighth crest 456 has a diameter D6 and the ninth crest 460 has a diameter D7. In accordance with this embodiment of the disclosure, the diameters D5 and D7 of the seventh crest 452 and the ninth crest 460 are larger than the diameter D6 of the eighth crest 456.

Finally, as illustrated in FIG. 5 of the disclosure, the ninth crest 460, the tenth trough 462, the tenth crest 464, the eleventh trough 466 and the eleventh crest 468 forms a fourth substantially W-shaped portion 476. As illustrated in FIG. 5 of the disclosure, the tenth crest 464 has a diameter D8 and the eleventh crest 468 has a diameter D9. According to this embodiment of the disclosure, the diameters D7 and D9 of the ninth crest 460 and the eleventh crest 468 are larger than the diameter D8 of the tenth crest 464 of the flexible boot 418.

In accordance with an embodiment of the disclosure and as a non-limiting example, the diameters D1, D3, D5, D7 and D9 of the third crest 436, fifth crest 444, seventh crest 452, the ninth crest 460 and the eleventh crest 468 are substantially the same. Additionally, as a non-limiting example, the diameters D2, D4, D6 and D8 of the fourth crest 440, the sixth crest 448, the eighth crest 456 and the tenth crest 464 are substantially the same.

The first end portion of the flexible boot 418 is attached to the outer surface 402 of the stub shaft 400 by using a first boot clamp 478.

The first end portion of the 420 of the flexible boot 418 is connected to the outer surface 264 of the second end portion 240 of the first joint member 232 by using a boot can 480 having a first end portion 482 and a second end portion 484. As illustrated in FIG. 5 of the disclosure, the first end portion 482 of the boot can 480 is attached to the outer surface 264 of the second end portion 240 of the first joint member 232 and the second end portion 484 of the boot can 480 is attached to the first end portion 420 of the flexible boot 418. As a non-limiting example, the boot can 480 is made of substantially rigid material such as a metallic material, an aluminium alloy, a steel alloy, a carbon fibre material or a composite material.

In accordance with an embodiment of the disclosure and as a non-limiting example, the boot can 480 may include, in axial order, a radially inward extending lip 486, a first substantially horizontal portion 488, a first radially inward extending portion 490, a second substantially horizontal portion 492, a second radially inward extending portion 494, a third substantially horizontal portion 496 and/or a third radially inward extending portion 498. According to this embodiment of the disclosure, the first radially inward extending portion 490 of the boot can 480 extends substantially vertically from an end of the first substantially horizontal portion 488 opposite the radially inward extending lip 486 to an end of the second radially inward extending portion 492 opposite the second radially inward extending portion 494. Additionally, according to an embodiment of the disclosure, at least a portion of the first radially inward extending portion 490 is in direct contact with at least a portion of the second end 236 of the first joint member 232 of the joint assembly 200B. The substantially vertical radially inward extending portion 490 of the boot can 480 acts as a stopper to prevent the boot can 480 from extending along the second end portion 240 of the first joint member 232 beyond a pre-determined distance.

Accordance with an embodiment of the disclosure and as a non-limiting example, the boot can 480 further includes one or more torque transfer element stopper portions 499 that are arcuate in shape. As illustrated in FIG. 5 of the disclosure, the one or more torque transfer element stopper portions 499 of the cage 480 have a shape that is complementary to an outer surface 501 of the one or more torque transfer elements 290 of the joint assembly 200B. Additionally, as illustrated in FIG. 5 of the disclosure, an end of the one or more torque transfer element stopper portions 499 are directly connected to the first radially inward extending portion 490 of the boot can 480. Furthermore, an end of the one or more torque transfer element stopper portions 499 opposite the first radially inward extending portion 490 is directly connected to the second substantially horizontal portion 490 of the boot can 480. In accordance with this embodiment of the disclosure, the one or more torque transfer element stopper portions 499 are disposed adjacent to the one or more first joint member grooves 268. When the joint assembly 200B is articulated to a maximum articulation angle θ2 (not shown), one or more of the one or more torque transfer elements 290 come into direct contact with the one or more torque transfer element stopper portions 499 of the cage 480. As a result, the joint assembly 200B is prevented from articulating beyond the maximum articulation angle θ2 (not shown) thereby improving the overall life and durability of the joint assembly 200B.

As illustrated in FIG. 5 of the disclosure, the at least a portion of the first horizontal portion 488 is in direct contact with at least a portion of the protruding portion 341 on the second end portion 240 of the first joint member 232 of the joint assembly 200B. The protruding portion 341 and the radially inward extending lip 486 are used to ensure that the boot can 480 is securely attached to the second end portion 240 of the first joint member 232 so the boot can 480 does not become prematurely detached from the second end portion 240 of the first joint member 232.

At least a portion of the second O-ring 344 disposed within the second O-ring groove 342 and provides a seal between the outer surface 264 of the second end portion 240 of the first joint member 232 and an inner surface 500 of the first substantially horizontal portion 488 of the boot can 480. The sealing engagement between the outer surface 264 of the second end portion 240 of the first joint member 232 and an inner surface 500 of the boot can 480 aids in preventing the migration of dirt, debris and/or moisture into the joint assembly 200B thereby improving the overall life and durability of the joint assembly 200B.

At least a portion of the first end portion 420 of the flexible boot 418 is attached to at least a portion of the second end portion 484 of the boot can 480. As illustrated in FIG. 5 of the disclosure, the first end portion 420 of the flexible boot 418 is attached to the second end portion 484 of the boot can 480 by using a second boot clamp 502.

In accordance with an alternative embodiment of the disclosure, the third substantially horizontal portion 496 of the boot can 480 includes a boot groove 504. As illustrated in FIG. 5 of the disclosure, the boot groove 504 extends circumferentially along at least a portion of the third substantially horizontal portion 496 of the boot can 480. According to this embodiment of the disclosure, when the second boot clamp 502 is tightened, at least a portion of the first end portion 420 of the flexible boot 418 is disposed within the boot groove 504 in the third substantially horizontal portion 496 of the boot can 480.

Finally, the third radially inward extending portion 498 is substantially arc-shaped. According to an embodiment of the disclosure and as a non-limiting example, the third radially inward extending portion 498 has a shape that is complementary to an inner surface 506 of a first radially inward extending boot leg 508 and the first trough 426 of the flexible boot 418. As illustrated in FIG. 5 of the disclosure, at least a portion of the first radially inward extending boot leg 508 and the first trough 426 of the boot can 418 is in direct contact with at least a portion of the third radially inward extending portion 498 of the boot can 480.

Figure 6:
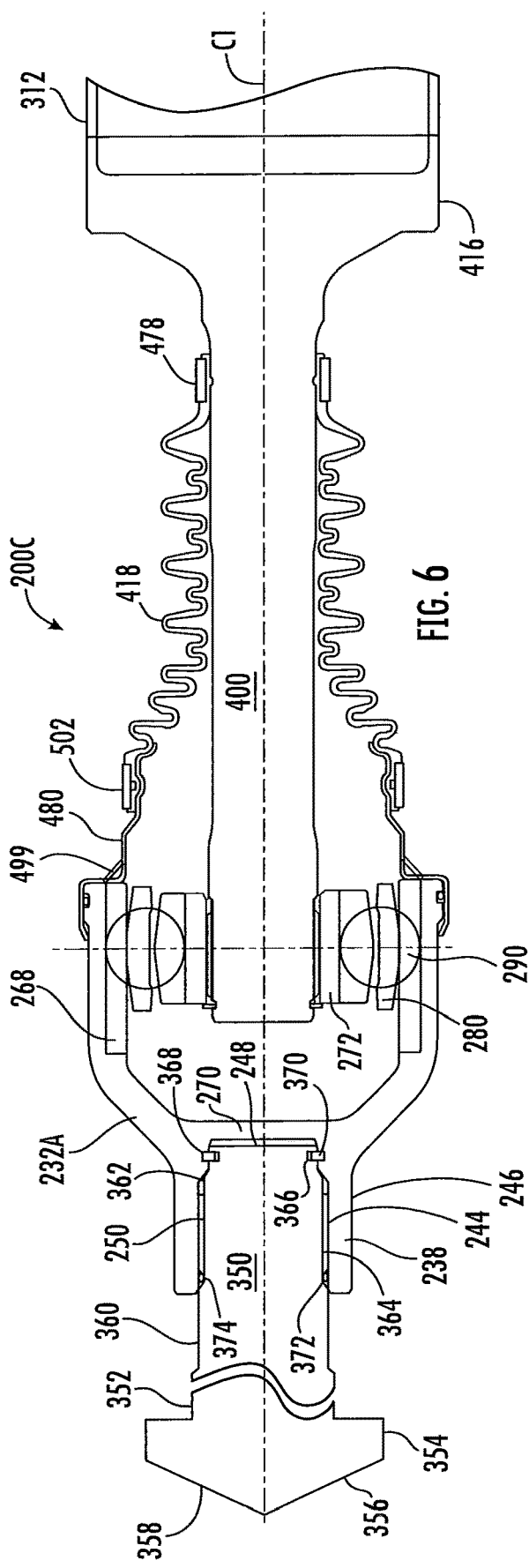
FIG. 6 is a schematic side-view of the joint assembly illustrated in FIGS. 3-5 according to yet another alternative embodiment of the disclosure.

FIG. 6 is a schematic side-view of a joint assembly 200C according to yet another alternative embodiment of the disclosure. The joint assembly 200C illustrated in FIG. 6 is the same as the joint assemblies 200, 200A and 200B illustrated in FIGS. 3-5, except where specifically noted below. In accordance with the embodiment of the disclosure illustrated in FIG. 6, the joint assembly 200C does not include the use of the first nut 216 and the nut snap-ring 256 or 256A disposed within the first joint member snap-ring groove 252 and the nut snap-ring grove 254 in order to axially restrain the first shaft to the first joint member 232.

In accordance with the embodiment of the disclosure illustrated in FIG. 6, the first end portion 238 of the first joint member 232A of the joint assembly 200C is drivingly connected to the second end portion 362 of the first shaft 350. Additionally, in accordance with the embodiment of the disclosure illustrated in FIG. 6, the first shaft 350 is axially restrained to the first end portion 238 of the first joint member 232A by using the snap-ring 370.

Figure 7:
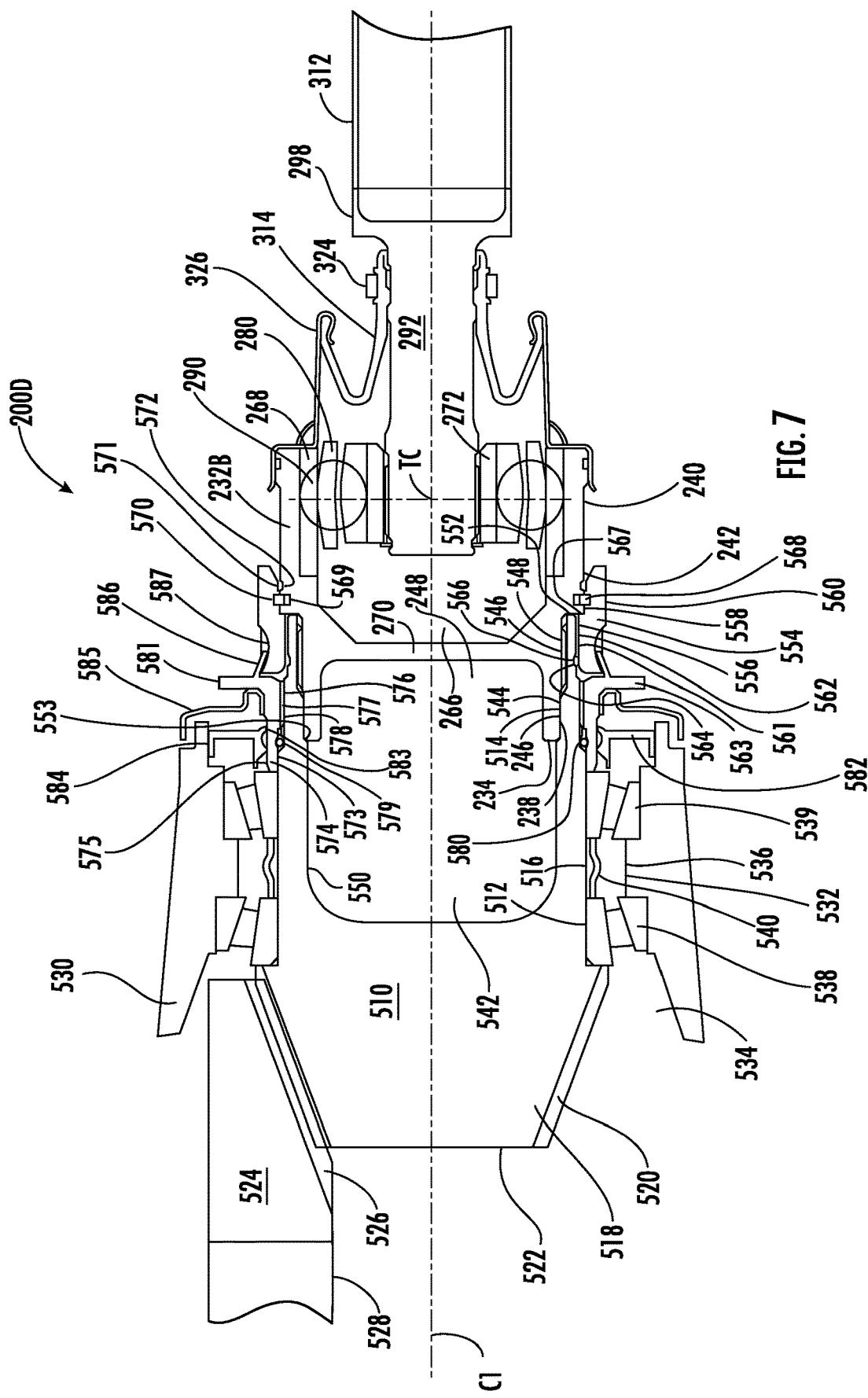
FIG. 7 is a schematic side-view of the joint assembly illustrated in FIGS. 3-6 according to still yet another embodiment of the disclosure.

FIG. 7 is a schematic side-view of a joint assembly 200D according to still yet another embodiment of the disclosure. The joint assembly 200D illustrated in FIG. 7 is the same as the joint assemblies 200, 200A, 200B and 200C illustrated in FIGS. 3-6, except where specifically noted below. In accordance with this embodiment of the disclosure and as a non-limiting example, the joint assembly 200D includes a first shaft 510 having a first end portion 512, a second end portion 514 and an outer surface 516. It is within the scope of this disclosure and as a non-limiting example that the first shaft 510 may be a transmission output shaft, a transfer case output shaft, a power transfer unit output shaft, a propeller shaft, a drive shaft, a cardan shaft, a double cardan shaft, a universal joint shaft, a universal coupling shaft, a Hooke's joint shaft, a pinion shaft, a differential input shaft, a differential pinion shaft, a front axle input shaft, a front axle differential pinion shaft, a forward tandem axle input shaft, a forward tandem axle differential output shaft, a rear tandem axle input shaft, a rear tandem axle differential pinion shaft or an inter-axle differential pinion shaft.

Integrally connected to the first end portion 512 of the first shaft 510 is a gear member 518 having a plurality of gear teeth 520 circumferentially extending from at least a portion of an outer surface 522 of the gear member 518. According to an embodiment of the disclosure and as a non-limiting example, the gear member 518 may be integrally formed as part of the first end portion 512 of the first shaft 510. In accordance with an alternative embodiment of the disclosure and as a non-limiting example (not shown), the gear member may be drivingly connected to the first end portion of the shaft by using one or more welds, one or more mechanical fasteners, one or more adhesives, a splined connection and/or a threaded connection. It is within the scope of this disclosure and as a non-limiting example that the gear member 518 may be a pinion gear, a differential pinion gear, an inter-axle differential pinion gear, a transmission output gear, a transfer case output gear or power transmission unit output gear.

At least a portion of the first shaft 510 extends from outside a housing 530, through an opening 532 and into a hollow portion 534 of the housing 530. Disposed within at least a portion of the hollow portion of the housing 530 is a ring gear 524 that is drivingly connected to a differential assembly (not shown).

At least a portion of a ring gear 524 may be drivingly connected to at least a portion of the gear member 518 of the first shaft 510. As a result, the plurality of gear teeth 520 of the gear member 518 of the first shaft 510 may be complementary to and meshingly engaged with a plurality of ring gear teeth 526 circumferentially extending from at least a portion of an outer surface 528 of the ring gear 524.

Interposed between the outer surface 516 of the first shaft 510 and the surface 536 defining the opening 532 in the housing 530 is a first bearing assembly 538 and a second bearing assembly 539. The first and second bearing assemblies 538 and 538 provide rotational support for at least a portion of the first shaft 510 within the opening 532 of the housing 530 when in operation. According to the embodiment of the disclosure illustrated in FIG. 7 and as a non-limiting example, at least a portion of the first bearing assembly 538 may be disposed directly adjacent to and is in direct contact with at least a portion of the gear member 518 of the first shaft 510. It is within the scope of this disclosure and as a non-limiting example that the first bearing assembly 538 may be separated from the second bearing assembly 539 via a spacer 540. The spacer 540 aids in ensuring that the first and second bearing assemblies 538 and 539 remain in their ideal operating positions along the outer surface 516 of the first shaft 510 when in operation.

Extending co-axially with at least a portion of the first shaft 510 is a first joint member 232B. The first joint member 232B is illustrated in FIG. 7 is the same as the first joint members 232 and 232A illustrated in FIGS. 3-6, except where specifically noted. In accordance with the embodiment of the disclosure illustrated in FIG. 7 and as a non-limiting example, at least a portion of the first end portion 238 of the first joint member 232B has a reduced diameter portion 544. The reduced diameter portion 544 of the first joint member 232B has a size and shape to be received and/or retained within at least a portion of a hollow interior portion 542 extending inward from an end of the first shaft, opposite the gear member 518. As a result, at least a portion of the reduced diameter portion 544 of the first end portion 238 of the first joint member 232B is disposed within at least a portion of the hollow interior portion 542 of the first shaft 510 of the joint assembly 200D.

Circumferentially extending along at least a portion of the outer surface 246 of the reduced diameter portion 544 of the first joint member 232B is a plurality of axially extending first joint member splines 546. The plurality of axially extending first joint member splines 546 are complementary to and meshingly engaged with a plurality of axially extending first shaft member splines 548 circumferentially extending along at least a portion of an inner surface 550 defining the hollow interior portion 542 of the first shaft 510 of the joint assembly 200D. As a result, at least a portion of the first joint member 232B is drivingly connected to at least a portion of the first shaft 510 of the joint assembly 200D.

In accordance with the embodiment of the disclosure illustrated in FIG. 7 and as a non-limiting example, at least a portion of the wall portion 270 of the first joint member 232B is disposed radially inboard from at least a portion of the plurality of axially extending first joint member splines 546. While the wall portion 270 illustrated in FIG. 7 is disposed radially inboard from the plurality of axially extending first joint member splines 546, it is within the scope of this disclosure that the wall portion 270 may be located in other locations so long as it separates at least a portion of the first hollow interior portion 248 from at least a portion of the second hollow interior portion of the first joint member 232B.

Extending radially outboard from at least a portion of an end of the reduced diameter portion 544 of the first joint member 232B, opposite the gear member 518, is a transition portion 552.

A stopper portion 553 circumferentially extends along at least a portion of the inner surface 550 defining the hollow interior portion 542 of the first shaft 510. As illustrated in FIG. 7 and as a non-limiting example, the stopper portion 553 of the first shaft 510 is disposed a pre-determined amount of distance axially inboard from the plurality of axially extending first joint member splines 546. When assembled, at least a portion of the first end 234 of the first joint member 232B comes into direct contact with at least a portion of a stopper portion 553 thereby preventing the insertion of the first joint member 232B into the hollow portion 542 of the first shaft 510 beyond a pre-determined amount. This provides a positive stop for the first joint member 232B during assembly which aids in ensuring that the first joint member 232B is assembled to the first shaft 510 in its pre-determined optimal operating position relative to the first shaft 510. It is within the scope of this disclosure and as a non-limiting example that the stopper portion 553 may be a substantially vertical reduced diameter portion or a reduced diameter portion having a diameter that increases across the stopper portion. As a non-limiting example, the increasing diameter of the stopper portion may increase at a substantially constant rate or at a variable rate.

Disposed radially outboard from at least a portion of the first shaft 510 and the first joint member 232B is a first nut 554 having a first inner surface 556, a second inner surface 558 and an outer surface 560. As illustrated in FIG. 7 of the disclosure and as a non-limiting example, the first inner surface 556 of the first nut 554 has an inner diameter that is smaller than the inner diameter of the second inner surface 558 of the first nut 554. The first nut 554 aids in ensuring that the first shaft 510 remains drivingly connected to the first joint member 232B by axially restraining the first shaft 510 relative to the first joint member 232B.

Circumferentially extending along at least a portion of the first inner surface 556 of the first nut 554 is a plurality of first nut threads 561. The plurality of first nut threads 561 are complementary to a first plurality of first shaft threads 562 circumferentially extending along at least a portion of the outer surface 516 of the second end portion 514 of the first shaft 510. It is to be understood that the first nut 554 and/or a second nut 563 may aid in providing the pre-loading force needed for the first and/or second bearing assemblies 538 and/or 539 of the joint assembly 200D. In according to the embodiment of the disclosure illustrated in FIG. 7 and as a non-limiting example, at least a portion of the plurality of first nut threads 561 and/or the first plurality of first shaft threads 562 of the joint assembly 200D are disposed radially outboard from at least a portion of the plurality of axially extending first shaft member splines 548.

Disposed directly adjacent to an end of the first plurality of first shaft threads 562 opposite the transition portion 552 of the first joint member 232B is a first shaft O-ring groove 564. As illustrated in FIG. 7 of the disclosure and as a non-limiting example, the first shaft O-ring groove 564 circumferentially extends along at least a portion of the outer surface 516 of the second end portion 514 of the first shaft 510. The first shaft O-ring groove 564 has a size and shape to receive and/or retain at least a portion of a first O-ring 566. At least a portion of the first O-ring 566 is sealingly engaged with at least a portion of the first inner surface 556 of the first nut 554 and at least a portion of the outer surface 516 of the first shaft 510. It is therefore to be understood that the first O-ring 566 aids in preventing the migration of dirt, debris and/or moisture into the threaded connection between the first nut 554 and the first shaft 510 thereby increasing the overall life and durability of the joint assembly 200D.

When assembled, at least a portion of a nut transition portion 567 connecting the first inner surface 556 to the second inner surface 558 of the first nut 554 may be in direct contact with at least a portion of the transition portion 552 of the first joint member 232B. This may be used during assembly in order to aid in confirming that the first shaft 510, the first joint member 232B and the first nut 554 have been properly assembled and are disposed in their pre-determined optimal operating positions.

In order to aid in axially restraining the first nut 554 to the first joint member 232B and the first shaft 510 to the first joint member 232B, a nut snap-ring 568 may be used. As illustrated in FIG. 7 of the disclosure and as a non-limiting example, at least a portion of the nut snap-ring 568 is received and/or retained within at least a portion of a first joint member snap-ring groove 569 and a nut snap-ring groove 570. The first joint member snap-ring groove 569 circumferentially extends along at least a portion of the outer surface 246 of the intermediate portion 242 of the first joint member 232B. According to the embodiment of the disclosure illustrated in FIG. 7 of the disclosure and as a non-limiting example, the first joint member snap-ring groove 569 is disposed directly adjacent to and axially outboard from the transition portion 552 of the first joint member 232B. Additionally, according to the embodiment of the disclosure illustrated in FIG. 7 of the disclosure and as a non-limiting example, the nut snap-ring groove 570 circumferentially extends along at least a portion of the second inner surface 558 of the first nut 554. It is within the scope of this disclosure and as a non-limiting example that the nut snap-ring 568 may have the same shape as the snap-rings 256 or 256A illustrated in FIGS. 3A and 3B.

Disposed axially outboard from and directly adjacent to the first joint member snap-ring groove 569 is a first O-ring groove 571 that circumferentially extends along at least a portion of the outer surface 246 of the intermediate portion 242 of the first joint member 232B. The first O-ring groove 571 has a size and shape to receive and/or retain at least a portion of a third O-ring 572. At least a portion of the third O-ring 572 is sealingly engaged with at least a portion of the second inner surface 558 of the first nut 554 and the outer surface 246 of the first joint member 232B of the joint assembly 200D. As a result, the third O-ring 572 aids in preventing the migrations of dirt, debris and/or moisture into the connection between the first joint member 232B, the first shaft 510 and the first nut 554. This aids in improving the overall life and durability of the joint assembly 200D.

Extending co-axially with at least a portion of the first shaft 510 and disposed radially outboard from at least a portion of the first shaft 510, the first joint member 232B and the first nut 554 is the second nut 563. As illustrated in FIG. 7 of the disclosure and as a non-limiting example, the second nut 563 has an inner surface 573, an outer surface 574, a first end portion 575 and a second end portion 576. The second nut 563 aids in axially restraining the first shaft 510 to the first joint member 232B by preventing the first nut 554 from backing off or loosening when in operation. When assembled, at least a portion of an end of the second nut 563 may be in direct contact with at least a portion of the second bearing assembly 539 and at least a portion of an end of the second nut 563, opposite the second bearing assembly 539, may be in direct contact with at least a portion of the first nut 554. As a result, the second nut 563 aids in improving the overall life and durability of the joint assembly 200D.

Circumferentially extending along at least a portion of the inner surface 573 of the second nut 563 is a plurality of second nut threads 577. The plurality of second nut threads 577 are complementary to and meshingly engaged with a second plurality of first shaft threads 578 circumferentially extending along at least a portion of the outer surface 516 of the second end portion 514 of the first shaft 510. As illustrated in FIG. 7 and as a non-limiting example, the second plurality of first shaft threads 578 are disposed directly adjacent to and axially inboard from the first shaft O-ring groove 564.

Disposed axially inboard from an end of the second plurality of first shaft splines 578, opposite the first shaft O-ring groove 564, is an additional first shaft O-ring groove 579. The additional first shaft O-ring groove 579 has a size and shape to receive and/or retain at least a portion of a fourth O-ring 580. At least a portion of the fourth O-ring 580 is sealingly engaged with at least a portion of the outer surface 516 of the first shaft 510 and the inner surface 573 of the second nut 563. The fourth O-ring 580 aids in preventing the migration of dirt, debris and/or moisture into the threaded connection between the second nut 563 and the first shaft 510 thereby aiding in increasing the overall life and durability of the joint assembly 200D.

Interposed between the surface 536 defining the opening 532 in the housing 530 and the outer second nut 563 is a housing sealing member 582 having an inner surface 583 and an outer surface 584. The housing sealing member 582 aids in preventing the migration of dirt, debris and/or moisture into the hollow portion 534 of the housing 530 thereby aiding in improving the overall life and durability of the joint assembly 200D. At least a portion of the outer surface 584 of the housing sealing member 582 is sealingly engaged with at least a portion surface 536 defining the opening 532 and at least a portion of the inner surface 583 is sealingly engaged with at least a portion of the outer surface 574 of the second nut 563.

At least a portion of a cover portion 585 is integrally connected to at least a portion of the outer surface 574 of the second nut 563. In accordance with the embodiment of the disclosure illustrated in FIG. 7 and as a non-limiting example, at least a portion of the cover portion is disposed axially outboard from and radially outboard from the housing sealing member 582 of the joint assembly 200D. The cover portion 585 covers the entire opening 532 in the housing 530 in order to aid in preventing the debris from coming into direct contact with and damaging the housing sealing member 582 thereby aiding in improving the overall life and durability of the joint assembly 200D.

Circumferentially extending from at least a portion of the outer surface 574 of the second end portion 576 of the second nut 563 is an increased diameter portion 581. The increased diameter portion 581 aids in preventing debris from coming into direct contact with at least a portion cover portion 585 thereby aiding in improving the overall life and durability of the cover portion 585 and the joint assembly 200D. Additionally, it is within the scope of this disclosure and as a non-limiting example that at least a portion of the cover portion 585 may be in direct contact with at least a portion of the increased diameter portion 581 of the second nut 563 thereby providing a more robust connection between the second nut 563 and the cover portion 585. This further aids in increasing the overall life and durability of the joint assembly 200D.

Circumferentially extending axially outboard from at least a portion of an end of the increased diameter portion 581 of the second nut 563, opposite the cover portion 585, is one or more axially extending portions 586. According to an embodiment of the disclosure and as a non-limiting example the one or more axially extending portions 586 of the second nut 563 may be substantially conical or cylindrical in shape. In accordance with an alternative embodiment of the disclosure and as a non-limiting example, the one or more axially extending portions 586 may be a one or more axially extending fingers. As illustrated in FIG. 7 of the disclosure and as a non-limiting example, when the joint assembly 200D is assembled, at least a portion of the one or more axially extending portions 586 are plastically deformed radially inboard into one or more axially extending portion receiving grooves 587 circumferentially extending along at least a portion of the outer surface 560 of the first nut 554. The engagement between the one or more axially extending portions 586 and the first nut 554 aid in preventing the first nut 554 from backing off or loosening when in operation thereby improving the overall life and durability of the joint assembly 200D. Additionally, this aids in providing a more robust and secure connection between the first joint member 232B and the first shaft 510 of the joint assembly 200D.

The joint assembly 200D illustrated in FIG. 7 eliminates the need for the snap-ring 370 connecting the first joint member 232, 232A or 232B to the first shaft 202, 350 or 510. This aids in making the assembly of the joint assembly 200D quicker and easier thereby reducing the overall costs associated with the joint assembly 200D. Additionally, the joint assembly 200D illustrated in FIG. 7 reduces the distance between the second bearing assembly 539 and the theoretical center TC of the joint assembly 200D thereby preventing the first shaft 510 from bending and/or deflecting when in operation. This aids in increasing the overall life and durability of the joint assembly 200D and aids in minimizing or eliminating the amount of noise, vibration and/or harshness (NVH) generated by the joint assembly 200D when in operation. Furthermore, the joint assembly 200D illustrated in FIG. 7 provides for quicker and easier serviceability and/or replacement by service personnel. Still further, the size of the joint assembly 200D illustrated in FIG. 7 is not dependent on the size of the first shaft 510 and the opening 532 in the housing 530 thereby allowing the joint assembly 200D to be customized and/or optimized to be used in a wide array of applications. Still even further, the substantially hollow first shaft 510 of the joint assembly 200D illustrated in FIG. 7 minimizes the overall amount of deformation experienced by gear member 518 of the first shaft 510 during the one or more welding and/or heat treating processes performed.

Figure 8:
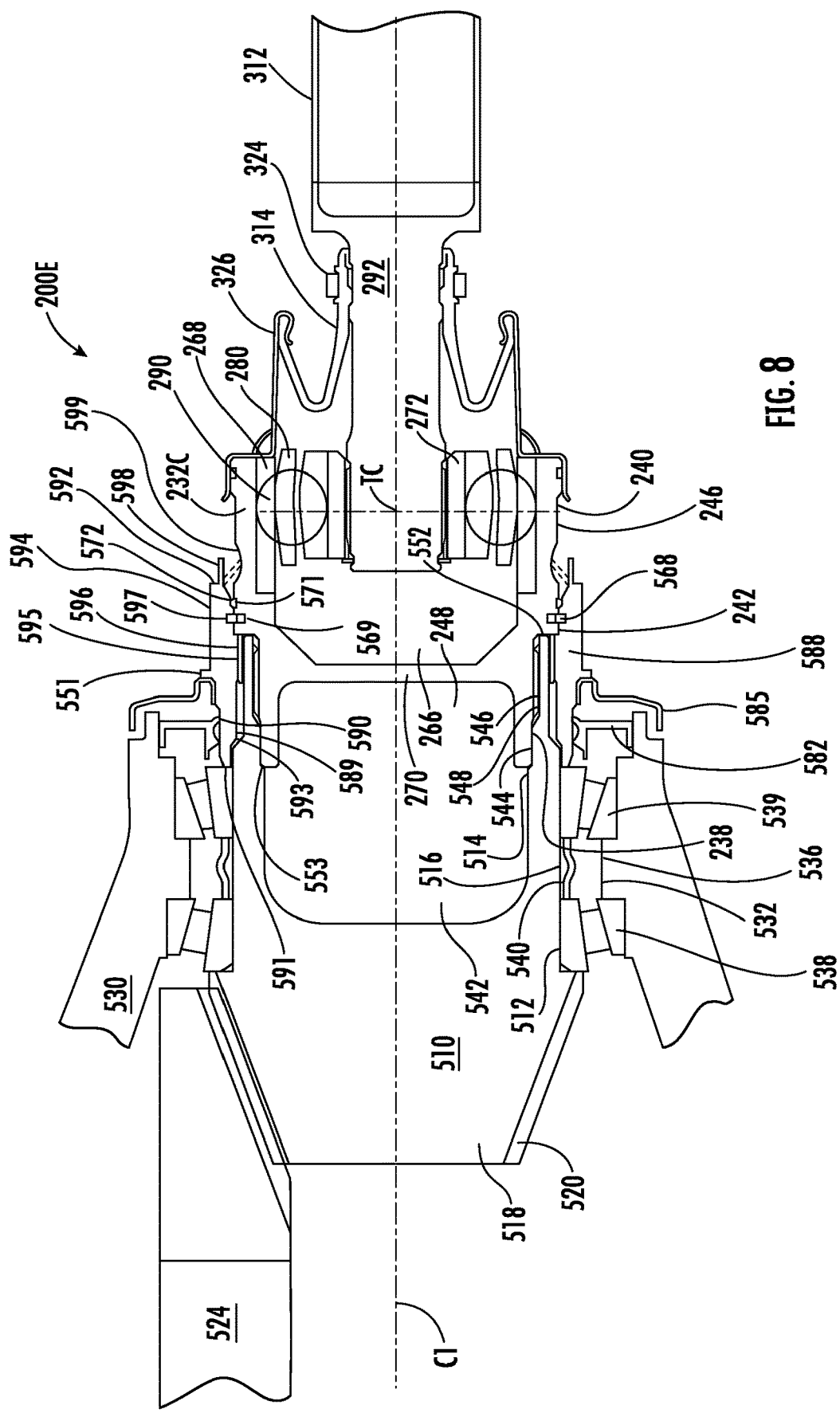
FIG. 8 is a schematic side-view of the joint assembly illustrated in FIGS. 3-7 according to still a further embodiment of the disclosure.

FIG. 8 is a schematic side-view of a joint assembly 200E according to still a further embodiment of the disclosure. The joint assembly 200E illustrated in FIG. 8 is the same as the joint assemblies 200, 200A, 200B and 200C illustrated in FIGS. 3-7, except where specifically noted below. In accordance with the embodiment illustrated in FIG. 8 and as a non-limiting example, the joint assembly 300E does not include the use of the first nut 554 illustrated in FIG. 7 to connect the first shaft 510 to the first joint member 232B.

As illustrated in FIG. 8 of the disclosure and as a non-limiting example, the joint assembly 200E includes a first joint member 232C. The first joint member 232C illustrated in FIG. 8 is the same as the first joint members 232, 232A and 232B illustrated in FIGS. 3-7, except where specifically noted. In accordance with the embodiment of the disclosure illustrated in FIG. 8 and as a non-limiting example, at least a portion of the reduced diameter portion 544 of the first end portion 238 of the first joint member 232C is received and/or retained within at least a portion of the hollow portion 542 of the first shaft 510. Additionally, in accordance with the embodiment of the disclosure illustrated in FIG. 8 and as a non-limiting example, at least a portion of the reduced diameter portion 544 of the first end portion 238 of the first joint member 232C is drivingly connected to at least a portion of the second end portion 514 of the first shaft 510 of the joint assembly 200E.

Extending co-axially with at least a portion of the first shaft 510 of the joint assembly 200E is a first nut 588 having an inner surface 589, an outer surface 590, a first end 591, a second end 592, a first end portion 593 and a second end portion 594. The first nut 588 axially restrains the first joint member 232C to the first shaft 510 of the joint assembly thereby improving the overall life and durability of the joint assembly 200E.

Circumferentially extending along at least a portion of the inner surface 590 of the first nut 588 is a plurality of first nut threads 595. The plurality of first nut threads 595 are complementary to and meshingly engaged with a plurality of first shaft threads 596 circumferentially extending along at least a portion of the outer surface 516 of the second end portion 514 of the first shaft 510. According to the embodiment illustrated in FIG. 8 and as a non-limiting example, at least a portion of the plurality of first nut threads 595 and the plurality of first shaft threads 596 are disposed radially outboard from the plurality of axially extending first joint member splines 546 and the plurality of axially extending first shaft member splines 548.

In accordance with the embodiment of the disclosure illustrated in FIG. 8 and as a non-limiting example, at least a portion of the first end 591 of the first nut 588 is in direct contact with at least a portion of the second bearing assembly 539 of the joint assembly 200E. This allows the first nut 588 to apply a pre-loading force onto the first and/or second bearing assemblies 539 and/or 539. It is therefore to be understood that the more the first nut 588 is threaded onto the first shaft 510 the larger the pre-loading force applied to the first and/or second bearing assemblies 538 and/or 539. As a result, it is within the scope of this disclosure and as a non-limiting example, that the transition portion 552 of the first joint member 232C may be at a pre-determined location such that when the transition portion 552 contacts the end of the first shaft 510, opposite the gear member 518, the first nut 588 applies the desired amount of pre-loading force onto the first and/or second bearing assemblies 538 and 539 needed.

The housing sealing member 582 is interposed between the first nut 588 and the surface 536 defining the opening 532 in the housing 530. At least a portion of the outer surface 584 of the housing sealing member 582 is sealingly engaged with at least a portion of the surface 536 and at least a portion of the inner surface 583 of the housing sealing member 582 is sealingly engaged with at least a portion of the outer surface 516 of the first end portion 593 of the first nut 588.

Circumferentially extending from at least a portion of the outer surface 590 of the first nut 588 is an increased diameter portion 551. As illustrated in FIG. 8 of the disclosure and as a non-limiting example, the increased diameter portion 551 of the first nut 588 is disposed axially outboard from the housing sealing member 582.

Integrally connected to at least a portion of the outer surface 590 of the first nut 588 is the cover portion 585. It is within the scope of this disclosure and as a non-limiting example that at least a portion of the cover portion 585 may be in direct contact with and integrally connected to at least a portion of the increased diameter portion 551 of the first nut 588 thereby providing a more robust connection between the first nut 588 and the cover portion 585. This aids in increasing the overall life and durability of the joint assembly 200E.

As illustrated in FIG. 8 of the disclosure and as a non-limiting example, the first nut 588 may further include a first nut snap-ring groove 597 circumferentially extending along at least a portion of the inner surface 589 of the second end portion 594 of the first nut 588. In accordance with the embodiment illustrated in FIG. 8 and as a non-limiting example, the first nut snap-ring groove 597 is disposed directly adjacent to and axially outboard from the plurality of first nut threads 595. The first nut snap-ring groove 597 is complementary to the first joint member snap-ring groove 569 of the joint assembly 200E. As a result, it is to be understood that the first nut snap-ring groove 597 has a size and shape to receive and/or retain at least a portion of the nut snap-ring 568. This aids in axially restraining the first joint member 232C relative to the first nut 588 and the first joint member 232C relative to the first shaft 510 thereby aiding in improving the overall life and durability of the joint assembly 200E.

Circumferentially extending axially outboard from at least a portion of the second end 592 of the first nut 588 is one or more axially extending portions 598. According to an embodiment of the disclosure and as a non-limiting example the one or more axially extending portions 598 of the first nut 588 may be substantially conical or cylindrical in shape. In accordance with an alternative embodiment of the disclosure and as a non-limiting example, the one or more axially extending portions 598 may be a one or more axially extending fingers. As illustrated in FIG. 8 of the disclosure and as a non-limiting example, when the joint assembly 200E is assembled, at least a portion of the one or more axially extending portions 598 are plastically deformed radially inboard into one or more axially extending portion receiving grooves 599 circumferentially extending along at least a portion of the outer surface 246 of the intermediate portion 242 of the first joint member 232C. In accordance with the embodiment illustrated in FIG. 8 and as a non-limiting example, the one or more axially extending portion receiving grooves 599 are disposed axially outboard from and are directly adjacent to the first O-ring groove 571 in the outer surface 242 of the first joint member 232C. The engagement between the one or more axially extending portions 598 and first joint member 232C aid in preventing the first nut 588 from backing off or loosening when in operation thereby improving the overall life and durability of the joint assembly 200E. Additionally, this aids in providing a more robust and secure connection between the first joint member 232C and the first shaft 510 of the joint assembly 200E.

The joint assembly 200E illustrated in FIG. 8 eliminates the need for the snap-ring 370 connecting the first joint member 232, 232A, 232B or 232C to the first shaft 202, 350 or 510. This aids in making the assembly of the joint assembly 200E quicker and easier thereby reducing the overall costs associated with the joint assembly 200E. Additionally, the joint assembly 200E illustrated in FIG. 8 reduces the distance between the second bearing assembly 539 and the theoretical center TC of the joint assembly 200E thereby preventing the first shaft 510 from bending and/or deflecting when in operation. This aids in increasing the overall life and durability of the joint assembly 200E and aids in minimizing or eliminating the amount of NVH generated by the joint assembly 200E when in operation. Furthermore, the joint assembly 200E illustrated in FIG. 8 provides for quicker and easier serviceability and/or replacement by service personnel. Still further, the size of the joint assembly 200E illustrated in FIG. 8 is not dependent on the size of the first shaft 510 and the opening 532 in the housing 530 thereby allowing the joint assembly 200E to be customized and/or optimized to be used in a wide array of applications. Still even further, the substantially hollow first shaft 510 of the joint assembly 200E illustrated in FIG. 8 minimizes the overall amount of deformation experienced by the gear member 518 of the first shaft 510 during the one or more welding and/or heat treating processes performed.

FIGS. 9 and 9A are a schematic side-view of the joint assembly illustrated in FIG. 3 according to an alternative embodiment of the disclosure. The joint assembly 200F illustrated in FIGS. 9 and 9A is the same as the joint assembly 200 illustrated in FIG. 3, except where specifically noted below. According to an embodiment of the disclosure and as a non-limiting example, the joint assembly 200F illustrated in FIGS. 9 and 9A may be a direct pinion mount double offset plunging constant velocity joint with plunging and articulation capabilities.

As illustrated in FIG. 9 of the disclosure and as a non-limiting example, the joint assembly 300F includes a first joint member 232D. The first joint member 232D illustrated in FIG. 9 is the same as the first joint members 232-232C illustrated in FIGS. 3-8, except where specifically noted. According to the embodiment of the disclosure illustrated in FIG. 9 and as a non-limiting example, the first joint member 232D of the joint assembly 200F does not include the one or more first joint member grooves 268. In accordance with the embodiment of the disclosure illustrated in FIGS. 9 and 9A and as a non-limiting example, the inner surface 262 of the second end portion 240 of the first joint member 232D has one or more first joint member grooves 601 circumferentially extending along at least a portion of the inner surface 262 of the second end portion 240 of the first joint member 232D.

Additionally, in accordance with the embodiment of the disclosure illustrated in FIGS. 9 and 9A and as a non-limiting example, the second joint member 272 of the joint assembly 200F does not include the one or more second joint member grooves 278. In accordance with this embodiment of the disclosure, an outer surface 616 of the second joint member 272 has one or more axially extending second joint member grooves 603 that are complementary to the one or more first joint member grooves 601.

Interposed between the second end portion 240 of the first joint member 232D and the second joint member 272 of the joint assembly 200F is a cage 600. The cage 600 has a first inner surface 602, a second inner surface 604, an outer surface 606, a first end portion 608, an intermediate portion 610 and a second end portion 612. Extending from the first and/or the second inner surface 602 and 604 to the outer surface 606 of the cage 600 is one or more torque transfer element openings 614. The one or more torque transfer elements 290 drivingly connect the second joint member 272 to the first joint member 232D of the joint assembly 200F. As illustrated in FIGS. 9 and 9A of the disclosure and as a non-limiting example, at least a portion of the one or more torque transfer elements 290 are disposed with the one or more first joint member grooves 601, the one or more axially extending second joint member grooves 603 and the one or more torque transfer element openings 614.

In accordance with the embodiment of the disclosure illustrated in FIG. 9 and as a non-limiting example, when the joint assembly 200F is assembled, the one or more torque transfer elements 290 and the cage 600 have a centerline C3 that is different than the centerline (not shown) of the second joint member 272 of the joint assembly 200F.

According to the embodiment of the disclosure illustrated in FIGS. 9 and 9A and as a non-limiting example, the first inner surface 602 of the cage 600 is slidingly engaged with the outer surface 616 of the second joint member 272 of the joint assembly 200F. It is therefore within the scope of this disclosure and as a non-limiting example that the first inner surface 602 of the cage 600 may have a shape that is complementary to an outer surface 616 of the second joint member 272 of the joint assembly 200F.

As illustrated in FIGS. 9 and 9A of the disclosure and as a non-limiting example, at least a portion of the second inner surface 604 of the cage 600 extends axially inboard beyond an axially inboard end 618 of the second joint member 272 of the joint assembly 200F. It is within the scope of this disclosure and as a non-limiting example that the second inner surface 604 of the cage 600 may be substantially cylindrical in shape.

The outer surface 606 of the cage 600 has an outer diameter OD1. As best seen in FIG. 9 of the disclosure, the outer diameter OD1 of the cage 600 increases from the first end portion 608 to the intermediate portion 610 of the cage 600. Additionally, the outer diameter OD1 of the cage 600 decreases from the intermediate portion 610 to the second end portion 612 of the cage 600. In accordance with the embodiment of the disclosure illustrated in FIG. 9 and as a non-limiting example, the outer diameter OD1 of the cage 600 may increase at a faster rate from the first end portion 608 to the intermediate portion 610 of the cage 600 than from the second end portion 612 to the intermediate portion 610 of the cage 600.

As best seen in FIG. 9A of the disclosure and as a non-limiting example, the outer surface 606 of the cage 600 has an arcuate portion 620 having a center of curvature C4. The arcuate portion 602 extends from the first end portion 608 to the intermediate portion 610 of the cage. Additionally, the second inner surface 604 of the cage 600 has a center of curvature C5. In accordance with the embodiment of the disclosure illustrated in FIG. 9A and as a non-limiting example, the center of curvature C4 of the arcuate portion 620 and the center of curvature C5 of the second inner surface 604 are disposed equidistant on opposite sides of the centerline C3 passing through the one or more torque transfer elements 290.

FIG. 10 is a schematic side-view of the joint assembly illustrated in FIGS. 3, 4, 7 and 7A according to an alternative embodiment of the disclosure. The joint assembly 200G illustrated in FIG. 10 is the same as the joint assemblies 200, 200A and 200F illustrated in FIGS. 3, 4, 7 and 7A, except where specifically noted below. In-accordance with the embodiment of the disclosure illustrated in FIG. 10, the joint assembly 200G does not include the use of the first nut 216 and the nut snap-ring 256 or 256A to axially restrain the first shaft to the first joint member 232 or 232A.

As illustrated in FIG. 10 of the disclosure and as a non-limiting example, the joint assembly 200G includes a first joint member 232E. The first joint member 232E illustrated in FIG. 10 is the same as the joint members 232-232D illustrated in FIGS. 3-9A, except where specifically noted. In accordance with the embodiment of the disclosure illustrated in FIG. 10 and as a non-limiting example, at least a portion of the first end portion 238 of the first joint member 232E of the joint assembly 200G is drivingly connected to at least a portion of the second end portion 362 of the first shaft 350 via the plurality of axially extending splines 250 and 364. Additionally, in accordance with the embodiment of the disclosure illustrated in FIG. 10 and as a non-limiting example, the first shaft 350 is axially restrained to the first end portion 238 of the first joint member 232 by using the snap-ring 370 that is disposed within at least a portion of the first shaft snap-ring groove 366 and the first joint member snap-ring groove 368 of the joint assembly 200G.

FIG. 11 is a schematic side-view of the joint assembly illustrated in FIGS. 3, 5, 9 and 9A according to an alternative embodiment of the disclosure. The joint assembly 200H illustrated in FIG. 11 is the same as the joint assemblies 200, 200B and 200F illustrated in FIGS. 3, 5, 9 and 9A, except where specifically noted below. As illustrated in FIG. 11 of the disclosure and as a non-limiting example, the joint assembly 200H does not include the use of the stub shaft 292, the boot 314 and the boot can 326 illustrated in FIG. 9 of the disclosure.

In accordance with the embodiment of the disclosure illustrated in FIG. 11 and as a non-limiting example, the joint assembly 200H includes a stub shaft 400 that is drivingly connected to the second joint member 272. Disposed radially outboard from at least a portion of the stub shaft 400 and/or the first joint member 232D and connected to at least a portion of the stub shaft 400 and/or the first joint member 232D is the flexible boot 418 and the boot can 480 illustrated in FIG. 11 of the disclosure.

FIG. 12 is a schematic side-view of the joint assembly illustrated in FIGS. 3, 6 and 9-11 according to an alternative embodiment of the disclosure. The joint assembly 200I illustrated in FIG. 12 is the same as the joint assemblies 200, 200C and 200F-220G illustrated in FIGS. 3, 6 and 9-11, except where specifically noted below. In accordance with the embodiment of the disclosure illustrated in FIG. 12 and as a non-limiting example, the joint assembly 200I does not include the use of the first nut 216 and the nut snap-ring 256 or 256A to axially restrain the first shaft to the first joint member 232 or 232E.

As illustrated in FIG. 12 of the disclosure and as a non-limiting example, at least a portion of the first end portion 238 of the first joint member 232E of the joint assembly 200I is drivingly connected to at least a portion of the second end portion 362 of the first shaft 350 via the plurality of axially extending splines 250 and 364. Additionally, as illustrated in FIG. 12 of the disclosure and as a non-limiting example, the first shaft 350 is axially restrained to the first end portion 238 of the first joint member 232 by using the snap-ring 370 that is disposed within at least a portion of the first shaft snap-ring groove 366 and the first joint member snap-ring groove 368 of the joint assembly 200I.

FIG. 13 is a schematic side view of the joint assembly illustrated in FIGS. 3, 7 and 9 according to an alternative embodiment of the disclosure. The joint assembly 200J illustrated in FIG. 13 is the same as the joint assemblies 200, 200D and 200F illustrated in FIGS. 3, 7 and 9, except where specifically noted below. In accordance with the embodiment of the disclosure illustrated in FIG. 13 and as a non-limiting example, the joint assembly 200J does not include the one or more first joint member grooves 268 illustrated in FIGS. 3-8 of the disclosure.

As illustrated in FIG. 13 of the disclosure and as a non-limiting example, the joint assembly 200J includes a first joint member 232F. The first joint member 232F illustrated in FIG. 13 is the same as the first joint members 232, 232B and 232D illustrated in FIGS. 3, 7 and 9, except where specifically noted. In accordance with the embodiment of the disclosure illustrated in FIG. 13 and as a non-limiting example the first joint member 232F has the one or more first joint member grooves 601 circumferentially extending along at least a portion of the inner surface 262 of the second end portion 240 of the first joint member 232F. Additionally, in accordance with the embodiment of the disclosure illustrated in FIG. 13 and as a non-limiting example, the joint assembly 200J includes the use of the first nut 554 and the second nut 563 in order to axially restrain the first joint member 232F to the first shaft 510.

Disposed radially outboard from at least a portion of the stub shaft 292 and/or the first joint member 232J is the flexible boot 314 and the boot can 326. As a result, at least a portion of the flexile boot 314 is sealingly engaged with at least a portion of the stub shaft 292 and the boot can 326 and at least a portion of the boot can 326 is connected to at least a portion of the second end portion 262 of the first joint member 232F.

FIG. 14 is a schematic side-view of the joint assembly illustrated in FIGS. 3, 8, and 9 according to an alternative embodiment of the disclosure. The joint assembly 200K illustrated in FIG. 14 of the disclosure is the same as the joint assemblies 200, 200E and 200F, except where specifically noted below. In accordance with the embodiment of the disclosure illustrated in FIG. 14 of the disclosure and as a non-limiting example, the joint assembly 200K does not include the use of the first and second nuts 554 and 563 illustrated in FIGS. 7 and 13 of the disclosure.

As illustrated in FIG. 14 of the disclosure and as a non-limiting example, the joint assembly 200K includes a first joint member 232G. The first joint member 232G illustrated in FIG. 14 is the same as the first joint members 232, 232C and 232D illustrated in FIGS. 3, 8, and 9, except where specifically noted. In accordance with the embodiment of the disclosure illustrated in FIG. 14 and as a non-limiting example, the joint assembly 200K does not include the one or more first joint member grooves 268 illustrated in FIGS. 3-8 of the disclosure. In accordance with the embodiment of the disclosure illustrated in FIG. 14 and as a non-limiting example the first joint member 232G has the one or more first joint member grooves 601 circumferentially extending along at least a portion of the inner surface 262 of the second end portion 240 of the first joint member 232G. Additionally, in accordance with the embodiment of the disclosure illustrated in FIG. 14 and as a non-limiting example, the joint assembly 200K includes the use of the first nut 588 in order to axially restrain the first joint member 232G to the first shaft 510.

Disposed radially outboard from at least a portion of the stub shaft 292 and/or the first joint member 232G is the flexible boot 314 and the boot can 326. As a result, at least a portion of the flexile boot 314 is sealingly engaged with at least a portion of the stub shaft 292 and the boot can 326 and at least a portion of the boot can 326 is connected to at least a portion of the second end portion 262 of the first joint member 232G.

FIGS. 15 and 15A schematically illustrated the joint assembly 200 illustrated in FIG. 3 according to an alternative embodiment of the disclosure. The joint assembly 200L illustrated in FIGS. 15 and 15A are the same as the joint assembly 200 illustrated in FIG. 3, except where specifically noted below. In accordance with this embodiment of the disclosure illustrated in FIGS. 15 and 15A and as a non-limiting example, the joint assembly 200L illustrated in FIG.

15 may be a direct pinion mount tripod type constant velocity joint with plunging and articulating capabilities.

According to the embodiment of the disclosure illustrated in FIGS. 15 and 15A and as a non-limiting example, the first joint member 232H of the joint assembly 200L does not include the one or more first joint member grooves 268. In accordance with the embodiment of the disclosure illustrated in FIG. 15 and as a n on-limiting example, the inner surface 262 of the second end portion 240 of the first joint member 232H has one or more first joint member grooves 701 circumferentially extending along at least a portion of the inner surface 262 of the second end portion 240 of the first joint member 232H.

Drivingly connected to at least a portion of the outer surface 294 of the first end portion 296 of the stub shaft 292 is a second joint member 700 having an inner surface 702 and an outer surface 704. Circumferentially extending from at least a portion of the inner surface 702 of the second joint member 700 is a plurality of axially extending second joint member splines 706 that are complementary to and meshingly engaged with the plurality of axially extending stub shaft splines 302 on the outer surface 294 of the first end portion 296 of the stub shaft 292. It is within the scope of this disclosure and as a non-limiting example that the second joint member 700 may be a spider.

Extending from the outer surface 704 of the second joint member 700 is one or more trunnions 708 having an outer surface 710. As illustrated in FIGS. 15 and 15A of the disclosure and as a non-limiting example, at least a portion of the one or more trunnions 708 extend within the one or more first joint member grooves 701 in the inner surface 262 of the second end portion 240 of the first joint member 232H. According to an embodiment of the disclosure and as a non-limiting example, the one or more trunnions 708 may be substantially cylindrical in shape.

Interposed between the one or more first joint member grooves 701 of the first joint member 232H and the outer surface 710 of the one or more trunnions 708 is one or more torque transfer elements 712. The one or more torque transfer elements 712 drivingly connect the stub shaft 292 to the first joint member 232H of the joint assembly 200L. Additionally, the one or more torque transfer elements 712 are freely rotatable thereby reducing the amount of friction between the one or more trunnions 708 and the first joint member 232 of the joint assembly 200L when in operation. It is within the scope of this disclosure and as a non-limiting example that the one or more torque transfer elements 712 may have a substantially cylindrical internal surface 714.

On or more inner roller elements 716 having a substantially cylindrical internal surface 718 may be interposed between the substantially cylindrical internal surface 714 of the one or more torque transfer elements 712 and the outer surface 710 of the one or more trunnions 708 of the joint assembly 200L. The one or more inner rolling elements 716 aid in reducing the amount of friction between the one or more torque transfer elements 712 and the one or more trunnions 708 when in operation. It is within the scope of this disclosure and as a non-limiting example that the one or more inner roller elements 716 may be a needle bearing assembly or a bushing.

Disposed radially outboard from the one or more inner roller elements 716 is a trunnion snap-ring groove 720. As illustrated in FIGS. 15 and 15A of the disclosure and as a non-limiting example, the trunnion snap-ring groove 720 circumferentially extends along at least a portion of the outer surface 710 of the one or more trunnions 708.

At least a portion of a trunnion snap-ring 722 is received and/or retained within at least a portion of the trunnion snap-ring groove 720 in the outer surface 710 of the one or more trunnions 708 of the joint assembly 200L. According to an embodiment of the disclosure and as a non-limiting example the joint assembly 200L may include the use of a spacer 723 that is interposed between the snap-ring 722 and the one or more inner roller elements 716. As best seen in FIG. 15A of the disclosure and as a non-limiting example, the snap-ring 722 and the spacer 723 aid in radially retaining the one or more inner roller elements 716 and/or the one or more torque transfer elements 712 on the one or more trunnions 708 of the joint assembly 200L.

FIG. 16 is a schematic side-view of the joint assembly illustrated in FIGS. 3, 4, 10, 15 and 15A according to an alternative embodiment of the disclosure. The joint assembly 200M illustrated in FIG. 16 is the same as the joint assemblies 200, 200A, 200G and 200L illustrated in FIGS. 3, 4, 10, 15 and 15A, except where specifically noted below. In accordance with the embodiment of the disclosure illustrated in FIG. 16, the joint assembly 200M does not include the use of the first nut 216 and the nut snap-ring 256 or 256A to axially restrain the first shaft to the first joint member 232A, 232E or 232H.

As illustrated in FIG. 16 of the disclosure and as a non-limiting example, the joint assembly 200M includes the use of a first joint member 232I. The first joint member 232I illustrated in FIG. 16 is the same as the first joint members 232, 232A, 232E or 232H illustrated in FIGS. 3, 4, 10, 15 and 15A, except where specifically noted. In accordance with the embodiment of the disclosure illustrated in FIG. 16 and as a non-limiting example, the first joint member 232I includes the one or more first joint member grooves 701 circumferentially extending along at least a portion of the inner surface 262 of the second end portion 240 of the first joint member 232I.

According to the embodiment of the disclosure illustrated in FIG. 16 and as a non-limiting example, at least a portion of the first end portion 238 of the first joint member 232I of the joint assembly 200M is drivingly connected to at least a portion of the second end portion 362 of the first shaft 350 via the plurality of axially extending splines 250 and 364. Additionally, according to the embodiment of the disclosure illustrated in FIG. 15 of the disclosure and as a non-limiting example, the first shaft 350 is axially restrained to the first end portion 238 of the first joint member 232I by using the snap-ring 370 disposed within at least a portion of the first shaft snap-ring groove 366 and the first joint member snap-ring groove 368 of the joint assembly 200M.

FIG. 17 is a schematic side-view of the joint assembly illustrated in FIGS. 3, 5, 11, 15 and 15A, according to an alternative embodiment of the disclosure. The joint assembly 200N illustrated in FIG. 17 is the same as the joint assemblies 200, 200B, 200l1 and 200 L illustrated in FIG. 13, except where specifically noted below. In accordance with this embodiment of the disclosure illustrated in FIG. 17 and as a non-limiting example, the joint assembly 200N may be a direct pinion mount tripod type constant velocity joint with plunging and articulating capabilities.

As illustrated in FIG. 17 of the disclosure and as a non-limiting example, the joint assembly 200N does not include the use of the stub shaft 292, the boot can 326 and the flexible boot 314 illustrated in FIGS. 3 and 15 of the disclosure. According to the embodiment of the disclosure illustrated in FIG. 17 of the disclosure and as a non-limiting example, the joint assembly 200N includes the use of the first joint member 232I1 illustrated in FIG. 15. At least a portion of the first end portion 238 of the first joint member 232H of the joint assembly 200N is drivingly connected to at least a portion of the second end portion of the first shaft 202 via the plurality of axially extending splines 230 and 250. Additionally, according to the embodiment of the disclosure illustrated in FIG. 17 and as a non-limiting example the first joint member 232I1 is axially restrained to the first shaft 202 by using the first nut 216 and the nut snap-ring 256 or 256A disposed within at least a portion of the first joint member snap-ring groove 252 and the nut snap-ring groove 254 of the joint assembly 200N.

Additionally, in accordance with the embodiment of the disclosure illustrated in FIG. 17 and as a non-limiting example the joint assembly 200N includes the use of the stub shaft 400 that is drivingly connected to at least a portion of the second joint member 700. As a result, it is within the scope of this disclosure and as a non-limiting example that the plurality of axially extending second joint member splines 706 on the inner surface 702 of the second joint member 700 are complementary to and meshingly engaged with the plurality of axially extending splines 410 on the outer surface 402 of the first end portion 404 of the stub shaft 400.

Disposed radially outboard from at least a portion of the stub shaft 400 and/or the first joint member 232H is the boot can 480 and the flexible boot 418. The boot can 480 and the flexible boot 418 illustrated in FIG. 17 are the same as the boot can 480 and the flexible boot 418 illustrated in FIGS. 5 and 12 of the disclosure. As a result, at least a portion of the flexible boot 418 is sealingly engaged with at least a portion of the stub shaft 400 and the boot can 480 and at least a portion of the boot can 480 is connected to at least a portion of the second end portion 240 of the first joint member 232H.

FIG. 18 is a schematic side-view of the joint assembly illustrated in FIGS. 3, 5, 12, 15, 15A and 16 according to an alternative embodiment of the disclosure. The joint assembly 200P illustrated in FIG. 18 is the same as the joint assemblies 200, 200B, 200I, 200L and 200M illustrated in FIGS. 3, 5, 12, 15, 15A and 16, except where specifically noted below. In accordance with the embodiment of the disclosure illustrated in FIG. 18, the joint assembly 200P does not include the use of the first nut 216 and the nut snap-ring 256 or 256A to axially restrain the first shaft to the first joint member 232, 232E, 232H or 232I.

As illustrated in FIG. 18 of the disclosure and as a non-limiting example, at least a portion of the first end portion 238 of the first joint member 232I is drivingly connected to at least a portion of the second end portion of the first shaft 350 via the plurality of axially extending splines 250 and 364. Additionally, as illustrated in FIG. 18 of the disclosure and as a non-limiting example, the first joint member 232I is axially restrained to the first shaft 350 by using the snap-ring 370 disposed within the first shaft snap-ring groove 366 and the first joint member snap-ring groove 368.

In accordance with the embodiment of the disclosure illustrated in FIG. 18 and as a non-limiting example, the joint assembly 200P includes the stub shaft 400 that is drivingly connected to at least a portion of the second joint member 700. Disposed radially outboard from at least a portion of the stub shaft 400 and/or the first joint member 232I is the boot can 480 and the flexible boot 418. The boot can 480 and the flexible boot 418 illustrated in FIG. 18 are the same as the boot can 480 and the flexible boot 418 illustrated in FIGS. 5, 12 and 17 of the disclosure. As a result, at least a portion of the flexible boot 418 is sealingly engaged with at least a portion of the stub shaft 400 and the boot can 480 and at least a portion of the boot can 480 is connected to at least a portion of the second end portion 240 of the first joint member 232I.

Figure 19:
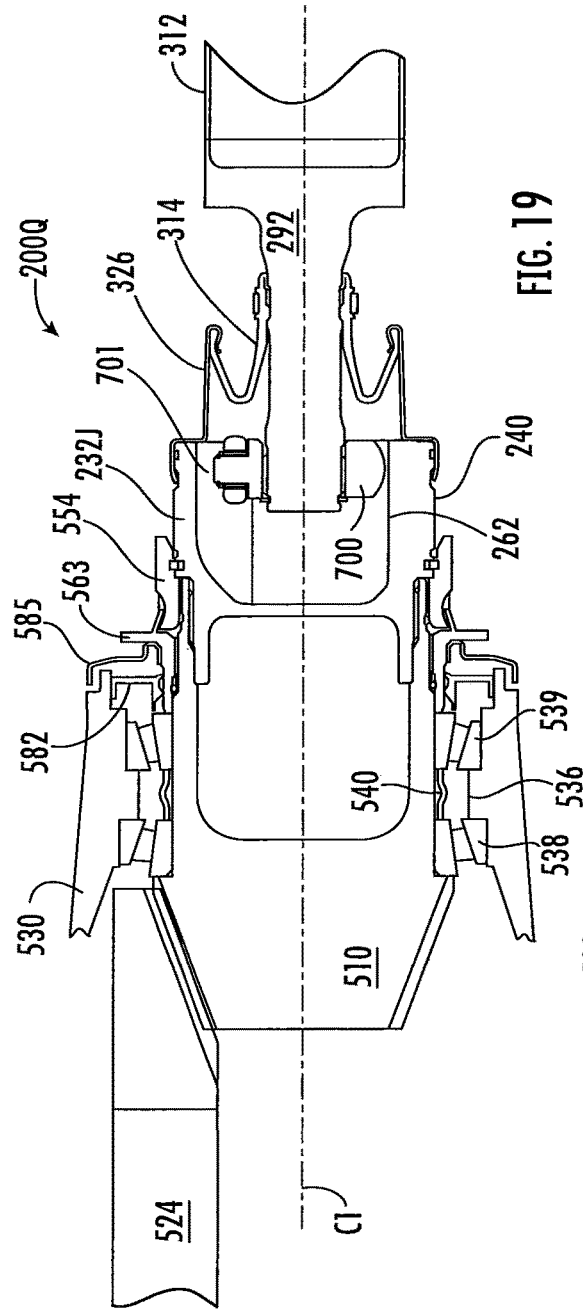
FIG. 19 is a schematic side-view of the joint assembly illustrated in FIGS. 3, 7, 13, 15 and 15A according to an alternative embodiment of the disclosure.

FIG. 19 is a schematic side-view of the joint assembly illustrated in FIGS. 3, 7, 13, 15 and 15A according to an alternative embodiment of the disclosure. The joint assembly 200Q illustrated in FIG. 19 is the same as the joint assemblies 200, 200D, 200J and 200L, illustrated in FIGS. 3, 7, 12, 15 and 15A, except where specifically noted below. In accordance with the embodiment of the disclosure illustrated in FIG. 19 and as a non-limiting example, the joint assembly 200Q does not include the one or more first joint member grooves 268 or 601 illustrated in FIGS. 3-14 of the disclosure.

As illustrated in FIG. 19 of the disclosure and as a non-limiting example, the joint assembly 200Q includes a first joint member 232J. The first joint member 232J illustrated in FIG. 19 is the same as the first joint members 232, 232B, 232F and 232H illustrated in FIGS. 3, 7, 13, 15 and 15A, except where specifically noted. In accordance with the embodiment of the disclosure illustrated in FIG. 19 and as a non-limiting example the first joint member 232J has the one or more first joint member grooves 701 circumferentially extending along at least a portion of the inner surface 262 of the second end portion 240 of the first joint member 232J. Additionally, in accordance with the embodiment of the disclosure illustrated in FIG. 19 and as a non-limiting example, the joint assembly 200Q includes the use of the first nut 554 and the second nut 563 in order to axially restrain the first joint member 232J to the first shaft 510.

Disposed radially outboard from at least a portion of the stub shaft 292 and/or the first joint member 232J is the flexible boot 314 and the boot can 326. As a result, at least a portion of the flexile boot 314 is sealingly engaged with at least a portion of the stub shaft 292 and the boot can 326 and at least a portion of the boot can 326 is connected to at least a portion of the second end portion 262 of the first joint member 232J.

Figure 20:
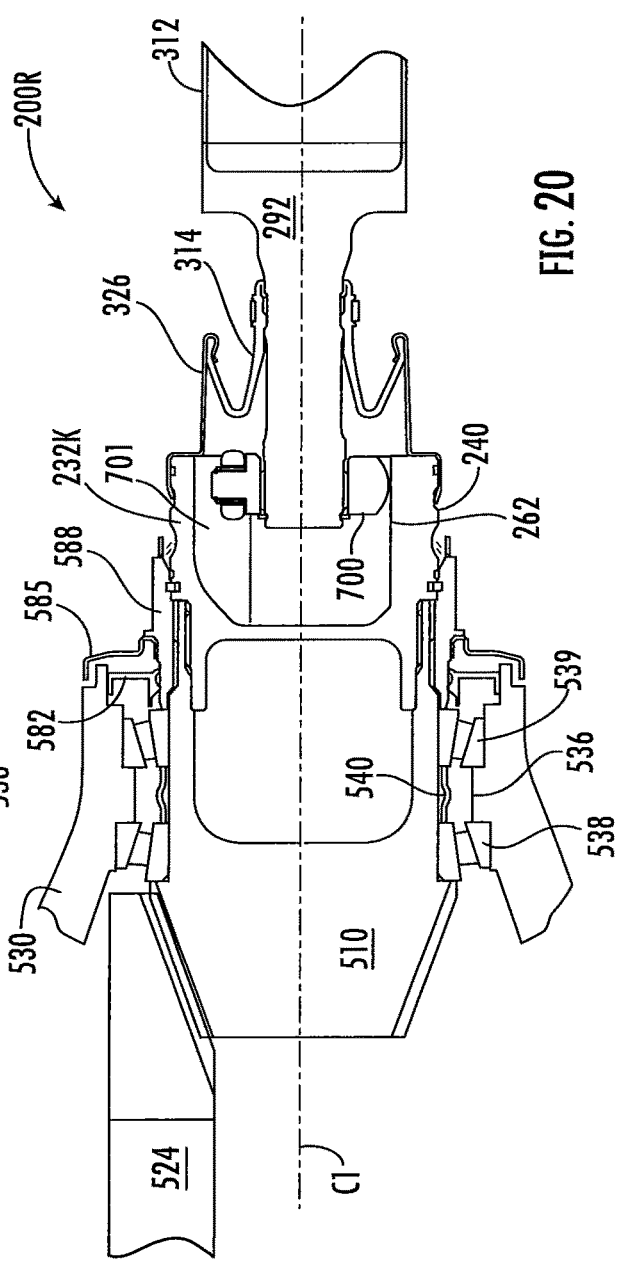
FIG. 20 is a schematic side-view of the joint assembly illustrated in FIGS. 3, 7, 8, 13-15A and 19 according to an alternative embodiment of the disclosure.

FIG. 20 is a schematic side-view of the joint assembly illustrated in FIGS. 3, 7, 8, 13-15A and 19 according to an alternative embodiment of the disclosure. The joint assembly 200R illustrated in FIG. 20, is the same as the joint assemblies 200, 200D, 200E, 200J, 200K, 200L and 200Q, except where specifically noted below. In accordance with the embodiment of the disclosure illustrated in FIG. 20 and as a non-limiting example, the joint assembly 200R does not include the use of the first and second nuts 554 and 563 illustrated in FIGS. 7, 13 and 19 of the disclosure.

As illustrated in FIG. 20 of the disclosure and as a non-limiting example, the joint assembly 200R includes a first joint member 232K. The first joint member 232K illustrated in FIG. 20 is the same as the first joint members 232, 232B, 232C, 232F, 232G, 232H and 232J illustrated in FIGS. 3, 7, 8, 13-15A and 19, except where specifically noted. In accordance with the embodiment of the disclosure illustrated in FIG. 20 and as a non-limiting example, the joint assembly 200R does not include the one or more first joint member grooves 268 or 601 illustrated in FIGS. 3-14 of the disclosure. In accordance with the embodiment of the disclosure illustrated in FIG. 20 and as a non-limiting example the first joint member 232K has the one or more first joint member grooves 701 circumferentially extending along at least a portion of the inner surface 262 of the second end portion 240 of the first joint member 232K. Additionally, in accordance with the embodiment of the disclosure illustrated in FIG. 20 and as a non-limiting example, the joint assembly 200R includes the use of the first nut 588 in order to axially restrain the first joint member 232K to the first shaft 510.

Disposed radially outboard from at least a portion of the stub shaft 292 and/or the first joint member 232K is the flexible boot 314 and the boot can 326. As a result, at least a portion of the flexile boot 314 is sealingly engaged with at least a portion of the stub shaft 292 and the boot can 326 and at least a portion of the boot can 326 is connected to at least a portion of the second end portion 262 of the first joint member 232K.

FIGS. 21 and 21A are schematically illustrate the joint assembly illustrated in FIG. 3 according to an alternative embodiment of the disclosure. The joint assembly 200S illustrated in FIGS. 21 and 21A are the same as the joint assembly 200 illustrated in FIG. 3, except where specifically noted below. In accordance with this embodiment of the disclosure illustrated in FIG. 21 and as a non-limiting example, the joint assembly 200S illustrated in FIGS. 21 and 21A may be a fixed direct pinion mount sliding ball type constant velocity joint with articulation but not plunging capabilities.

As best seen in FIG. 21 of the disclosure and as a non-limiting example, the joint assembly 200S includes a first joint member 800 having a first end 801, a second end 803, a first end portion 802, a second end portion 806 and an intermediate portion 804 disposed between the first and second end portions 802 and 806. The first end portion 802 of the first joint member 800 has an inner surface 808 and an outer surface 810 defining a hollow portion 812 therein. In accordance with an embodiment of the disclosure and as a non-limiting example, the hollow portion 812 of the first end portion 802 of the first joint member 800 may be substantially cylindrical in shape.

Circumferentially extending along at least a portion of the inner surface 808 of the first end portion 802 of the first joint member 800 is a plurality of axially extending splines 814. The plurality of axially extending first joint member splines 814 on the inner surface 808 of the first end portion 802 of the first joint member 800 are complementary to and meshingly engaged with the plurality of axially extending first shaft splines 230 on the outer surface 208 of the second end portion 206 of the first shaft 202.

A first joint member snap-ring groove 816 circumferentially extends along at least a portion of the outer surface 810 of the first end portion 802 of the first joint member 800. As best seen in FIG. 21 of the disclosure and as a non-limiting example, at least a portion of the second inner surface 220 of the first nut 216 is disposed radially outboard from and extends co-axially with the first end portion 802 of the first joint member 800 of the joint assembly 200. In accordance with the embodiment illustrated in FIG. 21 and as a non-limiting example, the first joint member snap-ring groove 816 is complementary to a nut snap-ring grove 254 circumferentially extending along at least a portion of the second inner surface 220 of the first nut 216. At least a portion of the nut snap-ring 256 or 256A is received and/or retained within the first joint member snap-ring groove 816 and the nut snap-ring groove 254 of the joint assembly 200S. The nut snap-ring 256 or 256A aids in axially restraining the first nut 216 to the first joint member 800 and therefore the first joint member 800 to the first shaft 202 of the joint assembly 200S.

Disposed axially inboard from the first joint member snap-ring groove 816 is an O-ring groove 818. The O-ring groove 818 circumferentially extends along at least a portion of the outer surface 810 of the first end portion 802 of the first joint member 800. At least a portion of the O-ring 260 is received and/or retained within the O-ring groove 818. The O-ring 260 creates a seal between the second inner surface 220 of the first nut 216 and the outer surface 810 of the first end portion 802 of the first joint member 800. As a result, it is to be understood that the sealing engagement between the second inner surface 220 of the first nut 216 and the outer surface 810 of the first end portion 802 of the first joint member 800 aids in preventing the migration of dirt, debris and/or moisture into the connections between the first shaft 202, the first joint member 800 and the first nut 216 of the joint assembly 200S.

Extending from the inner surface 808 to the outer surface 810 of the first end portion 802 of the first joint member 800 is one or more venting apertures 820.

According to the embodiment illustrated in FIG. 21 and as a non-limiting example, the second end portion 806 of the first joint member 800 has an inner surface 822 and an outer surface 824 defining a hollow portion 826 therein. In accordance with the embodiment of the disclosure illustrated in FIG. 21 as a non-limiting example, the outer surface 822 of the second end portion 806 of the first joint member 800 has a larger outer diameter than an outer diameter of the outer surface 810 of the first end portion 802 of the first joint member 800.

Circumferentially extending along at least a portion of the inner surface 824 of the second end portion 806 of the first joint member 800 is one or more first joint member grooves 828. As illustrated in FIGS. 21 and 21A and as a non-limiting example, the one or more axially extending first joint member grooves 828 may be substantially arcuate in shape. In accordance with the embodiment of the disclosure illustrated in FIG. 21A and as a non-limiting example, an outermost surface 829 of the one or more first joint member grooves 828 in the inner surface 824 of the second end portion 806 of the first joint member 800 may have a center of curvature C7.

According the embodiment of the disclosure illustrated in FIG. 21 and as a non-limiting example, the intermediate portion 804 of the first joint member 800 may include a wall portion 830 having an axially inboard side 832 and an axially outboard side 834. It is within the scope of this disclosure and as a non-limiting example that the wall portion 830 may include one or more wall portion venting apertures 836 extending from the axially inboard side 832 to the axially outboard side 834 of the wall portion 830. The one or more wall portion venting apertures 836 fluidly connect the hollow portion 812 in the first end portion 802 of the first joint member 800 to the hollow portion 826 in the second end portion 806 of the first joint member 800. As a result, the one or more wall portion venting apertures 836 and the one or more venting apertures 820 allow an excess amount of pressure that builds up within the joint assembly 200S to be released to the atmosphere.

In accordance with an alternative embodiment of the disclosure (not shown) and as a non-limiting example, the joint assembly 200S may exclude the use of the one or more wall portion venting apertures 836 and/or the one or more venting apertures 820. As a result, the wall portion 830 will separate the hollow portion 812 in the first end portion 802 of the first joint member 800 from the hollow portion 826 in the second end portion 806 of the first joint member 800.

Disposed radially inboard from at least a portion of the second end portion 806 of the first joint member 800 of the joint assembly 200S is a second joint member 838 having an inner surface 840 and an outer surface 842. Circumferentially extending from at least a portion of the inner surface 840 of the second joint member 838 is a plurality of axially extending second joint member splines 844. As best seen in FIG. 21 of the disclosure and as a non-limiting example, the plurality of axially extending second joint member splines 844 are complementary to and meshingly engaged with the plurality of axially extending stub shaft splines 302 on the outer surface 294 of the first end portion 296 of the stub shaft 292. It is therefore to be understood that the plurality of axially extending splines 302 and 844 and drivingly connect the second joint member 838 to the stub shaft 292 of the joint assembly 200S.

Circumferentially extending along at least a portion of the outer surface 842 of the second joint member 838 is one or more second joint member grooves 846. It is within the scope of this disclosure and as a non-limiting example that the one or more second joint member grooves 846 may be substantially arcuate in shape. As best seen in FIG. 21A of the disclosure and as a non-limiting example, an innermost surface 847 of the one or more second joint member grooves 846 in the outer surface 842 of the second joint member 838 may have a center of curvature C8. It is within the scope of this disclosure and as a non-limiting example, the center of curvature C7 of the one or more first joint member grooves 828 in the first joint member 800 and the one or more second joint member grooves 846 in the second joint member 838 may be disposed equidistant on opposite sides of a centerline C6 passing through one or more torque transfer elements 856 of the joint assembly 200S.

Interposed between the second joint member 838 and the second end portion 806 of the first joint member 800 is a cage 848 having an inner surface 850 and an outer surface 852. The cage 848 is slidingly engaged with both the inner surface 824 of the second end portion 806 of the first joint member 800 and the outer surface 842 of the second joint member 838. As best seen in FIG. 21 of the disclosure and as a non-limiting example, the inner surface 850 of the cage 848 may have a shape that is complementary to the outer surface 842 of the second joint member 838 of the joint assembly 200. Additionally, as best seen in FIG. 21 of the disclosure and as a non-limiting example, the outer surface 852 of the cage 848 may have a shape that is complementary to at least a portion of the inner surface 824 of the second end portion 806 of the first joint member 800. Extending from the inner surface 850 to the outer surface 852 of the cage 848 is one or more torque transfer element openings 854.

Drivingly connecting the second joint member 838 to the second end portion 806 of the first joint member 800 is the one or more torque transfer elements 856. As illustrated in FIG. 21 of the disclosure and as a non-limiting example, at least a portion of the one or more torque transfer elements 856 are disposed within the one or more one or more first joint member grooves 828, the one or more second joint member grooves 846 and the one or more torque transfer element openings 854. As a non-limiting example, the one or more torque transfer elements 856 may be one or more ball bearings.

In accordance with the embodiment of the disclosure illustrated in FIGS. 21 and 21A and as a non-limiting example, when the joint assembly 200S is assembled, the one or more torque transfer elements 856 and the cage 848 are aligned along the centerline C6. Furthermore, as illustrated in FIGS. 21 and 21A and as a non-limiting example, the centerline C6 of the one or more torque transfer elements 856 and the cage 848 may be different from the centerline (not shown) of the second joint member 838 of the joint assembly 200S.

A flexible boot 858 having a first end portion 860 and a second end portion 862 is disposed radially outboard from at least a portion of the stub shaft 292 of the joint assembly 200S. In accordance with the embodiment of the disclosure illustrated in FIG. 21 and as a non-limiting example, at least a portion of the second end portion 862 of the flexible boot 858 is sealingly engaged with at least a portion of the outer surface 294 of the stub shaft 292 and/or at least a portion of the outer surface 806 of the second end portion 806 of the first joint member 800. In accordance with the embodiment of the disclosure illustrated in FIG. 21 and as a non-limiting example, the flexible boot 858 may have a substantially J-shaped cross-section having a first substantially straight portion 864, a substantially arcuate portion 866 and a second substantially straight portion 868. As best seen in FIG. 21 of the disclosure and as a non-limiting example an end of the first end portion 860 of the flexible boot 858 is connected to an end of the first substantially straight portion 864 and an end of the first substantially straight portion 864, opposite the first end portion 860, is connected to an end of the substantially arcuate portion 866 of the flexible boot 858. Additionally, as best seen in FIG. 21 and as a non-limiting example, an end of the second substantially straight portion 868 of the flexible boot 858 is connected to an end of the substantially arcuate portion 866, opposite the first substantially straight portion 864. Furthermore, as best seen in FIG. 21 and as a non-limiting example, at least a portion of an end of the second substantially straight portion 868, opposite the substantially arcuate portion 866, is connected to at least a portion of the second end portion 862 of the flexible boot 858. The flexible boot 858 provides a flexible seal for the joint assembly 200S preventing the migration of dirt, debris and/or moisture into the joint assembly 200S. As a non-limiting example, the flexible boot 858 may be made of a polymeric material, a rubber material, an elastomeric material, a thermoplastic material or a combination thereof.

In accordance with an embodiment of the disclosure and as a non-limiting example, at least a portion of the second end portion 862 of the flexible boot 858 may be attached to and sealingly engaged with at least a portion of the outer surface 294 of the intermediate portion 300 of the stub shaft 292 by using a boot clamp 870.

At least a portion of the first end portion 860 of the flexible boot 858 may be attached to and sealingly engaged with at least a portion of the outer surface 822 of the second end portion 806 of the first joint member 800 by using a boot can 872 having a first end portion 874 and a second end portion 876. As best seen in FIG. 21 of the disclosure and as a non-limiting example, at least a portion of the first end portion 874 of the boot can 872 is attached to at least a portion of the outer surface 822 of the second end portion 806 of the first joint member 800. Additionally, at least a portion of the second end portion 876 of the boot can 872 is attached to at least a portion of the first end portion 860 of the flexible boot 858. It is within the scope of this disclosure and as a non-limiting example that the boot can 872 may be made of substantially rigid material such as but not limited to a metallic material, an aluminium alloy, a steel alloy, a carbon fibre material or a composite material.

In accordance with the embodiment of the disclosure illustrated in FIG. 21 and as a non-limiting example, the boot can 872 includes, in axial order from the first end portion 874 to the second end portion 876, a radially inwardly extending lip 878, a substantially horizontal portion 880, a radially inward extending portion 882, a concave portion 884 and a substantially hook-shaped portion 886. According to an embodiment of the disclosure and as a non-limiting example, the radially inward extending portion 882 of the boot can 872 extends substantially vertically from an end of the substantially horizontal portion 880 opposite the radially inward extending lip 878 to an end of the concave portion 884 opposite the substantially hook-shaped portion 886. Additionally, at least a portion of the radially inward extending portion 882 of the boot can 872 is in direct contact with the second end 803 of the first joint member 800 of the joint assembly 200S. The radially inward extending portion 882 of the boot can 872 acts as a stopper to prevent the boot can 872 from extending along the outer surface 822 of the second end portion 806 of the first joint member 800 beyond a pre-determined distance.

According to the embodiment of the disclosure illustrated in FIG. 21 and as a non-limiting example, the second end portion 806 of the first joint member 800 may include a protruding portion 887 circumferentially extending along at least a portion of the outer surface 822 of the second end portion 806 of the first joint member 800. As a non-limiting example, the protruding portion 887 may be disposed adjacent to and axially inboard from the second end 803 of the first joint member 800. In accordance with the embodiment of the disclosure illustrated in FIG. 21 and as a non-limiting example, at least a portion of the substantially horizontal portion 880 may be in direct contact with at least a portion of the protruding portion 887 on the second end portion 806 of the first joint member 800. The protruding portion 887 and the radially inward extending lip 878 are used to ensure that the boot can 872 is securely attached to the second end portion 806 of the first joint member 800 in order to ensure that the boot can 872 does not become prematurely detached from the first joint member 800 when in operation.

Circumferentially extending along at least a portion of the outer surface 822 of the protruding portion 887 is a second O-ring groove 888. As best seen in FIG. 21 of the disclosure and as a non-limiting example, at least a portion of an O-ring 890 is received and/or retained within at least a portion of the O-ring groove 888. The O-ring 890 provides a seal between the outer surface 822 of the second end portion 806 of the first joint member 800 and an inner surface 892 of the boot can 872. The sealing engagement between the outer surface 822 of the first joint member 800 and an inner surface 892 of the boot can 872 aids in preventing the migration of dirt, debris and/or moisture into the joint assembly 200S thereby improving the overall life and durability of the joint assembly 200S.

Finally, at least a portion of the first end portion 860 of the flexible boot 858 may be received and/or retained within at least a portion of the substantially hook-shaped portion 886 of the boot can 872.

FIG. 22 is a schematic side-view of the joint assembly illustrated in FIGS. 3, 4, 21 and 21A according to an alternative embodiment of the disclosure. The joint assembly 200 illustrated in FIG. 22 is the same as the joint assemblies 200, 200A and 200S illustrated in FIGS. 3, 4, 21 and 21A, except where specifically noted below. In accordance with the embodiment of the disclosure illustrated in FIG. 22, the joint assembly 200T does not include the use of the first nut 216 and the nut snap-ring 256 or 256A to axially restrain the first shaft to the first joint member 800 or 800A.

As illustrated in FIG. 22 of the disclosure and as a non-limiting example, the joint assembly 200T includes a first joint member 800A. The first joint member 800A illustrated in FIG. 22 is the same as the first joint member 800, except where specifically noted. In accordance with the embodiment of the disclosure illustrated in FIG. 22 and as a non-limiting example, the first joint member 800A may have a first joint member snap-ring groove 821 circumferentially extending along at least a portion of the inner surface 808 of the first end portion 802 of the first joint member 800A. As illustrated in FIG. 22 of the disclosure and as a non-limiting example, the first joint member snap-ring groove 821 is disposed axially outboard from and is directly adjacent to the one or more venting apertures 821 in the first joint member 800. Additionally, as illustrated in FIG. 22 of the disclosure and as a non-limiting example, the first joint member snap-ring groove 821 is interposed between the one or more venting apertures 821 and the plurality of axially extending first joint member splines 814 on the inner surface of the first end portion 802 of the first joint member 800A. The first joint member snap-ring groove 821 is complementary to the first shaft snap-ring groove 366 in the outer surface 360 of the first shaft 350.

At least a portion of the snap-ring 370 is received and/or retained within at least a portion of the first shaft snap-ring groove 366 and the first joint member snap-ring groove 821 of the joint assembly 200T. The snap-ring 370 axially restrains the first shaft 350 to the first joint member 800A of the joint assembly 200T. In accordance with an embodiment of the disclosure and as a non-limiting example, the snap-ring 370 may be substantially circular, substantially oval or substantially elliptical in shape. According to an alternative embodiment of the disclosure and as a non-limiting example, the snap-ring 370 may have a substantially polygonal shape being defined by a chain of substantially straight line segments. It is therefore within the scope of this disclosure that the snap-ring 370 may have a shape similar to the substantially polygonal shape of the snap-rings 256 or 256A illustrated in FIG. 3A or 3B of the disclosure.

FIG. 23 is a schematic side-view of the joint assembly illustrated in FIGS. 3, 21 and 21A according to an alternative embodiment of the disclosure. The joint assembly 200U illustrated in FIG. 23 is the same as the joint assemblies 200 and 200S illustrated in FIGS. 3, 21 and 21A, except where specifically noted below. As illustrated in FIG. 23 of the disclosure and as a non-limiting example, the joint assembly 200U includes a first joint member 800B. The first joint member 800B illustrated in FIG. 23 is the same as the first joint member 800 illustrated in FIGS. 21 and 21A, except where specifically noted. In accordance with the embodiment of the disclosure illustrated in FIG. 23 and as a non-limiting example, the first joint member 800B does not include the use of the protruding portion 887, the O-ring groove 888, the O-ring 890, the one or more venting apertures 820 or the one or more wall portion venting apertures 836 illustrated in FIGS. 21 and 21A of the disclosure Additionally, in accordance with this embodiment of the disclosure illustrated in FIG. 23 and as a non-limiting example, the joint assembly 200U does not include the use of the boot can 872 or the flexible boot 858. As illustrated in FIG. 23 of the disclosure and as a non-limiting example, the joint assembly 200U includes the use of a flexible boot 900 having a first end portion 902 and a second end portion 904. The flexible boot 900 provides a flexible seal for the joint assembly 200U preventing the migration of dirt, debris and/or moisture into the joint assembly 200U. It is within the scope of this disclosure and as a non-limiting example that the flexible boot 900 may be made of a polymeric material, a rubber material, an elastomeric material, a thermoplastic material or a combination thereof.

Interposed between the first end portion 902 and the second end portion 904 of the flexible boot 900 is a plurality of convolutions 906. As illustrated in FIG. 23 of the disclosure and as a non-limiting example, the flexible boot 900 may include, in axial order from the first to the second end portion 902 and 904 of the flexible boot 900, a first trough 908, a first crest 910, a second trough 912, a second crest 914, a third trough 916, a third crest 918, a fourth trough 920, a fourth crest 922, a fifth trough 924 and a fifth crest 926. In accordance with the embodiment of the disclosure illustrated in FIG. 23 and as a non-limiting example, the first crest 910 has a diameter D1, the second crest 914 has a diameter D2, the third crest 918 has a diameter D3, the fourth crest 922 has a diameter D4 and the fifth crest 926 has a diameter D5. It is within the scope of this disclosure and as a non-limiting example that the diameter D1 is greater than the diameter D2 which in turn is greater than the diameter D3 which in turn is greater than the diameter D4 which in turn is greater than the diameter D5 of the flexible boot 900.

As illustrated in FIG. 23 of the disclosure and as a non-limiting example, at least a portion of the second end portion 904 of the flexible boot 900 is attached to and sealingly engaged with at least a portion of the outer surface 294 of the stub shaft 292 of the joint assembly 200U by using a first boot clamp 928. Additionally, in accordance with the embodiment of the disclosure illustrated in FIG. 23 and as a non-limiting example, at least a portion of the first end portion 902 of the flexible boot 900 may be directly connected to and sealingly engaged with at least a portion of the outer surface 822 of the second end portion 806 of the first joint member 800 by using a second boot clamp 930.

The flexible boot 900 further includes a first radially inward extending boot leg 932. An end of the first radially inward extending boot leg 932, opposite the first trough 908, is connected to the first end portion 902 of the flexible boot 900. Additionally, an end of the first radially inward extending boot leg 932, opposite the first end portion 902 of the flexible boot 900, is connected to an end of the first trough 908. At least a portion of an inner surface 934 of the first radially inward extending boot leg 932 is in direct contact with at least a portion of the second end 803 of the first joint member 800B of the joint assembly 200U.

It is within the scope of this disclosure that the flexible boot 900 illustrated in FIG. 23 may be used to in connection with the joint assemblies 200-200T illustrated in FIGS. 3-22 of the disclosure. As a result, at least a portion of the first end portion 902 of the flexible boot 900 may be directly attached to and sealingly engaged with at least a portion of the outer surfaces 264 and 822 of the first joint members 232-232K, 800 and 800A of the joint assemblies 200-200S and the second end portion 904 of the flexible boot 900 may be directly attached to and sealingly engaged with at least a portion of the outer surfaces 294 and 402 of the stub shafts 292 and 400.

FIG. 24 is a schematic side-view of the joint assembly illustrated in FIGS. 3, 4, 21, 21A, 22 and 23 according to an alternative embodiment of the disclosure. The joint assembly 200V illustrated in FIG. 24 is the same as the joint assemblies 200, 200A, 200S, 200T and 200U illustrated in FIGS. 3, 4, 21, 21A, 22 and 23, except where specifically noted below. In accordance with the embodiment of the disclosure illustrated in FIG. 24 and as a non-limiting example, the joint assembly 200V does not include the use of the first nut 216 and the nut snap-ring 256 or 256A to axially restrain the first shaft to the first joint member.

As illustrated in FIG. 24 of the disclosure and as a non-limiting example, the joint assembly 200V includes a first joint member 800C. The first joint member 800C illustrated in FIG. 24 is the same as the first joint members 232, 232A, 800, 800A and 800B, except where specifically noted. In accordance with the embodiment of the disclosure illustrated in FIG. 24 and as a non-limiting example, the first end portion 802 of the first joint member 800C of the joint assembly 200V is drivingly connected to the second end portion 362 of the first shaft 350 via the plurality of axially extending splines 364 and 814. Additionally, in accordance with the embodiment of the disclosure illustrated in FIG. 24 and as a non-limiting example, the first shaft 350 is axially restrained to the first end portion 802 of the first joint member 800 by using the snap-ring 370 received and/or retained within at least a portion of the snap-ring grooves 366 and 821.

FIG. 25 is a schematic side view of the joint assembly illustrated in FIGS. 3, 7, 13, 19, 21, 21A and 23 according to an alternative embodiment of the disclosure. The joint assembly 200W illustrated in FIG. 25 is the same as the joint assemblies 200, 200D, 200J, 200Q, 200S and 200U illustrated in FIGS. 3, 7, 13, 19, 21, 21A and 23, except where specifically noted below. In accordance with the embodiment of the disclosure illustrated in FIG. 25 and as a non-limiting example, the joint assembly 200W does not include the one or more first joint member grooves 268, 601 and 701 illustrated in FIGS. 3-20 of the disclosure.

As illustrated in FIG. 25 of the disclosure and as a non-limiting example, the joint assembly 200W includes a first joint member 800D. The first joint member 800D illustrated in FIG. 25 is the same as the first joint members 232, 232B, 232F, 232J, 800 and 800B illustrated in FIGS. 3, 7, 13, 19, 21, 21A and 23, except where specifically noted. In accordance with the embodiment of the disclosure illustrated in FIG. 25 and as a non-limiting example the first joint member 800D has the one or more first joint member grooves 828 circumferentially extending along at least a portion of the inner surface 262 of the second end portion 240 of the first joint member 800D. Additionally, in accordance with the embodiment of the disclosure illustrated in FIG. 25 and as a non-limiting example, the joint assembly 200W includes the use of the first nut 554 and the second nut 563 in order to axially restrain the first joint member 800D to the first shaft 510.

Disposed radially outboard from at least a portion of the stub shaft 292 and/or the first joint member 800D is the flexible boot 900. As a result, at least a portion of the second end portion 904 of the flexile boot 900 is sealingly engaged with at least a portion of the stub shaft 292 and at least a portion of the first end portion 902 of the flexible boot 900 is sealingly engaged with at least a portion of the second end portion 262 of the first joint member 800D.

FIG. 26 is a schematic side view of the joint assembly illustrated in FIGS. 3, 7, 8, 13, 14, 19-21A, 23 and 25 according to an alternative embodiment of the disclosure. The joint assembly 200X illustrated in FIG. 26 is the same as the joint assemblies 200, 200D, 200E 200J, 200K, 200Q, 200R, 200S, 200U and 200W illustrated in FIGS. 3, 7, 8, 13, 14, 19-21A, 23 and 25, except where specifically noted below. In accordance with the embodiment of the disclosure illustrated in FIG. 26 and as a non-limiting example, the joint assembly 200X does not include the one or more first joint member grooves 268, 601 and 701 illustrated in FIGS. 3-20 of the disclosure.

As illustrated in FIG. 26 of the disclosure and as a non-limiting example, the joint assembly 200X includes a first joint member 800E. The first joint member 800E illustrated in FIG. 26 is the same as the first joint members 232, 232B, 232F, 232G, 232J, 232K, 800, 800B and 800D illustrated in FIGS. 3, 7, 8, 13, 14, 19-21A, 23 and 25, except where specifically noted. In accordance with the embodiment of the disclosure illustrated in FIG. 26 and as a non-limiting example, the joint assembly 200X does not include the one or more first joint member grooves 268, 601 and 701 illustrated in FIGS. 3-20 of the disclosure. In accordance with the embodiment of the disclosure illustrated in FIG. 26 and as a non-limiting example the first joint member 800E has the one or more first joint member grooves 828 circumferentially extending along at least a portion of the inner surface 262 of the second end portion 240 of the first joint member 800E. Additionally, in accordance with the embodiment of the disclosure illustrated in FIG. 26 and as a non-limiting example, the joint assembly 200X includes the use of the first nut 588 in order to axially restrain the first joint member 800E to the first shaft 510.

Disposed radially outboard from at least a portion of the stub shaft 292 and/or the first joint member 800E is the flexible boot 900. As a result, at least a portion of the second end portion 904 of the flexile boot 900 is sealingly engaged with at least a portion of the stub shaft 292 and at least a portion of the first end portion 902 of the flexible boot 900 is sealingly engaged with at least a portion of the second end portion 262 of the first joint member 800E.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed:

1. A joint assembly comprising:
    a first joint member drivingly connected to a second joint member by one or more torque transmission elements;
    a first shaft having a first end portion, a second end portion and an outer surface;
    a snap-ring, said snap-ring in an unassembled state having a substantially polygonal shape defined by a plurality of interconnected substantially straight portions;
        wherein said snap-ring in said unassembled state has a first plurality of substantially straight portions having a circumscribed radius R1 with a center that is offset from a Y-Y axis of said snap-ring by a distance D1;
        wherein said snap-ring in said unassembled state has a second plurality substantially straight portions having a circumscribed radius R2 with a center that is offset from said Y-Y axis of said snap-ring by a distance D2;
        wherein said snap-ring in said unassembled state has a third plurality of straight portions having a circumscribed radius R3 with a center that is offset from an X-X axis of said snap-ring by a distance D3; and
        wherein said snap-ring secures first shaft relative to said first joint member.

2. The joint assembly of claim 1, wherein said snap-ring, in said unassembled state, is substantially symmetrical about the Y-Y axis.

3. The joint assembly of claim 1, wherein said third plurality of straight portions is between said first plurality of straight portions and said second plurality of straight portions of said snap-ring, in said unassembled state.

4. The joint assembly of claim 1, wherein each of at least one of said first plurality of straight portions, said second plurality of straight portions, and said third plurality of straight portions is directly connected to another one of the at least one of said first plurality of straight portions, said second plurality of straight portions, and said third plurality of straight portions of said snap-ring, in said unassembled state.

5. A joint assembly, comprising:
    a first joint member drivingly connected to a second joint member by one or more torque transmission elements;
        wherein a first end portion of said first joint member has a first hollow portion and a second end portion of said first joint member has a second hollow portion;
        wherein at least a portion of said second joint member and said one or more torque transmission elements are disposed within said second hollow portion of said first joint member;
    a first shaft having a first end portion and a second end portion;
        wherein a plurality of axially extending first shaft splines circumferentially extend along at least a portion of an outer surface of said second end portion of said first shaft that are complementary to and meshingly engaged with a plurality of axially extending first joint member splines circumferentially extending along at least a portion of a first inner surface defining said first hollow portion of said first joint member;
    a first joint member snap-ring groove circumferentially extends along at least a portion of said first inner surface of said first joint member;
        wherein said first joint member snap-ring groove is complementary to a first shaft snap-ring groove circumferentially extending along at least a portion of said outer surface of said second end portion of said first shaft;
    a snap-ring, said snap-ring in an unassembled state having a substantially polygonal shape defined by a plurality of interconnected substantially straight portions;
        wherein at least a portion of said snap-ring is received and/or retained within at least a portion of said first joint member snap-ring groove in said first joint member and said first shaft snap-ring groove in said first shaft;
        wherein said snap-ring in said unassembled state has a first plurality of substantially straight portions having a circumscribed radius R1 with a center that is offset from a Y-Y axis of said snap-ring by a distance D1;
        wherein said snap-ring in said unassembled state has a second plurality substantially straight portions having a circumscribed radius R2 with a center that is offset from said Y-Y axis of said snap-ring by a distance D2; and
        wherein said snap-ring in said unassembled state has a third plurality of straight portions having a circumscribed radius R3 with a center that is offset from an X-X axis of said snap-ring by a distance D3.

6. The joint assembly of claim 5, wherein at least a portion of said first end portion of said first shaft has a gear member with a plurality of gear teeth; and
    wherein said first shaft is a transmission output shaft, transfer case output shaft, a power transfer unit output shaft, a pinion shaft, a differential input shaft, a differential pinion shaft or an inter-axle differential pinion shaft.

7. The joint assembly of claim 5, further comprising a stub shaft having a first end portion and a second end portion;
wherein at least a portion of said first end portion of said stub shaft is drivingly connected to at least a portion of said second joint member; and
wherein at least a portion of said second end portion of said stub shaft is drivingly connected to at least a portion of a second shaft.

8. The joint assembly of claim 5, wherein said first joint member further comprises a wall portion separating said first hollow portion of said first joint member from said second hollow portion of said first joint member.

9. The joint assembly of claim 5, wherein said distance D1 is substantially equal to said distance D2 of said snap-ring.

10. The joint assembly of claim 5, further comprising a flexible boot comprising a first end portion, a second end portion and a plurality of convolutions interposed between said first and second end portions of said flexible boot;
wherein said plurality of convolutions of said flexible boot comprises, in axial order from said first end portion to said second end portion of said flexible boot, a first trough, a first crest, a second trough, a second crest, a third trough, a third crest, a fourth trough, a fourth crest, a fifth trough and a fifth crest; and
wherein said first crest has a diameter D1, said second crest has a diameter D2, said third crest has a diameter D3, said fourth crest has a diameter D4 and said fifth crest has a diameter D5.

11. The joint assembly of claim 5, further comprising a flexible boot having a first end portion and a second end portion;
wherein said flexible boot comprises, in axial order from said first end portion to said second end portion of said flexible boot, a first trough, a first crest, a second trough, a second crest, a third trough, a third crest, a fourth trough, a fourth crest, a fifth trough, a fifth crest, a sixth trough, a sixth crest, a seventh trough, a seventh crest, an eighth trough, an eighth crest, a ninth trough, a ninth crest, a tenth trough, a tenth crest, an eleventh trough and an eleventh crest;
wherein said third crest, said fourth trough, said fourth crest, said fifth trough and said fifth crest forms a first substantially W-shaped portion;
wherein said fifth crest, said sixth trough, said sixth crest, said seventh trough and said seventh crest forms a second substantially W-shaped portion;
wherein said seventh crest, said eighth trough, said eighth crest, said ninth trough and said ninth crest forms a third substantially W-shaped portion; and
wherein said ninth crest, said tenth trough, said tenth crest, said eleventh trough and said eleventh crest forms a fourth substantially W-shaped portion.

12. The joint assembly of claim 5, further comprising a boot can having a first end portion and a second end portion;
wherein said boot can comprises, in axial order from said first end portion to said second end portion of said boot can, a radially inward extending lip, a first substantially horizontal portion, a first radially inward extending portion, a second substantially horizontal portion, a second radially inward extending portion, a third substantially horizontal portion and a third radially inward extending portion; and
wherein said third radially inward extending portion has a shape that is complementary to and is in direct contact with at least a portion of a first trough of a flexible boot.

13. A joint assembly, comprising:
a first joint member drivingly connected to a second joint member by one or more torque transmission elements;
wherein a first end portion of said first joint member has a first hollow portion and a second end portion of said first joint member has a second hollow portion;
wherein at least a portion of said second joint member and said one or more torque transmission elements are disposed within said second hollow portion of said first joint member;
a first shaft having a first end portion and a second end portion;
wherein a plurality of axially extending first shaft splines circumferentially extend along at least a portion of an outer surface of said second end portion of said first shaft that are complementary to an meshingly engaged with a plurality of axially extending first joint member splines circumferentially extending along at least a portion of a first inner surface defining said first hollow portion of said first joint member;
a first nut;
wherein a plurality of first nut threads circumferentially extend along at least a portion of a first inner surface of said first nut that are complementary to and meshingly engaged with a plurality of first shaft threads circumferentially extending along at least a portion of said outer surface of said second end portion of said first shaft;
wherein a nut snap-ring groove circumferentially extends along at least a portion of a second inner surface of said first nut;
wherein said nut snap-ring groove is complementary to a first joint member nut snap-ring groove circumferentially extending along at least a portion of an outer surface of said first end portion of said first joint member;
a nut snap-ring, said nut snap-ring in an unassembled state having a substantially polygonal shape defined by a plurality of interconnected substantially straight portions;
wherein at least a portion of said nut snap-ring is received and/or retained within at least a portion of said first joint member snap-ring groove in said first joint member and said first nut snap-ring groove in said first nut;
wherein said nut snap-ring in said unassembled state has a first plurality of substantially straight portions having a circumscribed radius R1 with a center that is offset from a Y-Y axis of said nut snap-ring by a distance D1;
wherein said nut snap-ring in said unassembled state has a second plurality substantially straight portions having a circumscribed radius R2 with a center that is offset from said Y-Y axis of said nut snap-ring by a distance D2; and
wherein said nut snap-ring in said unassembled state has a third plurality of straight portions having a circumscribed radius R3 with a center that is offset from an X-X axis of said nut snap-ring by a distance D3.

14. The joint assembly of claim 13, wherein at least a portion of said first end portion of said first shaft has a gear member with a plurality of gear teeth; and wherein said first shaft is a transmission output shaft, transfer case output shaft, a power transfer unit output shaft, a pinion shaft, a differential input shaft, a differential pinion shaft or an inter-axle differential pinion shaft.

15. The joint assembly of claim 13, further comprising a stub shaft having a first end portion and a second end portion;
    wherein at least a portion of said first end portion of said stub shaft is drivingly connected to at least a portion of said second joint member; and
    wherein at least a portion of said second end portion of said stub shaft is drivingly connected to at least a portion of a second shaft.

16. The joint assembly of claim 13, wherein said first joint member further comprises a wall portion separating said first hollow portion of said first joint member from said second hollow portion of said first joint member.

17. The joint assembly of claim 13, wherein said distance D1 is substantially equal to said distance D2 of said nut snap-ring.

18. The joint assembly of claim 13, further comprising a flexible boot comprising a first end portion, a second end portion and a plurality of convolutions interposed between said first and second end portions of said flexible boot;
    wherein said plurality of convolutions of said flexible boot comprises, in axial order from said first end portion to said second end portion of said flexible boot, a first trough, a first crest, a second trough, a second crest, a third trough, a third crest, a fourth trough, a fourth crest, a fifth trough and a fifth crest; and
    wherein said first crest has a diameter D1, said second crest has a diameter D2, said third crest has a diameter D3, said fourth crest has a diameter D4 and said fifth crest has a diameter D5.

19. The joint assembly of claim 13, wherein said flexible boot has a first end portion and a second end portion;
    wherein said flexible boot comprises, in axial order from said first end portion to said second end portion of said flexible boot, a first trough, a first crest, a second trough, a second crest, a third trough, a third crest, a fourth trough, a fourth crest, a fifth trough, a fifth crest, a sixth trough, a sixth crest, a seventh trough, a seventh crest, an eighth trough, an eighth crest, a ninth trough, a ninth crest, a tenth trough, a tenth crest, an eleventh trough and an eleventh crest;
    wherein said third crest, said fourth trough, said fourth crest, said fifth trough and said fifth crest forms a first substantially W-shaped portion;
    wherein said fifth crest, said sixth trough, said sixth crest, said seventh trough and said seventh crest forms a second substantially W-shaped portion;
    wherein said seventh crest, said eighth trough, said eighth crest, said ninth trough and said ninth crest forms a third substantially W-shaped portion; and
    wherein said ninth crest, said tenth trough, said tenth crest, said eleventh trough and said eleventh crest forms a fourth substantially W-shaped portion.

20. The joint assembly of claim 13, further comprising a boot can having a first end portion and a second end portion;
    wherein said boot can comprises, in axial order from said first end portion to said second end portion of said boot can, a radially inward extending lip, a first substantially horizontal portion, a first radially inward extending portion, a second substantially horizontal portion, a second radially inward extending portion, a third substantially horizontal portion and a third radially inward extending portion; and
    wherein said third radially inward extending portion has a shape that is complementary to and is in direct contact with at least a portion of a first trough of a flexible boot.

* * * * *